United States Patent [19]
Bien et al.

[11] 4,065,446
[45] Dec. 27, 1977

[54] REACTIVE DYESTUFFS CONTAINING UREA ALKYLENE LINKAGE BETWEEN CHROMOPHORE AND REACTIVE RADICAL

[75] Inventors: Hans-Samuel Bien, Burscheid; Wolfgang Harms, Leverkusen, both of Germany

[73] Assignee: Bayer Aktiengesellschaft, Leverkusen, Germany

[21] Appl. No.: 237,920

[22] Filed: Mar. 24, 1972

[30] Foreign Application Priority Data

Mar. 24, 1971 Germany .................. 2114158

[51] Int. Cl.$^2$ .............. C09B 62/20; C09B 62/22; C09B 62/24; C09B 62/26
[52] U.S. Cl. .............. 260/146 D; 260/153; 260/154; 260/157; 260/158; 260/256.4 N; 260/261; 260/314.5; 260/242.2; 544/187
[58] Field of Search ............ 260/154, 242, 256.4, 260/146 D, 153, 157, 158, 242, 249, 256.4 N, 261, 314.5

[56] References Cited
U.S. PATENT DOCUMENTS

| | | | |
|---|---|---|---|
| 3,433,781 | 3/1969 | Ackermann et al. | 260/146 D |
| 3,458,496 | 7/1969 | Guenthard | 260/146 D |
| 3,632,611 | 1/1972 | Kenmochi et al. | 260/372 |
| 3,669,951 | 6/1972 | Bien et al. | 260/146 D |

*Primary Examiner*—Floyd D. Higel
*Attorney, Agent, or Firm*—Plumley and Tyner

[57] ABSTRACT

Dyestuffs are disclosed having the formula

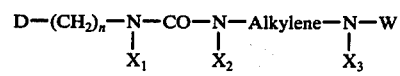

in which
W is a reactive radical;
D is the radical of an organic dyestuff;
$X_1$ is hydrogen or alkyl;
$X_2$ and $X_3$ are hydrogen, alkyl, cycloalkyl, aralkyl or aryl; or $X_2$ and $X_3$ together are alkylene;
Alkylene is $C_1$-$C_6$-alkylene or cycloalkylene; and $n$ is 0 or 1.

The dyestuffs are used in the dyeing of textile materials containing hydroxyl groups and nitrogen, especially natural and regenerated cellulose, wool, silk, synthetic polyamide fibers and synthetic polyurethane. The dyeings obtained are, in general, distinguished by good to very good fastness properties, especially by excellent wet fastness.

14 Claims, No Drawings

REACTIVE DYESTUFFS CONTAINING UREA ALKYLENE LINKAGE BETWEEN CHROMOPHORE AND REACTIVE RADICAL

The subject of the present invention are new reactive dyestuffs of the general formula

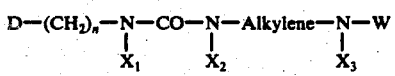

$$D-(CH_2)_n-N(X_1)-CO-N(X_2)-Alkylene-N(X_3)-W \quad (I)$$

In this formula
W denotes a radical of a reactive group,
D denotes a radical of an organic dyestuff,
$X_1$ denotes hydrogen or alkyl,
$X_2$ and $X_3$ denote hydrogen, alkyl, cycloalkyl, aralkyl or aryl, and $X_2$ and $X_3$ together can also represent alkylene,
Alkylene denotes $C_1$-$C_6$-alkylene or cycloalkylene and
n denotes 0 or 1.

By reactive groups, there are here understood groups which react either directly by addition, or through exchange of a substituent which can be split off, preferably split off as an anion, with amino, amide or hydroxyl groups of natural of synthetic fibre materials, under dyeing or printing conditions, preferably in the presence of acid-binding compounds, especially compounds which react alkaline, to form a covalent bond.

Particularly suitable reactive groups are those which contain at least one removable substituent bonded to an aromatic heterocyclic radical, for example those which contain at least one removable substituent bonded to a C atom of a —C[N— group in a 5-membered or 6-membered aromatic-heterocyclic ring, for example bonded to a monoazine, diazine or triazine ring, such as pyridine, pyrimidine, pyridazine, pyrazine, thiazine, oxazine, sym.-triazine, quinoline, phthalazine, cinnoline, quinazoline or quinoxaline ring or to a thiazole, thiadiazole, isothiazole, benzthiazole or benzoxazole ring.

Amongst the reactive substituents on the heterocyclic structure there should be mentioned, for example, halogen (Cl, Br or F), ammonium including hydrazinium, sulphonium, sulphonyl, azide-($N_3$), thiocyanato, thio, thioether, exyether, sulphinic acid and sulphonic acid. Individual examples which may be mentioned are mono- or di-halogeno-sym.-triazinyl radicals, for examples 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6, 2-di-β-hydroxyethylamino-4-chlorotraizinyl-6 and the corresponding sulphuric acid half-esters, 2-diethylamino-4-chlorotriazinyl-6, 2-morpholine- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxy- or sulphophenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methyl- or methoxyphenyl)-oxy-4-chlorotriazinyl-6, 2-alkyl-mercapto- or 2-arylmercapto- or 2-(substituted aryl)-mercapto-4-chlorotriazinyl-6, such as 2-(β-hydroxyethyl)-mercapto-4-chlorotriazinyl-6, 2-phenylmercapto-4-chlorotriazinyl-6, 2-(4'-methyl-phenyl)-mercapto-4-chlorotriazinyl-6, 2-(2',4'-dinitro)-phenyl-mercapto-4-chlorotriazinyl-6, 2-methyl-4-chlorotriazinyl-6, 2-phenyl-4-chlorotriazinyl-6, mono-, di- or tri-halogeno-pyrimidinyl radicals, such as 2,4-dichloropyrimidinyl-6, 2,4,5-trichloropyrimidinyl-6, 2,4-dichloro-5-nitro- or -5-methyl- or -5-carboxy-methyl or -5-carboxy- or -5-cyano- or -5-vinyl- or -5-sulpho- or -5-mono-, -di- or -trichloromethyl- or -5-carbo-alkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichlorpyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-di-chloroquinoxaline-6-carbonyl, 2,3-dichloroquinoxaline-6-sulphonyl, 1,4-dichlorophthalazine-6-sulphonyl or -carbonyl, 2- or 3- or 4-(4',5'-dichloropyridazon-6'-yl-1')-phenyl-sulphonyl or -carbonyl, β-(4',5'-dichloropyridazon-6'-yl-1')-ethylcarbonyl, N-methyl-N-(2,4-dichlorotriazinyl-6)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl as well as the corresponding bromine and fluorine derivatives of the abovementioned chlorine-substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2,5,6-trifluoro-4-pyrimidinyl, 5-chloro-6-chloromethyl-2-fluoro-4-pyrimidinyl, 2,6-difluoro-5-bromo-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chloro-triazinyl-6 and 2,4-bis-(3'-carboxy-phenylsulphonyl-1')-tri-azinyl-6; pyrimidine rings containing sulphonyl groups, such as 2-carboxymethylsulphonyl-pyrimidinyl-4, 2-methyl-sulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methyl-sulphonyl-pyrimidine-5-sulphonyl, 2-methylsulphonyl-pyrimidinyl-4, 2-phenylsulphonyl-pyrimidinyl-4, 2-methylsulphonyl-pyrimidinyl-4, 2-phenylsulphonyl-pyrimidinyl-4, 2-trichloro-methylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethyl-pyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methyl-pyrimidinyl-4, 2-methylsulphonyl-6-chloropyrimidinyl-4, 2,6-bis-methyl-sulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethylsulphonyl-6-methyl-pyrimidinyl-4, 2-methylsulphonyl-5-bromopyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-4-chloro-6-methylpyrimidine-5-sulphonyl or carbonyl; triazine rings containing ammonium groups, such as 2-tri-methylammonium-4-phenylamino- or -4-(o-, m- or p-sulphophenyl) -amino-triazinyl-6, 2-(1,1-dimethyl-hydrazinium)-4-phenylamino- or -4-(o-, m- or p-sulphophenyl)-aminotriazinyl-6, 2-(2-isopropylidene-1,1-dimethyl)-hydrazinium-4-phenylamino- or -4-(o-, m- or p-sulphophenyl)-amino-triazinyl-6, 2-N-aminopyrrolidinium- or 2-N-aminopiperidinium-4-phenylamino- or -4-(o-, m- or p-sulphophenyl)-aminotriazinyl-6, and also 4-phenylamino- or 4-(sulphophenylamino)-triazinyl-6 radicals which in the 2-position contain 1,4-bis-aza-bicyclo-[2,2,2]-octane or 1,2-bis-aza-bicyclo-[0,3,3]-octane bonded as a quaternary structure via a nitrogen bond, 2-pyridinium-4-phenylamino- or -4-(o-, m- or p-sulphophenyl)-aminotriazinyl-6 as well as corresponding 2-oniumtriazinyl-6 radicals which are substituted in the 4-position by alkylamino, such as methylamino, ethylamino or β-hydroxyethylamino, or alkoxy, such as methoxy or ethoxy, or aroxy, such as phenoxy or sulphophenoxy, groups; 2-chlorobenzthiazole-5- or -6-carbonyl or -5- or -6-sulphonyl, 2-arylsulphonyl-or -alkylsulphonylbenzthiazole-5- or -6-carbonyl or -5- or -6-sulphonyl, such as 2-methyl-sulphonyl- or 2-ethylsulphonyl-benzthiazole-5- or -6-sulphonyl or -carbonyl, 2-phenylsulphonyl-benzthiazole-5- or -6-sulphonyl or -carbonyl and the corresponding 2-sulphonylbenzthiazole-5- or -6-carbonyl or -sulphonyl derivatives which contain sulpho groups in the fused benzene ring, 2-chlorobenzoxazole-5-or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl and the N-oxide of 4-chloro or 4-nitroquinoline-5-carbonyl.

Additionally, reactive groups of the aliphatic series should be mentioned, such as acryloyl, mono-, di- or tri-chloroacryloyl, such as —CO—CH[CH—Cl, —CO—CCl[CH₂, —CO—CCl[CH—CH₃ and also —CO—CCl[CH—COOH and —CO—CH[CCl—COOH, β-chloropropionyl, 3-phenylsulphonylpropionyl, β-sulphatoethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1- or -sulphonyl-1, β-(2,2,3,3-tetrafluorocyclobutyl-1)-acryloyl, a- or β-bromoacryloyl, a- or β-alkyl- or -arylsulphonyl-acryloyl groups, such as a- or β-methylsulphonyl-acryloyl, chloroacetylamino, β-chloropropionylamino, a,β-dichloropropionylamino, a,β-dibromopropionylamino, β-sulphato-propionylamino and β-sulphonylpropionylamino.

Preferred dyestuffs are those of the formula

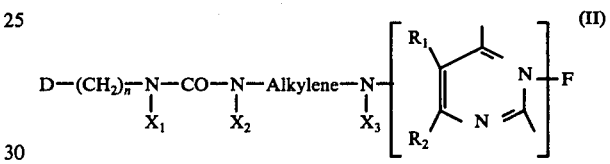

wherein

D, $X_1$, $X_2$, $X_3$, Alkylene and $n$ have the meaning mentioned in the formula (I) and $R_1$ represents hydrogen or a substituent and $R_2$ represents hydrogen, halogen, alkyl, alkenyl, aralkyl or aryl.

The alkyl, alkenyl, cycloalkyl and alkylene radicals may optionally possess further substituents.

As examples of substituents $R_1$ in the 5-position of the pyrimidine ring there should be mentioned: halogen, such as chlorine, bromine and fluorine, $C_1$-$C_6$-alkyl radicals such as —CH₃, —C₂H₅ and —C₄H₉; substituted alkyl radicals, such as mono-, di- or tri-chloro- or -bromo-methyl, alkenyl radicals such as vinyl, halogenovinyl and allyl, nitro, nitrile, carboxyl, sulpho, carboxylic acid ester, carboxylic acid amide, sulphonic acid amide, carboxylic acid amide, sulphonic acid amide and sulphonic acid ester groups, for example alkoxycarbonyl groups with 1 – 4 C atoms in the alkoxy group, —CONH₂, —SO₂NH₂ and the corresponding mono- or di- $C_1$-$C_4$-alkylamides or the corresponding mono- or diarylamides or aralkylamides.

Examples of possible substituents $R_2$ in the 6-position of the pyrimidine ring are: halogen, such as chlorine, bromine and fluorine, $C_1$-$C_6$-alkyl such as methyl and ethyl, alkenyl such as vinyl, halogenovinyl and allyl, and substituted alkyl radicals such as mono-, di- or tri-chloromethyl or -bromomethyl radicals.

Dyestuffs in which $R_1$ and $R_2$ denote hydrogen, halogen, especially Cl or F, and/or $C_1$-$C_4$-alkyl radicals, are a preferred group of the compounds according to the invention.

As examples of radicals $X_1$ there should be mentioned: hydrogen, and $C_1$-$C_4$-alkyl radicals which are optionally substituted by hydroxyl, sulpho or sulphato, such as methyl, ethyl, 2-hydroxyethyl, 2-sulphatoethyl, 2- hydroxypropyl, 2-sulphatopropyl and 2,3-dihydroxypropyl.

As radicals $X_2$ and $X_3$ there should be mentioned, in addition to those indicated for $X_1$: cyclohexyl, and phenyl, benzyl or phenylethyl radicals which are optionally substituted by hydroxyl, sulpho, alkoxy, carboxy, sulphamoyl or carbamoyl. $X_2$ and $X_3$ together can also represent alkylene, preferably —CH$_2$CH$_2$—.

The new dyestuffs can contain the radical

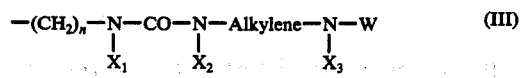     (III)

once or several-fold per molecule. Dyestuffs with 1 to 2 such reactive radicals are preferred.

Possible alkylene bridges are, for example, radicals such as —CH$_2$—CH$_2$—, —(CH$_2$)$_3$—, —(CH$_2$)$_4$—, —(CH$_2$)$_5$—, —(CH$_2$)$_6$—, —CH$_2$—CH(CH$_3$)—CH$_2$—, —CH$_2$—C(CH$_3$)$_2$—CH$_2$—, —CH(CH$_3$)—CH(CH$_3$)—, —CH$_2$—CH(OH)—CH$_2$—, and

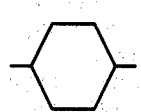

Amongst the multiplicity of possible combinations of the grouping

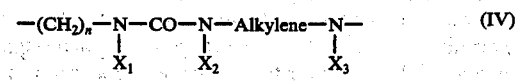     (IV)

the following may be mentioned:

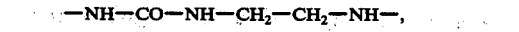

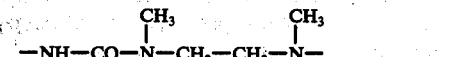

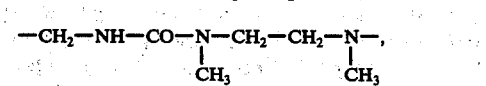

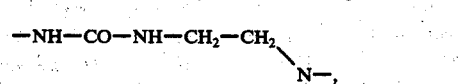

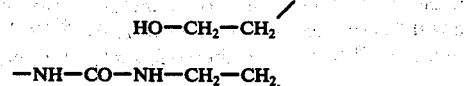

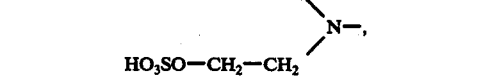

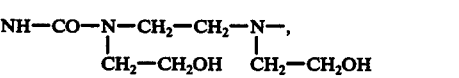

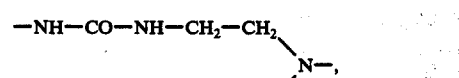

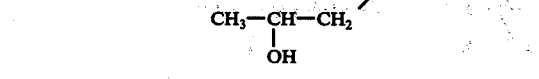

-continued

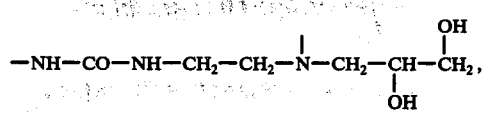

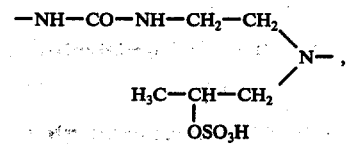

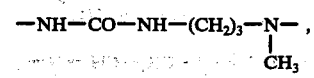

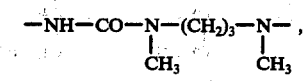

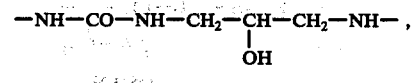

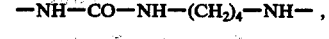

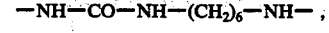

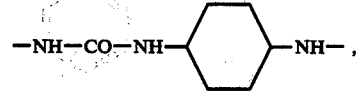

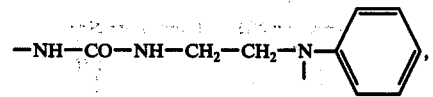

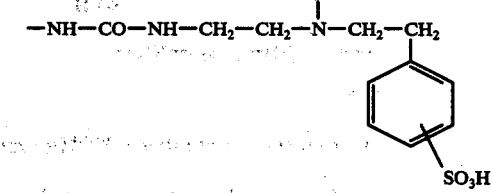

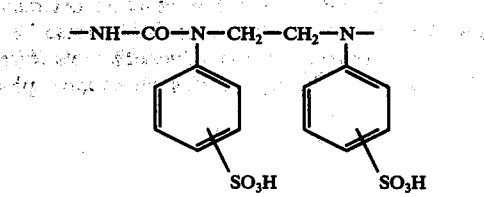

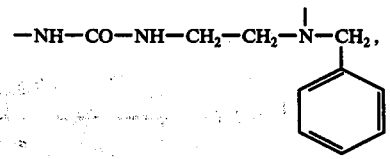

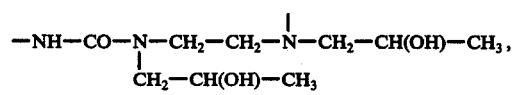

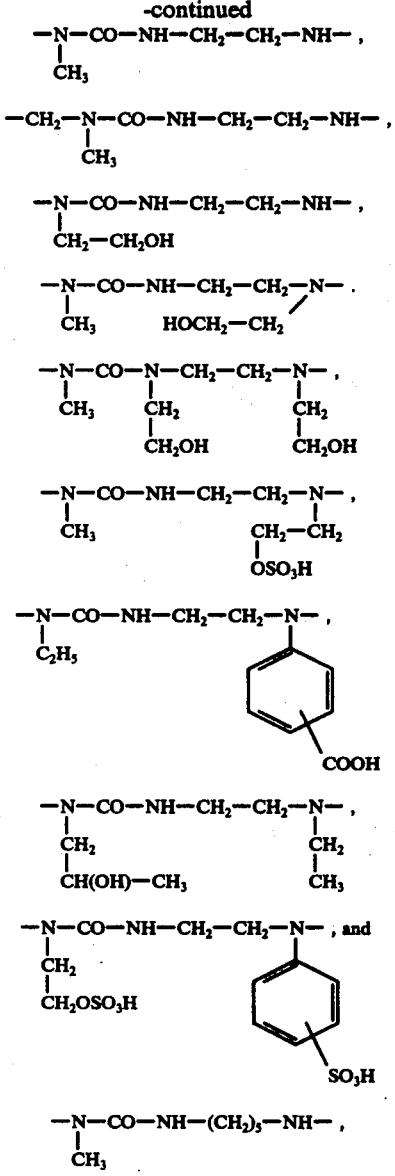

but this far from exhausts the number of bridge members IV.

The new dyestuffs can belong to the most diverse classes, for example to the series of the metal-free or metallised monoazo or polyazo dyestuffs, metal-free or metallised azaporphine dyestuffs, such as copper phthalocyanine or nickel phthalocyanine dyestuffs, the anthraquinone, oxazine, dioxazine, triphenylmethane, nitro, azomethine, benzoanthrone, and dibenzanthrone dyestuffs and the polycyclic condensation compounds of anthraquinone, benzanthrone and dibenzanthrone compounds.

Within these classes of dyestuffs, dyestuffs of the following general compositions amongst others, are particularly valuable:

1. Azo dyestuffs

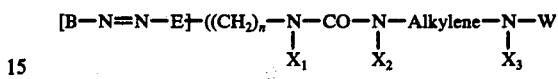

wherein
B and E represent aromatic, carbocyclic or heterocyclic radicals and in particular
B represents a radical of a carbocyclic diazo component of the benzene or naphthalene series and
E represents the radical of an enolic or phenolic coupling component, for example of a 5-pyrazolone, an acetoacetic acid arylamide, a hydroxynaphthalene or an aminonaphthalene;
B and E can furthermore contain any desired substituents which are customary in azo dyestuffs, including further azo groups;
$n$, $X_1$, $X_2$, $X_3$, Alkylene and W have the meaning explained under formula I.

Particularly valuable dyestuffs on this series are those which are water-soluble and especially those which contain sulphonic acid groups and/or carboxylic acid groups. The azo dyestuffs can be either metal-free or metallised, and amongst the metal complexes the copper, chromium and cobalt complexes are of preferred interest.

Important azo dyestuffs are, for example, those of the azobenzene series, the benzene-azo-naphthalene series, the benzene-azo-aminonaphthalene series, the naphthalene-azo-naphthalene series, the benzene-azo-1-phenyl-5-pyrazolone series, the benzene-azo-1-naphthyl-5-pyrazolone series and the naphthalene-azo-1-phenyl-5-pyrazolone series. In the case of metal complex dyestuffs the groups bonded as metal complexes are preferably in the o-positions to the azo group, for example in the form of o,o'-dihydroxy-, o-hydroxy-o'-carboxy-, o-carboxy-o'-amino- and o-hydroxy-o'-aminoazo groupings. Particularly outstanding types of monoazo dyestuffs of the kind obtainable according to the invention are illustrated by the following formulae:

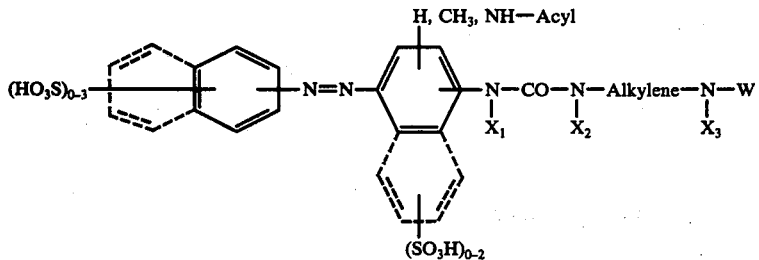

-continued
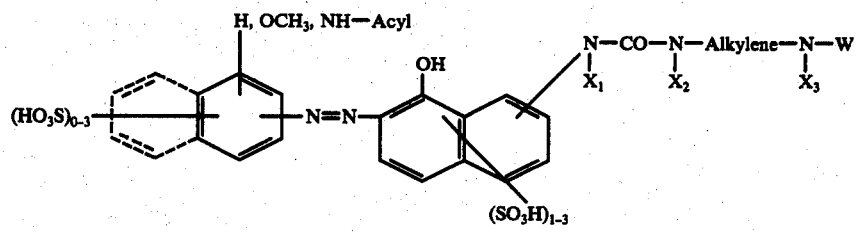
(VII)
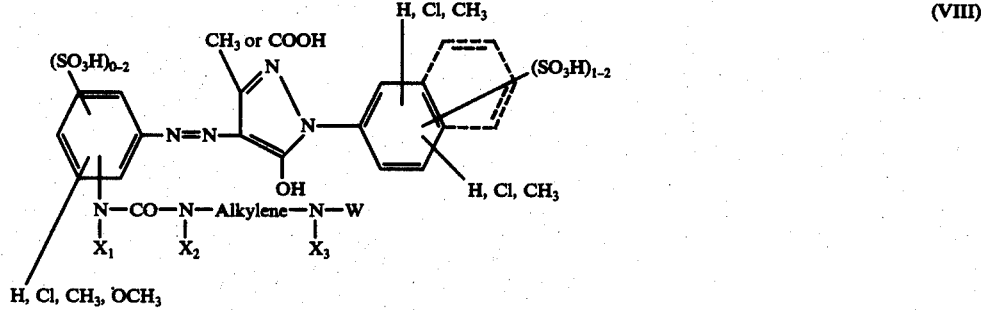
(VIII)
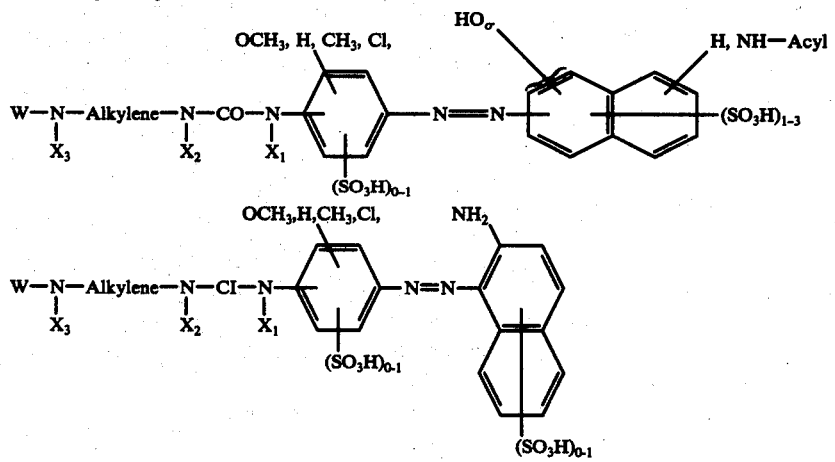
(IX)
(X)
(XI)
(XII)
}⊙ denotes that the particular substituents indicated are in the o-position in the aryl nucleus,
Acyl represents an acyl radical,
the nuclei shown in broken lines indicate that these may be present or absent, and
$X_1$, $X_2$, $X_3$, Alkylene and W have the abovementioned meaning.
2. Anthraquinone dyestuffs of the formula

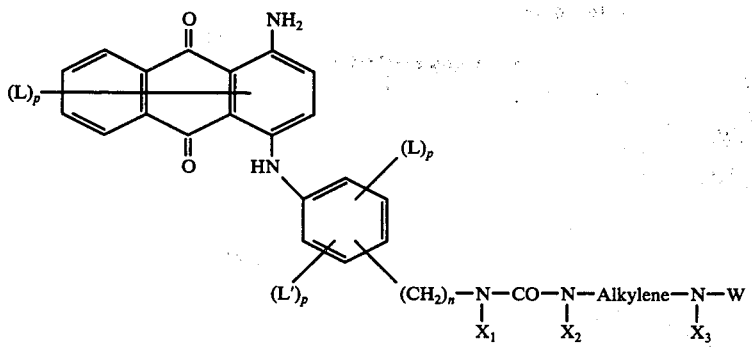

(XIII)

herein
- L and L' denote substituents including, especially, sulphonic acid groups,
- p denotes an integer from 0 to 2 and
- $n$, $X_1$, $X_2$, $X_3$, Alkylene and W have the meaning indicated initially.

3. Phthalocyanine dyestuffs

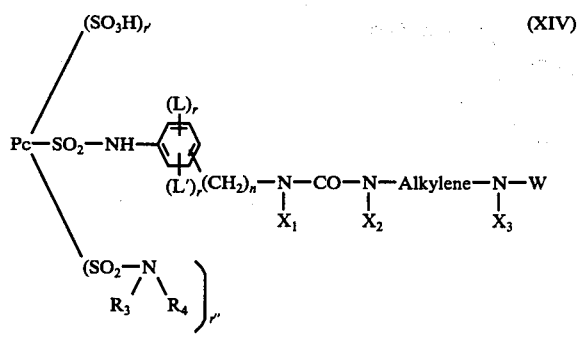

(XIV)

In this formula
- Pc represents the radical of a nickel phthalocyanine or copper phthalocyanine,
- L and L' represent substituents, especially sulphonic acid groups,
- r represents an integer from 0 to 2,
- $n$, $X_1$, $X_2$, $X_3$, Alkylene and W have the meaning indicated initially,
- r' and r'' can denote numbers from 1 to 2 and
- $R_3$ and $R_4$ can independently of one another denote hydrogen or alkyl (1 to 3 C atoms).

The above list of a selection of suitable azo, anthraquinone and azaporphine dyestuffs and fluorine-substituted pyrimidinyl rings does not in any way restrict the general formulae either with regard to the possible methods of preparation of such dyestuffs within the scope of the general formula I, or in respect of the valuable technical use properties of these products. The new dyestuffs can furthermore possess any desired substituents which are customary in dyestuffs, such as sulphonic acid, carboxylic acid, sulphamide and carbonamide groups which can be further substituted at the amide nitrogen, sulphonic acid ester and carboxylic acid ester groups, alkyl, aralkyl and aryl radicals, alkylamino, aralkylamino, arylamino, acylamino, nitro, nitrile, halogen, such as chlorine, bromine and fluorine, hydroxyl, alkoxy, thioether or azo groupings, and the like.

The new dyestuffs of the formula I are obtained if, in dyestuffs or dyestuff intermediate products, at least one radical W bonded via —(CH$_2$)$_n$—N(X$_1$)—CO—N(X$_2$)—Alkylene—N(X$_3$)— is introduced in accordance with processes which are in themselves known. In the case of the use of dyestuff intermediate products, the latter are then converted into the desired dyestuffs in a manner which is in itself known, especially by diazotisation and/or coupling and/or condensation reactions.

The introduction of the radical W into the dyestuffs via a bridge member —(CH$_2$)$_n$—N(X$_1$)—CO—N(X$_2$)—Alkylene—N(X$_3$)— can be realised in accordance with various methods of preparation. Thus, dyestuff components

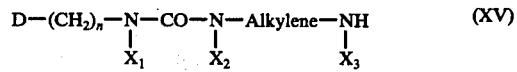

(XV)

which contain the bridge member IV and in which
- D, $n$, $X_1$, $X_2$, $X_3$ and Alkylene have the above-mentioned meaning, or dyestuff intermediate products

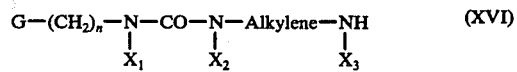

(XVI)

in which
- G is the radical of a carbocyclic diazo component of the benzene or naphthalene series, the radical of a phenolic or enolic coupling component, for example of a 5-pyrazolone, a hydroxynaphthalene or an aminonaphthalene, or the radical of a condensable, aromatic radical containing amino groups, for example an aminobenzene radical, and
- $n$, $X_1$, $X_2$, $X_3$ and Alkylene have the abovementioned meaning, can be reacted with compounds of the general formula

(XVII)

wherein
- W has the indicated meaning and
- Y represents an anionically removable radical, and where dyestuff intermediate products are used, the latter can be converted in a suitable manner into the desired final dyestuffs of the general formula I.

The reaction of the dyestuffs XV with the reactive components W-Y takes place in a manner which is in itself known.

Reactive components of the formula (XVII) which are suitable for this purpose are, for example, those on which the abovementioned reactive groups W are based, that is to say in general the halides, in particular the chlorides, of the acyl components W which have been mentioned. Amongst the large number of possible compounds, the following selection may be mentioned here: trihalogeno-sym.-triazines, such as cyanuric chloride and cyanuric bromide, dihalogenomonoamino- and -mono-substituted-amino-sym.-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2',5'-, -2',4'-, or -3',5'-disulphophenyl)-aminotriazine, dihalogenoalkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine, dihalogeno-alkylmercapto- and -arylmercapto-sym.-triazines, such as 2,6-dichloro-4-ethylmercapto-triazine, 2,6-dichloro-4-phenylmercapto-triazine and 2,6-dichloro-4-(p-methylphenyl)-mercapto-triazine; tetrahalogenopyrimidines, such as tetrachloro-, tetrabromo- or tetrafluoro-pyrimidine, 2,4,6-trihalogeno-pyrimidines, such as 2,4,6-trichloro-, -tribromo- or -trifluoro-pyrimidine, dihalogenopyrimidines, such as 2,4-dichloro-, -dibromo- or difluoro-pyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoropyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 2,6-difluoro-4,5-dichloro- or -dibromo-pyrimidine, 2,6-difluoro-4-bromopyridine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoro-pyrimidine-5-carboxylic acid alkyl ester, or -5-carboxylic acid amide, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoro-pyrimidine, 6-phenyl-2,4-difluoropyrimidine, 6-trifluoromethyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonyl-pyrimidine, 2,4-difluoro-5-phenylpyrimidine, 2,4-difluoro-5-carbonamidopyrimidine, 2,4-difluoro-5-carbomethoxy-pyrimidine, 2,4-difluoro-6-trifluoromethyl-pyrimidine, 2,4-difluoro-5-bromo-6-trifluoromethyl-pyrimidine, 2,4-difluoro-6-carbonamidopyrimidine, 2,4-difluoro-6-carbonamidopyrimidine, 2,4-difluoro-6-carbomethoxy-pyrimidine, 2,4-difluoro-6-phenylpyrimidine, 2,4-difluoro-6-cyanopyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-tris-methylsulphonylpyrimidine, 2,6-bis-methylsulphonyl-4,5-dichloropyrimidine, 2,4-bis-methylsulphonylpyrimidine-5-sulphonic acid chloride, 2-methyl-sulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-trismethylsulphonyl-5-chloropyrimidine, 2-methylsulphonyl-4-chloro-6-carboxypyrimidine, 2-methylsulphonyl-4-chloropyrmidine-5-sulphonic acid, 2-methylsulphonyl-4-chloro-6-carbomethoxy-pyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4-methylsulphonyl-6-chloropyrimidine, 2-sulphoethylsulphonyl-4-chloro-6-methyl-pyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenyl-sulphonyl-4,5-dichloro-6-methylpyrimidine, 2-carboxymethylsulphonyl-4,5-dichloro-6-methylpyrimidine, 2-(2'- or 3'- or 4'-carboxyphenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride or -bromide and 2,6-bis-(methylsulphonyl)-4-chloropyrimidine-5-carboxylic acid chloride: further reactive components of the heterocyclic series with reactive sulphonyl substituents are, for example, 3,6-bis-phenylsulphonyl-pyridazine, 3-methylsulphonyl-6-chloropyridazine, 3,6-bis-trichloro-methylsulphonyl-pyridazine, 3,6-bis-methylsulphonyl-4-methyl-pyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bismethylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethylsulphonylquinoline, 2,4-bis-carboxy-methylsulphonylquinoline, 2,6-bis-(methylsulphonyl)-pyridine-4-carboxylic acid chloride and 1-(4'-chlorocarbonylphenyl or 2'-chlorocarbonylethyl)-4,5-bis-methyl-sulphonyl-pyridazone-(6) and 2,4-bis-methylsulphonyl-6-phenoxy-1,3,3-triazine. Further heterocyclic reactive components with mobile halogen are, inter alia, 2- or 3-monochloroquinoxaline-6-carboxylic acid chloride or -6-sulphonic acid chloride, 2- or 3-mono-bromo-quinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride as well as the corresponding bromine compounds, 2- or 3- or 4-(4′,5′-dichloropyridazon-6′-yl-1′)-phenylsulphonic acid chloride or -carboxylic acid chloride as well as the corresponding bromine compounds, β-(4′,5′-dichloropyridazon-6′-yl-1′)-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylaminotriazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-amino-acetyl chloride, N-methyl-, N-ethyl- or N-hydroxyethyl-N-(2,3-dichloroquinoxaline-6-sulphonyl- or -6-carbonyl)-aminoacetyl chlorides and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride as well as the corresponding 2-sulphonylbenzthiazole derivatives containing sulphonic acid groups in the fused benzene ring, 3,5-bis-methylsulphonyl-isothiazole-4-carboxylic acid chloride, 2-chlorobenzoxazole-5- or -6-carboxylic acid chloride or -sulphonic acid chloride as well as the corresponding bromine derivatives, 2-chlorobenzimidazole-5- or 6-carboxylic acid chloride or -sulphonic acid chloride as well as the corresponding bromine derivatives, 2-chloro-1-methyl-benzimidazole-5- or -6-carboxylic acid chloride or -sulphonic acid chloride as well as the corresponding bromine derivatives, 2-chloro-4-methylthiazole-(1,3)-5-carboxylic acid chloride or -5-sulphonic acid chloride, 2-chlorothiazole-4- or -5-sulphonic acid chloride and the corresponding bromine derivatives.

As examples from the series of the aliphatic reactive components, there should be mentioned: acrylic acid chloride, mono-, di- or tri-chloroacrylic acid chloride, 3-chloropropionic acid chloride, 3-phenylsulphonyl-propionic acid chloride, 3-methylsulphonyl-propionic acid chloride, 3-ethylsulphonyl-propionic acid chloride, 2-chloroethanesulphochloride, chloromethanesulphochloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chloro-cyclobutane-1)-carboxylic acid chloride, β-methyl-sulphonyl-acrylic acid chloride, a-methylsulphonyl-acrylic acid chloride and a bromoacrylic acid chloride and β-bromoacrylic acid chloride.

If the conversion leads to dyestuffs which contain more than one reactive group in the radical W or in another position of the dyestuff molecule, these can partly be replaced by other radicals, for example amino radicals, which can in turn possess reactive groups, for example in the form of esterified hydroxyalkyl groups.

In principle, it is possible for two or more different reactive groups to be present in the dyestuff. In the condensation reaction with the dyestuffs, or dyestuff intermediate products, containing amino groups, the pyrimidine derivatives probably in each case react in the 4-position, with elimination of the radical Y.

Reactive components which are particularly preferred for the reaction according to the invention are those which correspond to the formula

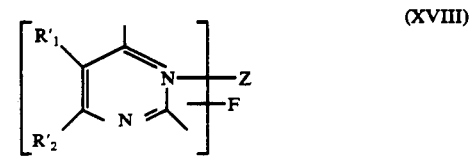 (XVIII)

wherein
$R'_1$ and $R'_2$ independently of one another represent hydrogen, Cl, Br, F or $C_1$-$C_4$-alkyl groups and
Z represents an anionic radical which can be split off, especially a fluorine substituent. The reaction of the dyestuffs, or dyestuff intermediate products, containing amino groups, with the compounds W-Y is carried out, depending on the nature of the starting compounds used, in an organic, aqueous-organic or aqueous medium at temperatures of −10° to 100° C, preferably 0° to 50° C, in the presence of alkaline condensation agents, such as aqueous alkali carbonate or alkali hydroxide solutions.

The following methods for the synthesis of the dyestuff component of the general formula XV should be mentioned:

1. The condensation of dyestuffs containing —NH($X_1$) groups, of the general formula

 (XIX)

wherein
D denotes the radical of an organic dyestuff,
n denotes the number 0 or 1 and
$X_1$ denotes hydrogen or a $C_1$-$C_4$-alkyl group,
with chloroformic acid alkyl esters or aryl esters to give intermediate products of the general formula

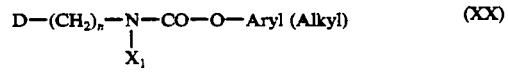 (XX)

wherein
D. n and $X_1$ have the abovementioned meaning and
Aryl denotes an aromatic radical, such as, for example, the phenyl radical, the p-nitrophenyl radical or the 2,4-dinitrophenyl radical and
Alkyl denotes an alkyl radical, for example the methyl. ethyl or 2,2,2-trichloroethyl radical, and the further reaction of these intermediate products XX, on one side, with aliphatic diamines of the general formula

 (XXI)

wherein
$X_2$ and $X_3$ independently of one another can be hydrogen, lower alkyl, aralkyl or aryl groups and
Alkylene denotes an unbranched or branched saturated aliphatic bridge with 1 to 6 carbon atoms.

2. Synthesis by diazotisation or coupling of compounds of the general formula XVI and reaction with suitable coupling components or diazo components.

3. Condensation of components containing amino groups, of the formula XVI, in cases where D is the radical of an anthraquinone or phthalocyanine dyestuff, with compounds of these categories which are capable of condensation, such as α-halogeno-, α-hydroxy-, α-alkoxy- or α-nitro-anthraquinone or phthalocyanine-sulphochlorides or anthraquinone-sulphochlorides.

The following should be listed for the synthesis of dyestuff intermediate products of the general formula XVI:

1. The condensation of compounds of the benzene, naphthalene or pyrazolone series, such as, for example, nitroanilines or diaminobenzenesulphonic acid, aminonaphthols or 1-aminophenyl-5-pyrazolones, which can furthermore be substituted by alkyl, chlorine or alkoxy radicals and especially by sulphonic acid groups, with chloroformic acid alkyl esters or aryl esters to give corresponding alkylurethanes or arylurethanes and subsequent reaction of these urethanes, on one side only, with aliphatic diamines of the formula XXI, and, if appropriate, subsequent reduction of the nitro groups to the amino groups.

2. The addition, on one side only, of aliphatic diamines of the general formula XXI to isocyanates of the general formula

$$K-(CH_2)_n-N=C=O \qquad (XXII)$$

wherein
K denotes the radical of a compound of the benzene series or naphthalene series which can be identical to the radical G in the formula XVI or which can be converted into the radical G by simple chemical operations such as reduction of a nitro group to the amino group or saponification of a formylamino or acetylamino group.

The dyestuffs obtainable in accordance with the various processes described can be subjected to further reactions which are customary for dyestuffs, for example by treating metallisable dyestuffs with metal-donating agents, especially with cobalt, chromium, copper or nickel salts, reducing dyestuffs which contain groups which can be reduced, especially nitro groups, acylating dyestuffs which possess groups which can be acylated, especially amino groups which can be acylated, or subsequently treating dyestuffs with sulphonating agents, such as with chlorosulphonic acid, oleum or SO$_3$ in chlorinated hydrocarbons, in order to introduce (further) sulphonic acid groups or sulphato groups into the products. The last process mentioned is at times of particular importance in the series of the anthraquinone and phthalocyanine dyestuffs. Dyestuffs of the formula (I) which contain sulphonic acid groups and/or carboxylic acid groups are preferred within the scope of this invention.

The new dyestuffs are extremely valuable products which are suitable for the most diverse end uses. Being water-soluble compounds, they are of preferred interest for dyeing textile materials containing hydroxyl groups and textile materials containing nitrogen, especially textile materials of natural and regenerated cellulose and textile materials of wool, silk, synthetic polyamide fibres and synthetic polyurethane fibres. As a result of the reactive fluorine substituent or substituents in the pyrimidine ring, the products are particularly suitable for use as reactive dyestuffs for dyeing cellulose materials in accordance with the techniques which have in recent times become known for this purpose. The fastness properties obtained, especially wet fastness properties obtained, are excellent.

For dyeing cellulose, the dyestuffs are preferably employed in an aqueous solution which can be mixed with substances which react alkaline, such as alkali hydroxide or alkali carbonate, or with compounds which change into substances which react alkaline, such as alkali bicarbonate or Cl$_3$C—COONa. Further auxiliaries can be added to the solution, but these should not react in an undesirable manner with the dyestuffs. Such additives are, for example, surface-active substances, such as alkyl sulphates, or substances which prevent the migration of the dyestuff, or dyeing auxiliaries such as urea (for improving the solubility and fixing of the dyestuffs) or inert thickeners, such as oil-water emulsions, tragacanth, starch, alginate or methylcellulose.

The solutions or pastes thus manufactured are applied to the material to be dyed, for example by padding in a padder (concentrated liquor) or by printing, and are subsequently heated for some time to an elevated temperature, preferably 40° to 150° C. Heating can be carried out in a hot flue, in a steamer, on heated rollers or by introduction into heated concentrated salt baths, individually or successively in optional sequence.

When using a padding liquor or dyeing liquor without alkali, the dry goods are subsequently passed through a solution which has an alkaline reaction and to which sodium chloride or sodium sulphate are added. The addition of the salt reduces the migration of the dyestuff from the fibre.

It is also possible to pretreat the material to be dyed with one of the abovementioned acid-binding agents, subsequently to treat the material with the solution or paste of the dyestuff, and finally to fix the dyestuff at an elevated temperature, as indicated.

For dyeing from a dilute liquor, the material is introduced into an aqueous solution of the dyestuff (liquor ratio 1:5 to 1:40) at room temperature and is dyed for 40 to 90 minutes, if appropriate whilst raising the temperature to 20° – 50° C, with portion-wise addition of salt, for example sodium sulphate, and subsequently of alkali, for example sodium phosphates, sodium carbonate, NaOH or KOH. Hereupon, the chemical reaction between the dyestuff and the fibre takes place. After chemical fixing has taken place, the dyed material is rinsed hot and is finally soaped, in the course of which remnants of dyestuff which have not been fixed are removed. Dyeings of excellent fastness, especially wet fastness and light fastness, are obtained. In the so-called pad-cold batch process, subsequent heating of the padded fabric can be dispensed with by storing the fabric for some time, for example 2 to 20 hours at room temperature. In this process, a stronger alkali is employed than in the dyeing process from a dilute liquor, described above.

For printing materials containing hydroxyl groups, a printing paste of the dyestuff solution, a thickener, such as sodium alginate, and a compound which reacts alkaline or splits off alkali on heating, such as sodium carbonate, sodium phosphate, potassium carbonate, potassium acetate or sodium bicarbonate or potassium bicarbonate, is used, and the printed material is rinsed and soaped.

If the dyestuffs contain groupings which form metal complexes, the fastness properties of the dyeings and prints can frequently be improved by an after-treatment with metal-donating agents, such as copper salts, for example copper sulphate, chromium salts, cobalt salts and nickel salts, such as chromium acetate, cobalt sulphate or nickel sulphate.

Textile materials containing amide groups, such as wool, silk, synthetic polyamide fibres and synthetic polyurethane fibres are generally dyed in accordance with the dyeing methods customary for this purpose, in the acid to neutral range, a final increase of the pH-value of the dyebath, for example to pH 6.5 to pH 11, at times being of advantage.

The dyestuffs are, for example, applied as solutions, or preferably in a dispersed form, to a synthetic polyamide fabric, and are subsequently after-treated, if appropriate together with (preferably smaller amounts of) acid-binding agents, such as sodium carbonate. Particularly advantageous results are achieved with those dyestuffs which are insoluble or only sparingly soluble in water. These are converted into a dyestuff dispersion by techniques which are in themselves customary, and with addition of known auxiliaries, and are used as such a dispersion in the dyebath and/or padding liquor or in a printing paste. The suitable auxiliaries for this application are, inter alia, compounds which prevent the migration of the dyestuff on the fibre, such as cellulose ethers, alkali metal chlorides and sulphates, wetting agents, such as condensation products of ethylene oxide and fatty alcohols or phenols, sulphonated fatty alcohols, solvents, such as thioglycol and thickeners, such as starch, tragacanth, alginate thickeners, gum arabic and the like.

The after-treatment of the dyeings, impregnations and prints obtained on polyamide fibre fabrics is preferably carried out at a temperature of 50° to 110° C and for a period of 5 to 60 minutes. Here again, if the dyestuffs used contain groupings which form metal complexes, the fastness properties of the dyeings can at times be improved by means of metal-donating agents, such as copper salts, for example copper sulphate, or chromium, cobalt and nickel salts, such as chromium acetate, cobalt sulphate or nickel sulphate.

The dyeings obtainable with the new dyestuffs are in general distinguished by good to very good fastness properties, especially by excellent wet fastness properties. An advantage of the new dyestuffs over the dyestuffs described in Deutsche Offenlegungsschrift (German Published Specification) 1,644,171 is that depending on the choice of the bridge member IV and hence of the grouping —N(X₃)—, the reactivity of the reactive pyrimidine system can be influenced and controlled. The dyeings on wool achievable with the new dyestuffs, and in particular also the combination dyeings with several of these dyestuffs, are distinguished by a high level of wet fastness properties and by excellent evenness over the surface and over the fibre. On cellulose fibres, rather strongly coloured dyeings are generally obtained by the exhaustion method.

EXAMPLE 1

100 parts of 2-nitro-4-aminotoluene are suspended in 300 ml of chlorobenzene. After dropwise addition of 135 parts of chloroformic acid phenyl ester, the mixture is stirred for 5 hours at 90° whilst passing a stream of air over it, until the reaction is complete.

After distilling off the solvent in vacuo, the evaporation residue is introduced into 180 parts of ethylenediamine at 20°.

After about 2 hours, the reaction of the phenylurethane, to give the urea, is complete. The batch is poured into 1,500 parts of water, the whole is heated to 98° until practically everything has dissolved, and the mixture is clarified so as to remove small amounts of residues and is subsequently stirred overnight at 20°. After filtering off the precipitate, and washing the filter cake with 1,500 parts of ice water, 130 parts of N-(3-nitro-4-methyl-phenyl)-N'-(β-aminoethyl)-urea are obtained.

Catalytic reduction of the latter with Raney nickel and hydrazine hydrate in 400 parts of water at 75° – 80°, clarification of the resulting solution to remove nickel, and evaporation of the filtrate in vacuo yields 110 parts of N-(3-amino-4-methyl-phenyl)-N'-(β-aminoethyl)-urea.

A solution of 10.0 g of sodium nitrite in 100 ml of water is run into a solution of 30 parts of the abovementioned amine in 300 parts of water and 65 parts of concentrated hydrochloric acid over the course of 30 minutes whilst cooling with ice, and the mixture is stirred for a further hour at 0° – 5°. After excess nitrous acid has been removed, a neutralised solution of 43.8 parts of 1-hydroxy-naphthalene-3,8-disulphonic acid in 350 parts of water is run in and the pH-value is adjusted to 7.5 – 8.0 by dropwise addition of 2 N sodium hydroxide solution. When the coupling is complete, after about 2 hours, the dyestuff which has precipitated is filtered off and covered 3 times with 10% strength sodium chloride solution.

The resulting coupling product is dissolved in 1,200 parts of water by adjusting the pH-value to 10.5 – 11.

After cooling to 5° – 10°, 22 parts of 2,4,6-trifluoro-5-chloro-pyrimidine are added dropwise to the solution and the pH-value is kept at 10 – 10.5 by means of 1 N sodium hydroxide solution. When the consumption of sodium hydroxide solution has subsided and a sample chromatographically no longer shows any starting material, the dyestuff is salted out by adding 120 parts of sodium chloride, filtered off, washed and dried in vacuo at 45°.

The dyestuff corresponds to the formula:

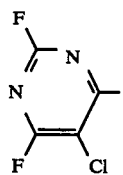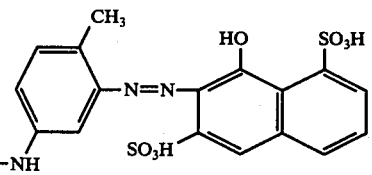

50 g of cotton in the form of a hank are dyed in 1 liter of dyeing liquor containing 1.5 g of the above dyestuff, by heating the bath to 30° – 40° over the course of 30 minutes, adding 50 g of sodium chloride in several portions, subsequently adding 20 g of sodium carbonate and treating the hank for 60 minutes at this temperature.

After rinsing, soaping at the boil and drying, a clear scarlet-red dyeing of good light fastness and wet fastness is obtained.

EXAMPLE 2

A solution of 58 parts of 4-nitro-phenyl-isocyanate in 100 parts of chlorobenzene is added dropwise, over the course of 2 hours, to a mixture of 88 parts of ethylenediamine, 255 parts of ice and 274 parts of concentrated hydrochloric acid, adjusted to 20° and pH 5.0, whilst stirring vigorously, and at the same time a pH-value of 4.8 – 5.0 is maintained in the reaction mixture by adding 15% strength sodium carbonate solution. The mixture is stirred for about 3 – 4 hours' longer, until the consumption of sodium carbonate has completely stopped. After distilling off the chlorobenzene under normal pressure, the resulting solution is clarified to remove a little undissolved bis-reaction product and the filtrate is cooled to 20°. The hydrochloride of the product obtained in part precipitates. The suspension is adjusted to a pH-value of 12 by dropwise addition of about 116 parts of 50% strength sodium hydroxide solution, whilst cooling externally, and is stirred for a further hour at 0° – 5°. The N-(4-nitro-phenyl)-N'-(β-amino-ethyl)-urea which has precipitated is filtered off and washed with 1,100 parts of ice water. After drying, 74 parts are obtained.

Catalytic reduction thereof with Raney nickel in 350 parts of water at 75° – 80° under 50 atmospheres gauge hydrogen pressure, clarification of the resulting solution to remove nickel, and evaporation of the filtrate in vacuo yields 62 parts of N-(4-amino-phenyl)-N'-(β-aminoethyl)-urea.

A solution of 27.7 parts of the amine manufactured above, in 280 parts of water and 115 parts of concentrated hydrochloric acid, is diazotised by dropwise addition of a solution of 10.0 parts of sodium nitrite in 100 parts of water at 0° – 5°. The mixture is stirred for a further hour and excess nitrous acid is destroyed with a little amidosulphonic acid. A neutralised solution of 52 parts of 1-acetylamino-8-hydroxy-naphthalene-3,6-disulphonic acid in 400 parts of water is run into the diazonium salt solution at 0° – 5° and using 15% strength sodium carbonate solution the pH-value is adjusted to 6, and to 7.5 after 3 hours. After stirring overnight, the dyestuff which has precipitated is filtered off and washed with 350 parts of 20% strength sodium chloride solution.

The coupling product is dissolved in 1,000 parts of water and 200 parts of dimethylformamide at 20°. 24 parts of 2,4,6-trifluoro-5-chloro-pyrimidine are added dropwise to the solution over the course of 30 minutes and the pH-value is kept at 7.0 – 7.5 during the condensation by means of 1 N sodium hydroxide solution. After completion of the reaction, the dyestuff is salted out by adding 150 parts of potassium chloride, filtered off and dried in vacuo at 45°.

It corresponds to the formula:

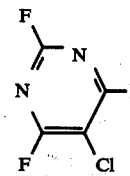 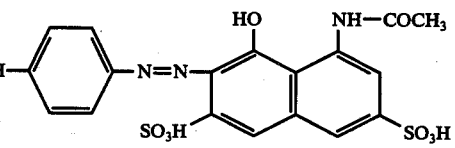

100 parts by weight of a cotton fabric are padded at room temperature with an aqueous solution containing 2% of the dyestuff, 15 g/liter of sodium bicarbonate and 150 g/liter of urea, subjected to an intermediate drying, heated to 140° for 2 minutes, and then rinsed and soaped at the boil. The fabric is dyed in strong red-violet shades which are fast to wet processing.

EXAMPLE 3

30 parts of N-(3-amino-4-methyl-phenyl)-N'-(β-amino-ethyl)-urea, 300 parts of water and 64 parts of concentrated hydrochloric acid are treated with 10.0 g of sodium nitrite in 100 parts of water at 0° – 5° over the course of 30 minutes. The diazotisation is completed by continuing to stir the mixture, the traces of excess nitrous acid are removed. A solution of 55.5 parts of 1-hydroxy-naphthalene-3,6,8-trisulphonic acid in 200 parts of water is added to the diazonium salt solution and the pH-value of the coupling solution is kept at 6.5 – 7 by means of 2 N sodium hydroxide solution until the coupling is complete. After warming the coupling solution to 20°, 30 parts of 2,4,6-trifluoro-5-chloropyrimidine are added dropwise over the course of 1 hour and the pH-value is kept at 7 – 7.5 during the condensation by means of 1 N sodium hydroxide solution. When the condensation is complete, the dyestuff is salted out by means of 170 parts of sodium chloride, filtered off and washed with 600 parts of 15% strength sodium chloride solution. The dyestuff, which is dried in vacuo at 45°, has the formula

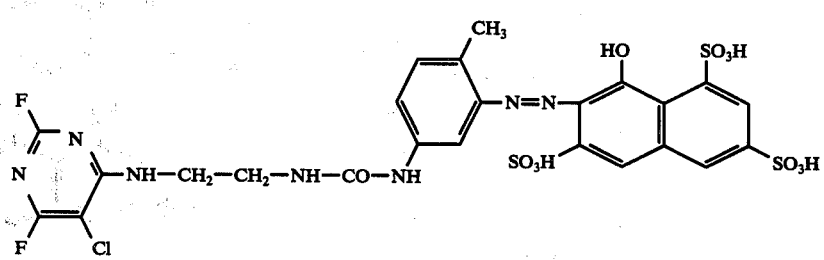

Cellulose fabric is printed with a printing past which per kilogram contains 40 g of the dyestuff, 100 g of urea, 300 ml of water, 500 g of alginate thickener and 20 g of sodium carbonate and which has been made up to 1 kilogram with water, and the fabric is dried, steamed for 1 minute at 105°, rinsed with hot water, subsequently soaped at the boil, rinsed and dried. A strong red print of good wet fastness and light fastness is thus obtained.

A strong red dyeing of good wet fastness, fastness to rubbing and light fastness is obtained if cotton fabric is impregnated with a solution which per liter of dyeing liquor contains 30 g of the above dyestuff, 0.5 g of a non-ionic wetting agent, 150 g of urea and 15 g of sodium bicarbonate, the fabric is subsequently squeezed out to a moisture content of approx. 100%, subjected to an intermediate drying at 50° – 60° and then heated to 140° for 2 minutes, and the dyeing thus obtained is thoroughly rinsed with hot water and subsequently soaped at the boil and again rinsed.

Further analogous dyestuffs can be synthesised from the diazo components containing urea bridges, coupling components and one reactive component A, B or C, listed in the table below. The diazo components are obtainable in accordance with one of the two processes described in Examples 1 – 2, by varying the nitroaniline or nitrophenylisocyanate material employed and the aliphatic diamine employed.

A = 2,4,6-Trifluoro-5-chloropyrimidine
B = 2,4,6-Trifluoropyrimidine
C = 2,4-Difluoro-5,6-dichloropyrimidine.

| Example No. | Diazo Component | Coupling Component | Reactive Component | Colour Shade |
|---|---|---|---|---|
| 4 | 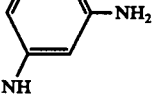 | 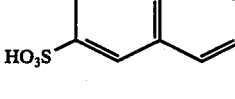 | B | yellowish-tinged red |
| 5 | " | " | C | " |
| 6 | 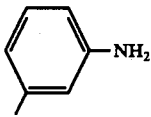 | 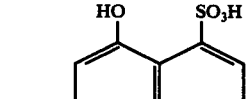 | A | " |
| 7 | " | " | B | " |
| 8 | " | 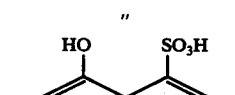 | B | red |
| 9 | " | 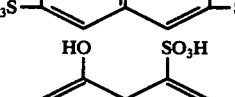 | C | " |
| 10 | " | 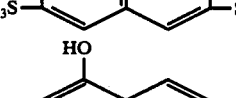 | A | yellowish-tinged red |
| 11 | 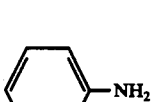 | 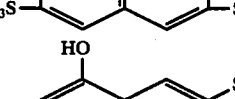 | A | yellowish-tinged red |
| 12 | 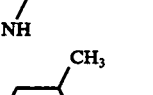 | 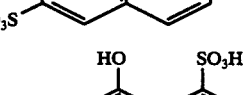 | A | " |
| 13 | 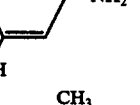 | 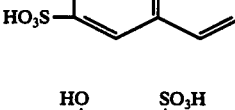 | B | red |

| Example No. | Diazo Component | Coupling Component | Reactive Component | Colour Shade |
|---|---|---|---|---|
| 14 | 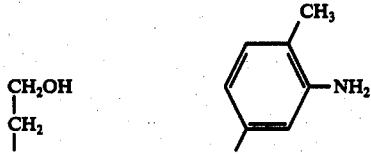 | 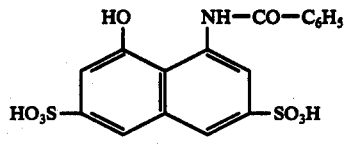 | A | reddish-tinged violet |
| 15 | 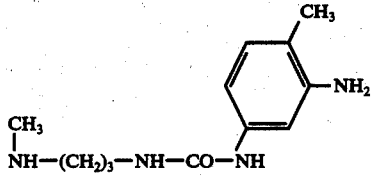 | 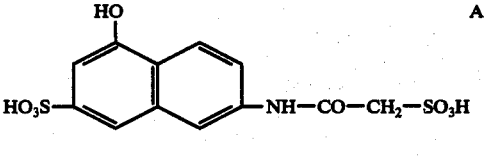 | A | yellowish-tinged red |
| 16 | 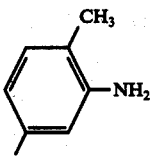 | 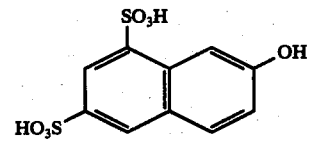 | B | orange |
| 17 | 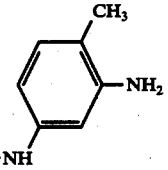 | 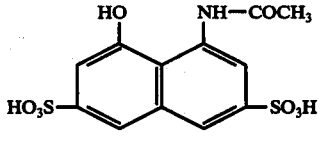 | A | ruby |
| 18 | 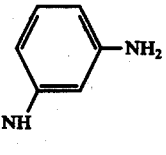 | " | A | bluish-tinged red |
| 19 | 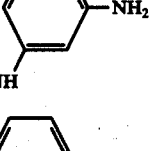 | 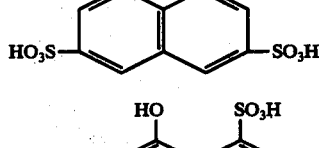 | A | yellowish-tinged red |
| 20 | 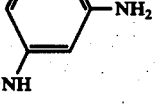 | 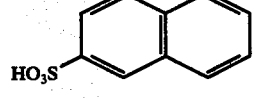 | B | " |
| 21 | 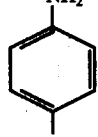 | 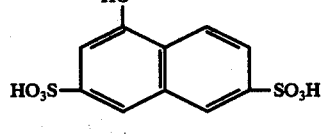 | A | bluish-tinged red |
| 22 | " | 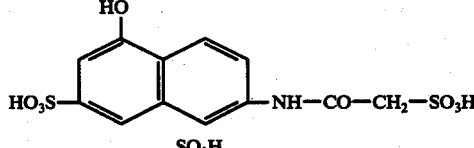 | A | " |
| 23 | 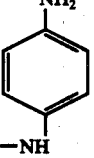 | 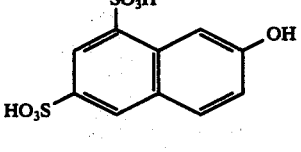 | A | yellowish-tinged red |

-continued

| Example No. | Diazo Component | Coupling Component | Reactive Component | Colour Shade |
|---|---|---|---|---|
| 24 | " | 4-benzamido-1-hydroxy-naphthalene-2,7-disulphonic acid derivative (HO, NH-CO-C₆H₅, HO₃S, SO₃H) | A | violet |
| 25 | HOCH₂-CH₂-NH-(CH₂)₂-NH-CO-NH-C₆H₄-NH₂ | 1-hydroxy-naphthalene-3,8-disulphonic acid derivative (HO, SO₃H, HO₃S) | A | bluish-tinged red |
| 26 | NH₂-(CH₂)₂-NH-CO-NH-C₆H₃(OCH₃)(NH₂) | 1-hydroxy-naphthalene-3,6-disulphonic acid derivative (HO, SO₃H, HO₃S, SO₃H) | B | bluish-tinged red |
| 27 | CH₃-NH-(CH₂)₂-N(CH₃)-CO-NH-C₆H₃(OCH₃)(NH₂) | 1-hydroxy-naphthalene-3,8-disulphonic acid (HO, SO₃H, HO₃S) | A | " |
| 28 | NH₂-(CH₂)₂-NH-CO-NH-C₆H₃(Cl)(NH₂) | 4-acetamido-1-hydroxy-naphthalene-3,6-disulphonic acid (HO, NH-COCH₃, HO₃S, SO₃H) | A | red |
| 29 | " | 2-hydroxy-naphthalene-3,6-disulphonic acid (SO₃H, OH, HO₃S) | A | orange |
| 30 | NH₂-(CH₂)₂-NH-CO-NH-C₆H₃(CH₃)(NH₂) | " | A | reddish-tinged violet |
| 31 | H₃C-C₆H₃(NH₂)-NH-CO-NH-(CH₂)₂-NH₂ | 1-hydroxy-naphthalene-3,6-disulphonic acid derivative (HO, SO₃H, HO₃S, SO₃H) | C | bluish-tinged red |
| 32 | CH₃-NH-(CH₂)₂-N(CH₃)-CO-NH-C₆H₃(CH₃)(NH₂) | 1-hydroxy-naphthalene-3,8-disulphonic acid (HO, SO₃H, HO₃S) | B | " |
| 33 | NH₂-(CH₂)₂-NH-CO-NH-C₆H₃(CH₃)(NH₂) | 6-amino-naphthalene-1,3-disulphonic acid (HO₃S, NH₂, SO₃H) | A | orange |
| 34 | " | 3-amino-naphthalene-2,7-disulphonic acid (NH₂, HO₃S, SO₃H) | A | " |

EXAMPLE 35

A solution of 25 parts of N-(3-amino-4-methylphenyl)-N'-(β-amino-ethyl)-urea in 250 parts of water and 60 parts of concentrated hydrochloric acid is diazotised at 0° – 5° with a solution of 8.3 parts of sodium nitrite in water. A neutralised solution of 46 parts of 1-(4,8-disulphonaphthyl)-3-methyl-pyrazolone-5 in 400 parts of water is added to the diazonium salt solution, the pH-value is adjusted to 4.5 – 5.0 with 15% strength sodium carbonate solution and the coupling is completed at 0° – 5°. The coupling product is salted out with 80 g of sodium chloride in order to separate it out completely and is filtered off and washed with 400 parts of 10% strength sodium chloride solution. The intermediate product is suspended in 1,800 parts of water and dissolved by adjusting the pH-value to 11, and the solution is cooled to 5° – 10°. 21 parts of 2,4,6-trifluoro-5-chloropyrimidine are added dropwise to the solution over the course of 30 minutes and the pH-value is kept at 9.5 – 10 by means of 1 N sodium hydroxide solution.

After completion of the condensation, the pH-value is lowered to 7. The dyestuff is salted out at 45° by means of 400 parts of sodium chloride, the mixture is stirred somewhat longer, the precipitate is filtered off and washed with 500 ml of 12% strength sodium chloride solution, and the dyestuff, which corresponds to the formula

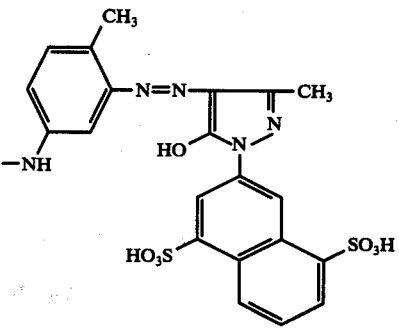

is dried in vacuo at 45°.

1 g of the above dyestuff is dissolved in a dyebath which contains 1.5% of acetic acid, 10% of calcined sodium sulphate and 2% of a levelling agent. 10 g of wool in the form of a hank are introduced into the dyebath, which is warmed to 65° – 70° over the course of 20 minutes. The material is left at this temperature for about 30 minutes. Thereafter, the temperature of the dyebath is raised to 98° over the course of 30 – 45 minutes. The bath is kept at this temperature for about one hour and a light-fast yellow dyeing of very good fulling fastness and potting fastness is obtained.

Analogous dyestuffs are obtained with the diazo components, coupling components and reactive components listed in the table and dyeings obtained with these dyestuffs on cellulose fibres or wool in accordance with one of the above-mentioned dyeing processes have the colour shades listed.

| Example No. | Diazo Component | Coupling Component | Reactive Component | Colour Shade |
|---|---|---|---|---|
| 36 | NH₂—(CH₂)₂—NH—CO—NH—[4-methyl-3-aminophenyl] | 1-(6-naphthyl-3,8-disulpho)-3-methyl-pyrazolone-5 | A | yellow |
| 37 | " | 1-(2,4-disulphophenyl)-3-methyl-pyrazolone-5 | A | " |

-continued

| Example No. | Diazo Component | Coupling Component | Reactive Component | Colour Shade |
|---|---|---|---|---|
| 38 | " | 5-hydroxy-3-carboxy-1-(4-sulfophenyl)pyrazole | B | " |
| 39 | HOCH₂—CH₂—NH—(CH₂)₂—NH—CO—NH— (3-amino-4-methylphenyl) | 1-(6-sulfo-8-sulfo-naphth-3-yl)-3-methyl-5-hydroxypyrazole | A | " |
| 40 | HO₃SO—CH₂—CH₂—NH—CH₂—CH₂—NH—CO—NH— (3-amino-4-methylphenyl) (by dissolving diazo component 39 in concentrated sulphuric acid) | 1-(3-sulfophenyl)-3-methyl-5-hydroxypyrazole | A | yellow |
| 41 | NH₂—(CH₂)₂—NH—CO—NH— (3-amino-4-methoxyphenyl) | 1-(6-sulfo-8-sulfo-naphth-3-yl)-3-methyl-5-hydroxypyrazole | B | reddish-tinged yellow |
| 42 | NH₂—(CH₂)₂—NH—CO—NH—(4-aminophenyl) | " | A | " |
| 43 | " | 1-(5-sulfo-7-sulfo-naphth-2-yl)-3-methyl-5-hydroxypyrazole | A | reddish-tinged yellow |
| 44 | " | 1-(2,4-disulfophenyl)-3-methyl-5-hydroxypyrazole | B | " |

| Example No. | Diazo Component | Coupling Component | Reactive Component | Colour Shade |
|---|---|---|---|---|
| 45 | NH₂—(CH₂)₂—NH—CO—NH—⟨phenyl⟩—NH₂ | pyrazolone with CH₃, HO, N-N, phenyl-2,4-disulfonic acid | C | reddish-tinged yellow |
| 46 | CH₃—NH—(CH₂)₂—N(CH₃)—CO—NH—⟨Cl, NH₂ phenyl⟩ | pyrazolone with CH₃, HO, N-N, naphthyl-disulfonic acid (HO₃S, SO₃H) | A | yellow |
| 47 | NH₂—(CH₂)₄—NH—CO—N(H₃C)—⟨phenyl⟩—NH₂ | " | A | reddish-tinged yellow |
| 48 | CH₃—N(CH₃)—(CH₂)₂—N(CH₃)—CO—N(H₃C)—⟨phenyl with NH₂⟩ | " | B | yellow |

EXAMPLE 49

20 parts of 1-amino-4-bromo-anthraquinone-2-sulphonic acid as the Na salt, 17.5 parts of N-(3-aminophenyl)-N'-(β-amino-ethyl)-urea and 25 parts of sodium bicarbonate are dissolved in 200 parts of water at 65°. 1 part of cuprous chloride is added and 0.5 part of cuprous chloride is again added after 1½ hours and after 3 hours. After 6 hours, the reaction product which has precipitated is filtered off at 50° and washed with 1,000 parts of hot water.

The filter cake is subsequently dissolved, at pH 12, in 800 parts of water at 60°. After slow addition of 15 parts of concentrated hydrochloric acid, the dyestuff which has been precipitated by acidification is filtered off, washed with 500 parts of hot water and dried in a circulating air cabinet at 50°.

19 parts of this intermediate product are introduced, at 10° – 15°, into a mixture of 61 parts of oleum (20% SO₃) and 23 parts of concentrated sulphuric acid. The batch is stirred for a further 7 hours and is then poured onto 320 parts of ice. The dyestuff is salted out with 50 parts of sodium chloride, filtered off and washed with 600 parts of saturated sodium chloride solution until free of sulphate. 23.6 parts of the product obtained are dissolved in 250 parts of water of 20° whilst neutralising the mixture to pH 7 – 75.

7.9 parts of 2,4,6-trifluoro-5-chloropyrimidine are added dropwise to the solution over the course of 30 minutes and the pH-value is kept at 7.0 – 7.5 by means of 1 N sodium hydroxide solution. After completion of the condensation the solution is added dropwise to 350 parts of saturated sodium chloride solution, 50 parts of sodium chloride are further added to the resulting suspension and the dyestuff which has precipitated is filtered off, washed with 300 parts of saturated sodium chloride solution and dried in vacuo at 45°.

It corresponds to the formula

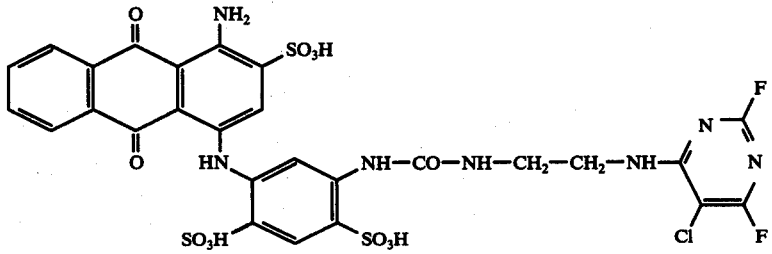

and when printed onto cellulose fabric in accordance with the process of Example 3 gives strong reddish-tinged blue prints which are very fast to washing and to light.

Analogously, it is possible to manufacture further blue anthraquinone dyestuffs of this type by employing appropriate amines containing urea bridges; the components of these dyestuffs are listed in the table below, and using the abovementioned dyeing techniques, the dyestuffs give dyeings which are fast to light and very fast to wet processing on cellulose fibres.
| Example No. | Anthraquinone Component | Reactive Component | Colour Shade |
|---|---|---|---|
| 50 | 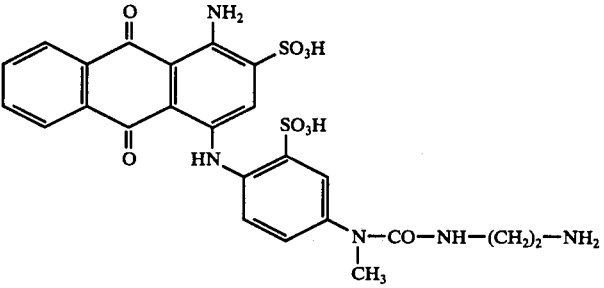 | A | blue |
| 51 | 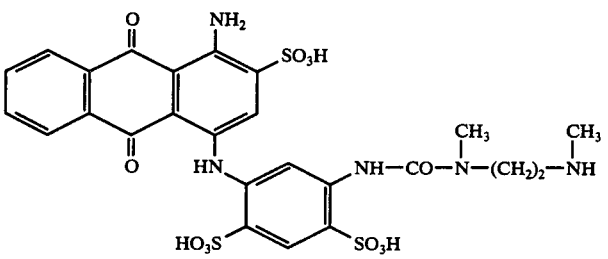 | B | reddish-tinged blue |
| 52 | 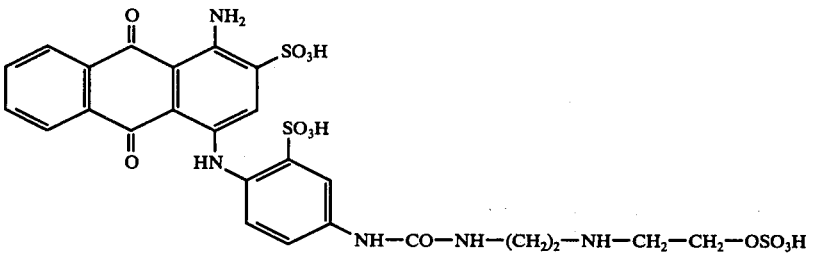 | A | greenish-tinged blue |
| 53 | 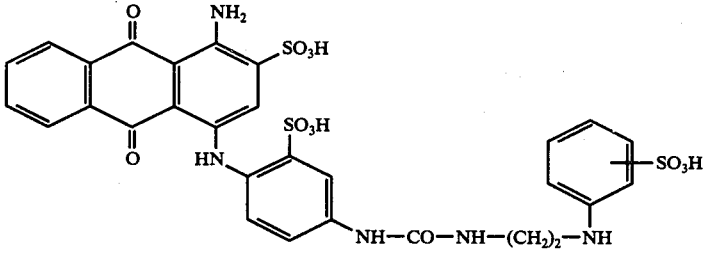 | A | greenish-tinged blue |
| 54 | 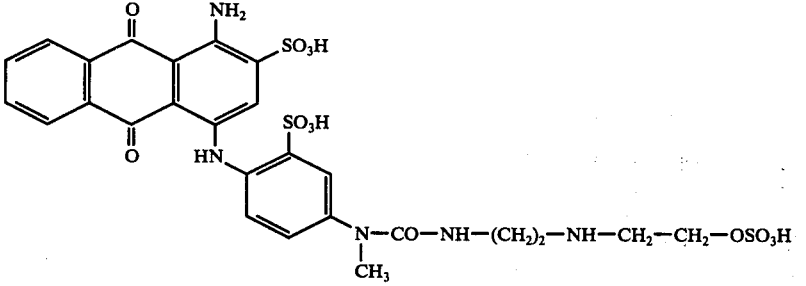 | A | blue |

-continued

| Example No. | Anthraquinone Component | Reactive Component | Colour Shade |
|---|---|---|---|
| 55 | 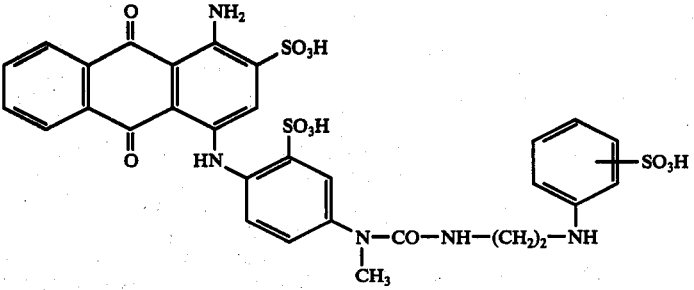 | B | " |
| 56 | 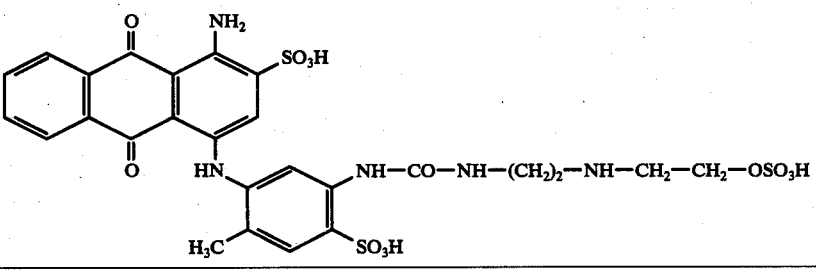 | B | reddish-tinged blue |

EXAMPLE 57

13.8 parts of 1-amino-4-(4'-amino-phenylamino)-anthraquinone-2,2'-disulphonic acid are dissolved in 280 parts of water by neutralisation with sodium hydroxide solution. The pH-value is adjusted to 6, 7.7 parts of chloroformic acid phenyl ester are added dropwise over the course of 45 minutes at 20° and the pH-value is kept at 5 – 6 by means of 1 N sodium carbonate solution. When the consumption of sodium carbonate has stopped and no further starting product is detectable, the dyestuff-phenylurethane solution is run, over the course of 45 minutes, into a mixture of 33.5 parts of ethylenediamine and 51 parts of water at 20°, the temperature being kept at 20° by dropping in 35 parts of ice.

When a sample, after stirring for a further hour, shows no further phenylurethane, the dyestuff is precipitated by dropwise addition of 67 parts of concentrated hydrochloric acid until pH 7 – 7.5 is reached, and at the same time the heat of neutralisation which is liberated is dealt with by dropping in 150 parts of ice. The dyestuff component which has precipitated in a crystalline form is filtered off, washed with 400 parts of 10% strength sodium chloride solution and dried in a stream of air at 50°.

14.7 parts of the dyestuff component obtained are suspended in 680 parts of water and dissolved by adding sodium hydroxide solution until pH 11.5 is reached.

After subsequently carefully adjusting the pH-value to 8.5, 6.3 parts of 2,4,6-trifluoro-5-chloro-pyrimidine are immediately added dropwise over the course of 15 minutes, and a pH-value of 7.5 – 8.0 is maintained in the reaction mixture. When, according to a chromatogram, the condensation is complete and the consumption of sodium hydroxide solution has stopped, the dyestuff solution is heated to 40° – 45°, 87 parts of saturated potassium chloride solution are gradually added over the course of 3 hours and the resulting precipitate is stirred further whilst cooling to 20°. The finely crystalline precipitate is filtered off, the cake is washed with 550 parts of 5% strength potassium chloride solution, and after drying at 45° in vacuo a dyestuff is obtained which corresponds to the formula

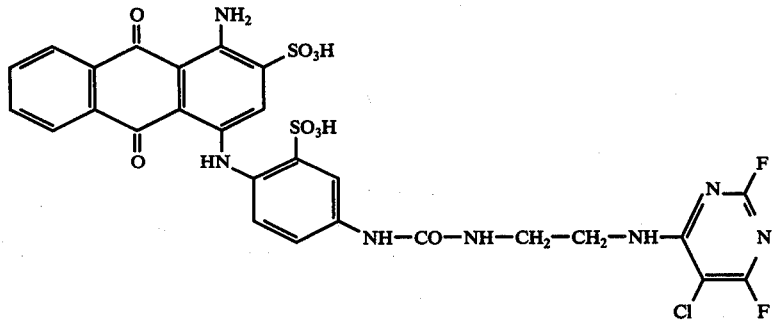

and which, using the process described in Example 35, gives greenish-tinged blue dyeings of very good fastness to light, fulling and patting and of good evenness, on any desired wool materials.

EXAMPLE 58

13.8 parts of 1-amino-4-(4'-amino-phenylamino)-anthraquinone-2,2'-disulphonic acid are reacted with 7.7 parts of chloroformic acid phenyl ester, in the manner indicated in Example 55, to give the phenylurethane. The resulting solution is added dropwise to a mixture of 65 parts of N-(hydroxyethyl)-ethylenediamine and 200 parts of water at 20°. The mixture is stirred fo a further 2 hours at 20°, the pH-value is then lowered to 5 – 6 by dropwise addition of 98 parts of concentrated hydrochloric acid whilst keeping the temperature at 20° by external cooling, and 80 parts of sodium chloride are then added. The crystalline product is filtered off and washed with 300 parts of 20% strength sodium chloride solution.

The filter cake is dissolved in 500 parts of water at 20° by adjusting the pH-value to 11.0. The solution is cooled to 5° – 10° and 6.5 parts of 2,4,6-trifluoro-5-chloropyrimidine are added dropwise over the course of 15 minutes. During the condensation the pH-value is kept at 8.5 – 9.0 by means of 1 N sodium hydroxide filtered off and washed with 300 parts of 10% strength hydrochloric acid containing 10% of dissolved sodium chloride.

The resulting intermediate product is dissolved in 200 parts of water at pH 7 and 20°, whilst being neutralised.

6.0 parts of 2,4,6-trifluoro-5-chloropyrimidine are added dropwise to the solution over the course of 20 minutes and during the condensation the pH-value is kept at 6.5 – 7.0 by means of 1 N sodium hydroxide solution. When the consumption of alkali has subsided, the dyestuff solution is added dropwise to a suspension of 40 parts of potassium chloride in 400 parts of saturated potassium chloride solution, the mixture is stirred for a further 30 minutes and the dyestuff which has precipitated is filtered off, washed with 200 parts of saturated potassium chloride solution and dried. It corresponds to the formula

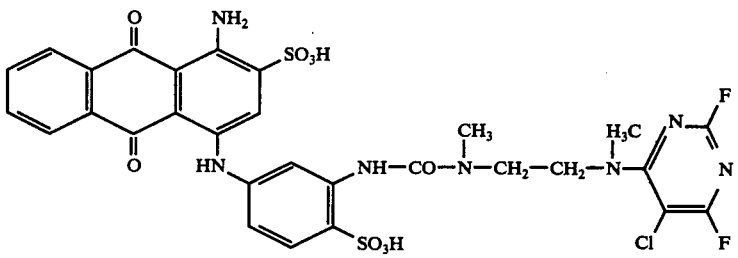

solution. After completion of the reaction, the dyestuff is salted out by dropwise addition of 80 parts of saturated sodium chloride solution, filtered off, washed with 400 parts of 10% strength sodium chloride solution and dried in vacuo at 35°.

It corresponds to the formula and dyes cellulose fibres, in accordance with the above-mentioned dyeing techniques, in clear blue shades having very good light fastness and wet fastness.

EXAMPLE 60

21 parts of 1-amino-4-(4'-amino-cyclohexylamino)-

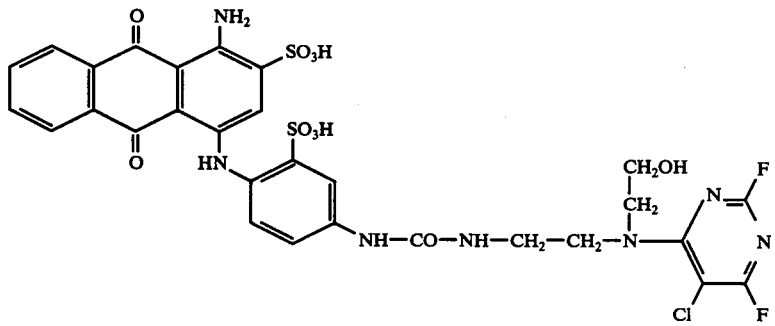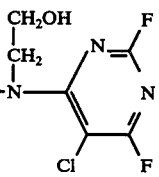

and gives dyeings in greenish-tinged blue shades, which are very fast to light, fulling and potting, on wool yarns or wool fabrics.

EXAMPLE 59

20 parts of 1-amino-4-(3'-amino-phenylamino)-anthraquinone-2,4'-disulphonic acid are dissolved in 160 parts of water whilst neutralising the mixture to pH = 7. 11 parts of chloroformic acid phenyl ester are added dropwise to the solution over the course of 30 minutes and during the condensation the pH-value is kept at 5 – 6. After completion of the reaction, the resulting solution of the dyestuff-phenylurethane is added dropwise, at 20°, to a mixture of 65 parts of N,N'-dimethylethylenediamine and 130 parts of water. After 1 – 2 hours, the condensation to give the dyestuff ureide is complete. 340 parts of concentrated hydrochloric acid are now added dropwise at 10° – 15° whilst cooling externally and the product which has precipitated is anthraquinone-2-sulphonic acid are suspended in 440 parts of water and dissolved by adding sodium hydroxide solution until a pH-value of 12 is reached.

A precipitate suitable for the reaction is produced by returning the pH-value of 8.5, 12.5 parts of chloroformic acid phenyl ester are now added dropwise over the course of 45 minutes and the pH-value in the reaction mixture is kept at 8.0 – 8.5 by means of 1 N sodium hydroxide solution. After completion of the condensation, the pH-value is adjusted to 7, 73 parts of potassium chloride are added to the mix and the whole is heated to 90° – 95°. The phenylurethane of the dyestuff, which has precipitated, is filtered off hot and washed with 350 parts of 10% strength potassium chloride solution. The moist paste is introduced into a mixture of 45 parts of N-(hydroxy-ethyl)-ethylenediamine and 90 parts of water which has been warmed to 50° and the mixture is stirred for a further 2 hours at this temperature, until the formation of the ureide substance is complete.

The resulting solution is cooled to 20° and is then added dropwise, over the course of 30 minutes, to 150 parts of a 40% strength sodium bisulphite solution. The product which has precipitated is filtered off, washed with 50 parts of saturated sodium chloride solution and dried in a stream of air at 70°.

For esterification of the terminal hydroxyl group, the dried product is introduced uniformly over the course of 3 hours into a mixture of 68 parts of oleum (20% SO$_3$) and 33 parts of concentrated sulphuric acid, at 20°. After stirring for 2 hours, the batch is introduced into a mixture of 280 parts of ice and 220 parts of water and the resulting solution containing sulphuric acid is neutralised at 20° by careful dropwise addition of about 145 parts of 50% strength sodium hydroxide solution, until a pH-value of 7 is reached.

The heat of neutralisation which is generated is dealt with by dropping in 380 parts of ice.

10.6 parts of 2,4,6-trifluoro-5-chloro-pyrimidine are added dropwise to the resulting solution over the course of 30 minutes and the pH-value is kept at 7.0 – 7.5 by means of 1 N sodium hydroxide solution. After about 4 hours the condensation is complete. The resulting dyestuff suspension is slowly run into 400 parts of saturated sodium chloride solution at 45° and additionally, 170 parts of solid sodium chloride are finally added. The dyestuff suspension is cooled to 20° and stirred for a further 12 hours. The mixture is filtered, the cake is washed with 200 parts of 20% strength sodium chloride solution, and after drying in vacuo at 40° the dyestuff of the formula

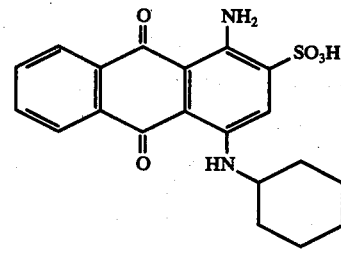
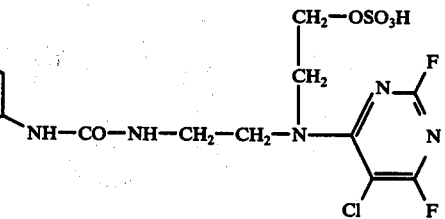

is obtained, which, using the dyeing and printing processes described above, yields strong, brilliant blue dyeings and prints of very good light fastness and wet fastness on cellulose fibres.

Analogously to Examples 57 – 60, it is possible to synthesise further anthraquinone dyestuffs, of which the anthraquinone components and reactive components, obtained by varying the starting materials are summarised in the table below, and which, using the abovementioned dyeing processes, give the colour shades indicated on wool and cellulose fibres.

| Ex. No. | Anthraquinone Component | Reactive Component | Colour Shade |
|---|---|---|---|
| 61 | (structure with NH-CO-NH-CH$_2$-CH$_2$-NH-CH$_2$-CH$_2$-OSO$_3$H) | A | greenish-tinged blue |
| 62 | (structure with NH-CO-NH-CH$_2$-CH$_2$-NH$_2$) | A | " |
| 63 | (structure with SO$_3$H and NH-CO-NH-CH$_2$-CH$_2$-NH$_2$) | B | " |

-continued
| Ex. No. | Anthraquinone Component | Reactive Component | Colour Shade |
|---|---|---|---|
| 64 | 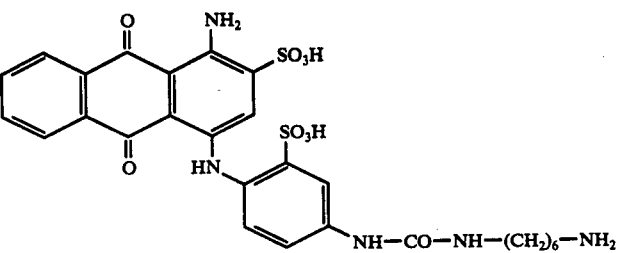 | A | " |
| 65 | 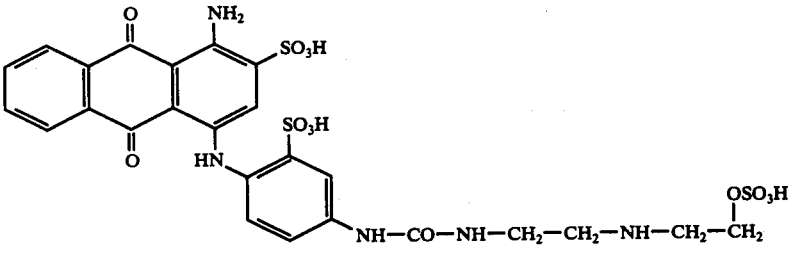 | A | " |
| 66 | 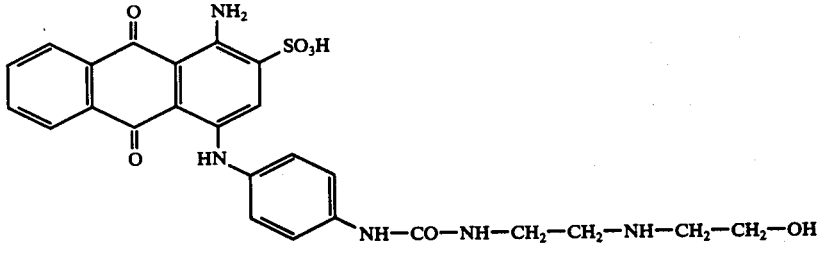 | A | " |
| 67 | 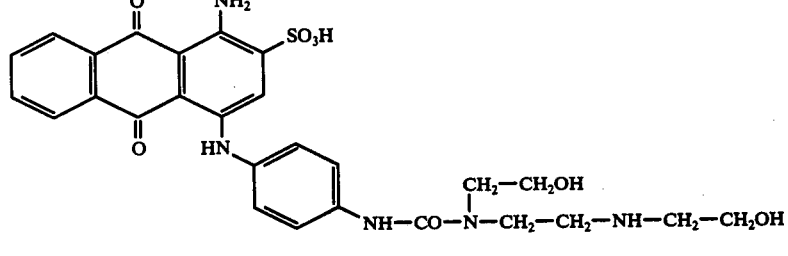 | A | " |
| 68 | 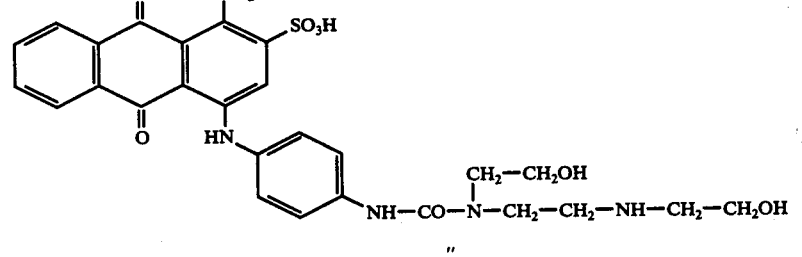 | B | " |
| 69 | " | C | " |
| 70 | 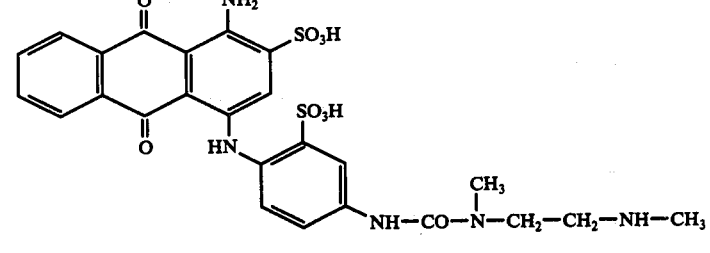 | A | " |

| Ex. No. | Anthraquinone Component | Reactive Component | Colour Shade |
|---|---|---|---|
| 71 | 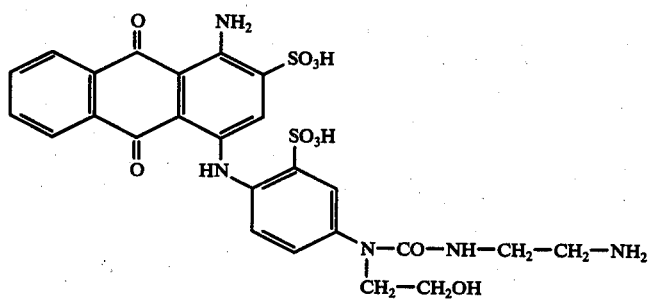 | A | blue |
| 72 | 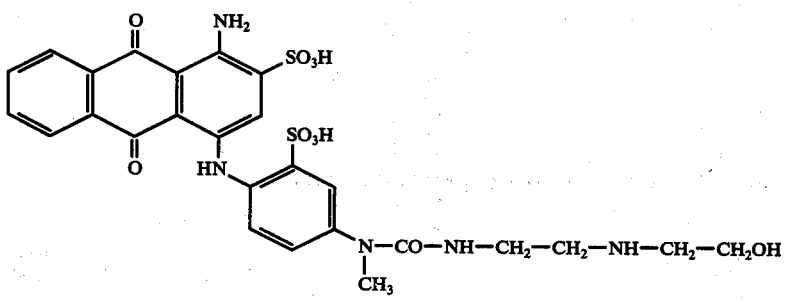 | A | " |
| 73 | " | B | " |
| 74 | 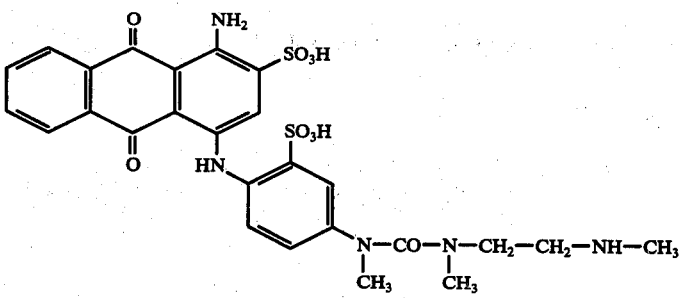 | A | " |
| 75 | 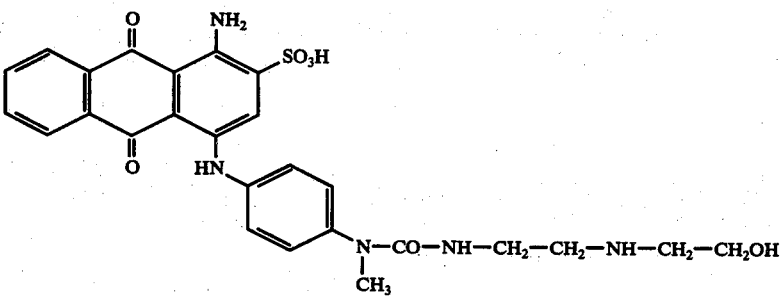 | A | " |
| 76 | 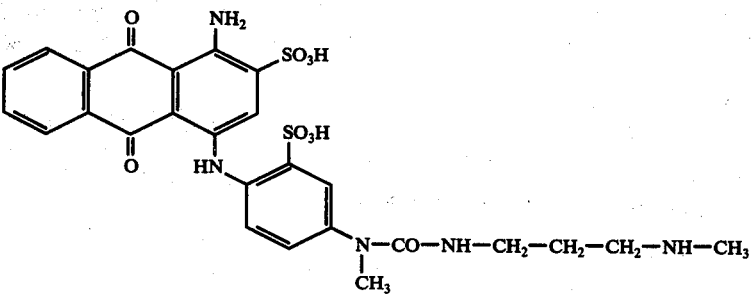 | B | " |

-continued

| Ex. No. | Anthraquinone Component | Reactive Component | Colour Shade |
|---|---|---|---|
| 77 | 1-amino-4-[(4-(N-methyl-N-(aminoethylcarbamoyl))-2-sulfophenyl)amino]anthraquinone-2-sulfonic acid | A | " |
| 78 | 1-amino-4-[(4-(N-methyl-N-((2-hydroxyethylaminoethyl)carbamoyl))-2-sulfophenyl)amino]anthraquinone-2-sulfonic acid | A | " |
| 79 | 1-amino-4-[(3-((2-hydroxyethylaminoethyl)ureido)-4-sulfophenyl)amino]anthraquinone-2-sulfonic acid | A | reddish-tinged blue |
| 80 | 1-amino-4-[(3-((2-hydroxyethylaminoethyl)ureido)-4-sulfophenyl)amino]anthraquinone-2-sulfonic acid | B | " |
| 81 | 1-amino-4-[(3-(aminoethylureido)-4-sulfophenyl)amino]anthraquinone-2-sulfonic acid | A | " |
| 82 | 1-amino-4-[(5-(aminoethylureido)-4-methyl-2-sulfophenyl)amino]anthraquinone-2-sulfonic acid | A | blue |

-continued
| Ex. No. | Anthraquinone Component | Reactive Component | Colour Shade |
|---|---|---|---|
| 83 | 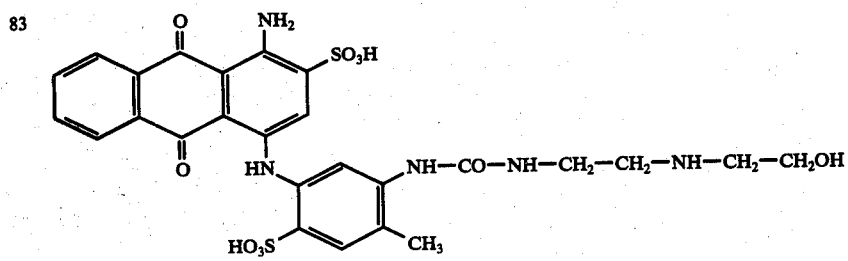 | B | " |
| 84 | 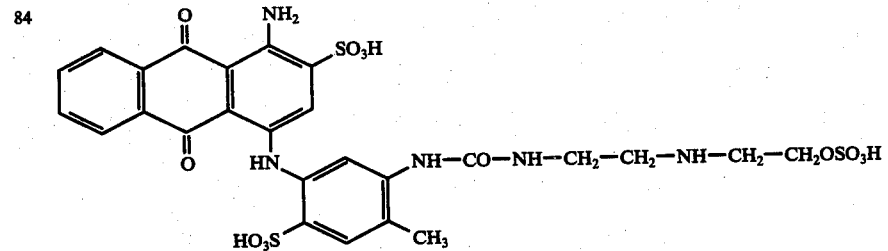 | A | " |
| 85 | 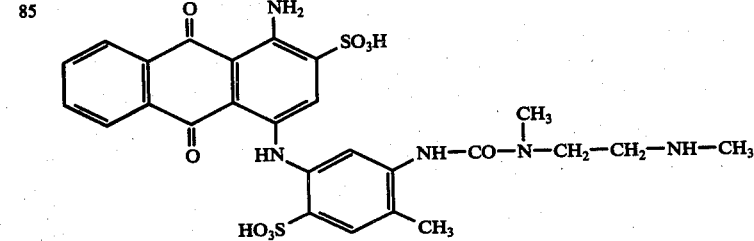 | A | " |
| 86 | 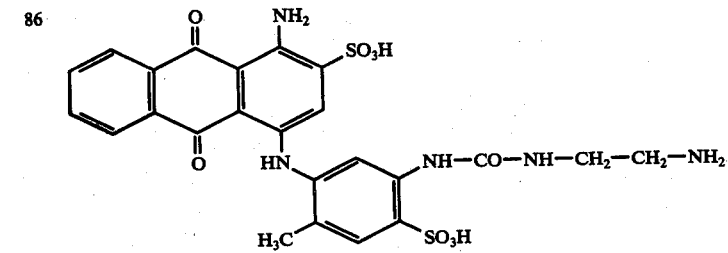 | A | reddish-tinged blue |
| 87 | " | B | " |
| 88 | 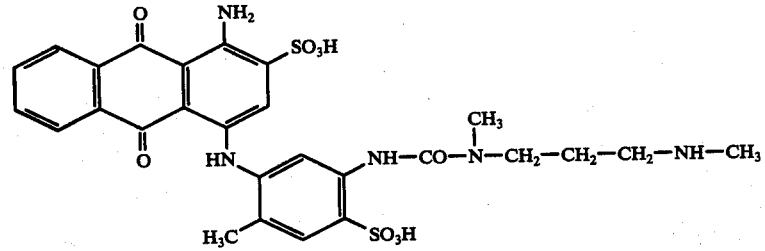 | A | blue |
| 89 | 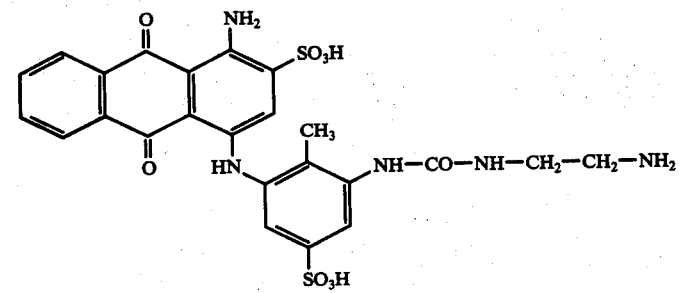 | A | reddish-tinged blue |

-continued
| Ex. No. | Anthraquinone Component | Reactive Component | Colour Shade |
|---|---|---|---|
| 90 | 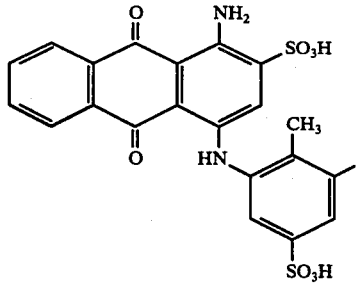 | B | " |
| 91 | 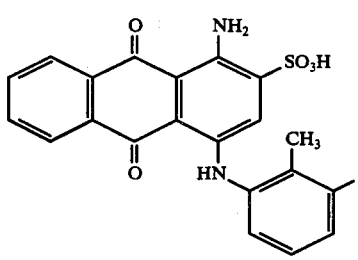 | A | blue |
| 92 | 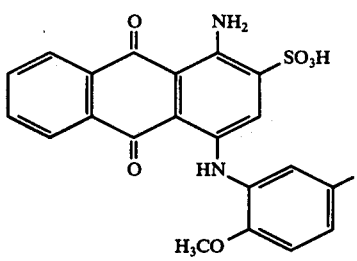 | A | greenish-tinged blue |
| 93 | 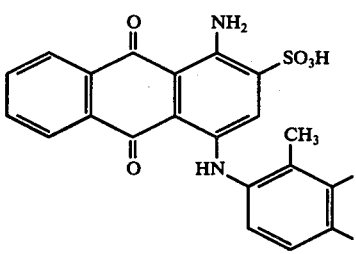 | B | reddish-tinged blue |
| 94 | 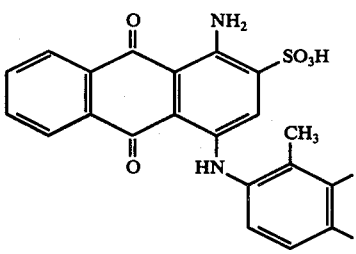 | A | " |
| 95 | 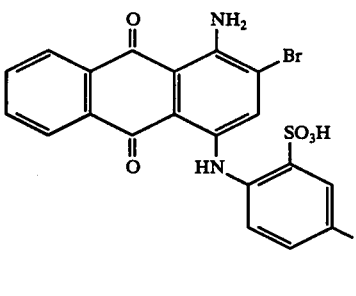 | A | blue |

-continued
| Ex. No. | Anthraquinone Component | Reactive Component | Colour Shade |
|---|---|---|---|
| 96 | 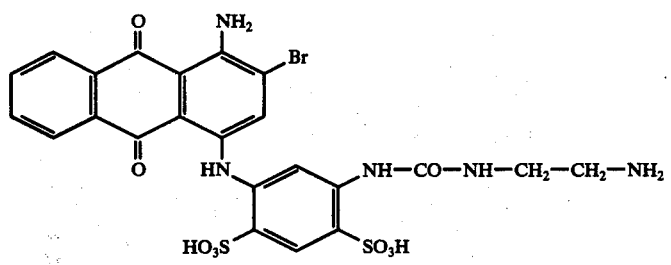 | A | reddish-tinged blue |
| 97 | 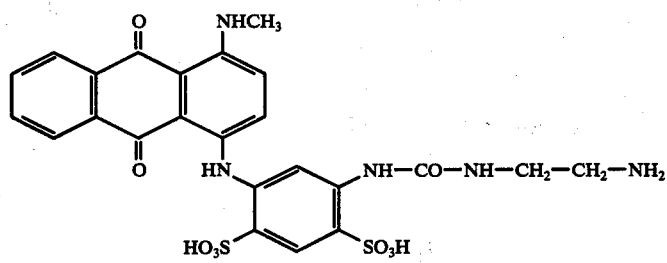 | A | blue |
| 98 | 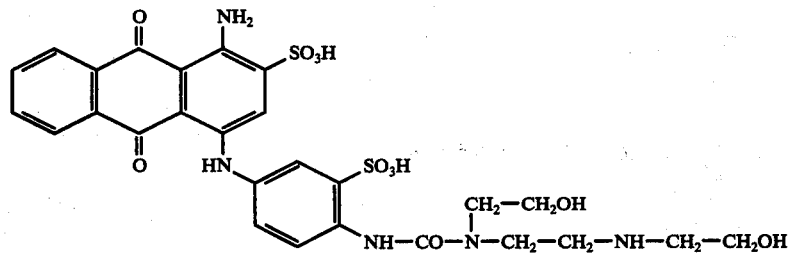 | B | greenish-tinged blue |
| 99 | 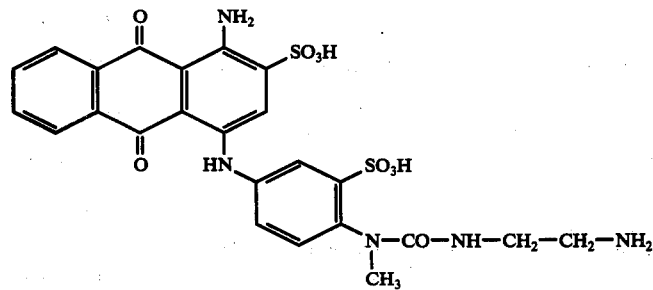 | A | blue |
| 100 | 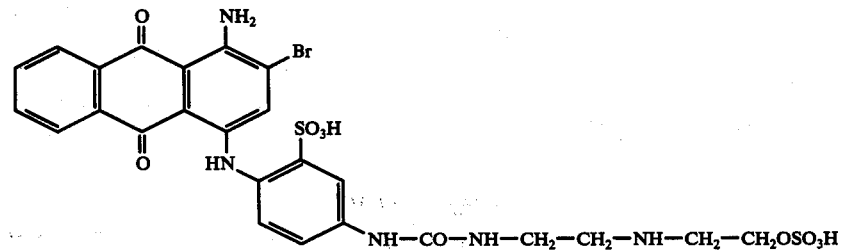 | A | " |
| 101 | 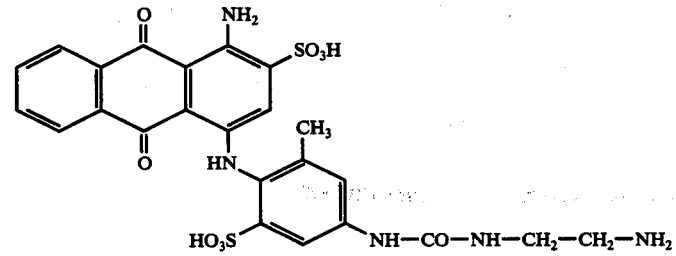 | B | reddish-tinged blue |

-continued

| Ex. No. | Anthraquinone Component | Reactive Component | Colour Shade |
|---|---|---|---|
| 102 | 1-amino-4-[(2-sulfo-4-methyl-5-(CH₂—NH—CO—NH—CH₂—CH₂—NH₂))anilino]anthraquinone-2-sulfonic acid | A | blue |
| 103 | 1-amino-4-[(2,6-dimethyl-4-sulfo-3-(CH₂—NH—CO—NH—CH₂—CH₂—NH₂))anilino]anthraquinone-2-sulfonic acid | A | reddish-tinged blue |
| 104 | 1-amino-4-[(2,6-dimethyl-3,5-dimethyl-4-sulfo-(NH—CO—NH—CH₂—CH₂—NH₂))anilino]anthraquinone-2-sulfonic acid | A | " |
| 105 | 1-amino-4-[(2-sulfo-4-(CH₂—N(CH₃)—CO—NH—CH₂—CH₂—NH—CH₂—CH₂OH))anilino]anthraquinone-2-sulfonic acid | A | blue |
| 106 | 1-amino-4-[(2-sulfo-4-(NH—CO—N(C₂H₅)—CH₂—CH₂—NH—C₂H₅))anilino]anthraquinone-2-sulfonic acid | B | greenish-tinged blue |
| 107 | 1-amino-4-[(2-sulfo-4-(N(CH₃)—CO—NH—CH₂—CH₂—NH—CH₂—CH₃))anilino]anthraquinone-2-sulfonic acid | A | blue |

| Ex. No. | Anthraquinone Component | Reactive Component | Colour Shade |
|---|---|---|---|
| 108 | (anthraquinone with NH₂, SO₃H, and —HN—cyclohexyl—NH—CO—NH—CH₂—CH₂—NH—C₆H₄—SO₃H) | A | reddish-tinged blue |
| 109 | (anthraquinone with NH₂, SO₃H, and —HN—cyclohexyl—NH—CO—N(CH₂—CH₂OSO₃H)—CH₂—CH₂—NH—CH₂—CH₂OSO₃H) | A | " |
| 110 | (anthraquinone with NH₂, SO₃H, and —HN—cyclohexyl—NH—CO—NH—CH₂—CH₂—NH—CH₂—CH₂OH) | B | " |
| 111 | " | C | " |
| 112 | (anthraquinone with NH₂, SO₃H, SO₃H, and —HN—cyclohexyl—NH—CO—NH—CH₂—CH₂—N(H)—CH₂—CH₂OSO₃H) | A | " |
| 113 | (anthraquinone with NH₂, SO₃H, HO₃S, and —HN—C₆H₄—NH—CO—NH—CH₂—CH₂—NH—CH₂(CH₂OSO₃H)) | A | greenish-tinged blue |
| 114 | (anthraquinone with NH₂, SO₃H, HO₃S (5+8), and —HN—phenyl(SO₃H,CH₃)—NH—CO—NH—(CH₂)₂—NH₂) | A | " |

EXAMPLE 115

If, in Example 60, 10.0 parts of 2,4,5,6-tetrafluoropyrimidine are employed instead of the 10.6 parts of 2,4,6-trifluoro-5-chloropyrimidine and in other respects the batch is worked up analogously, a dyestuff corresponding to the formula

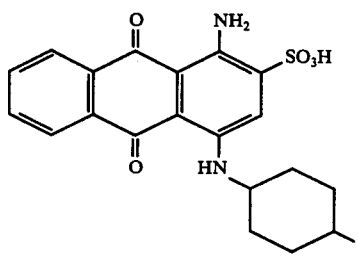

is obtained after drying in vacuo at 30°.

3 parts of this dyestuff are worked into a paste with 5 parts of water at 20° and are dissolved by means of 65 parts of water at 20°. 30 parts of a 10% strength sodium carbonate solution are added to this solution. 20 parts of cotton fabric or rayon fabric are padded on a padder with the liquor obtained, in such a way that the liquor uptake of the fabric is 80% of its dry weight. The fabric is rolled up and kept for 24 hours at 25° under such conditions that no moisture can escape. Thereafter the dyeing is finished by thorough rinsing with water, followed by soaping and renewed rinsing and drying. A brilliant, slightly reddish-tinged blue dyeing of very good light fastness and wet fastness is obtained.

EXAMPLE 116

20 parts of N-(3-amino-4-sulphophenyl)-N'-(β-aminoethyl)-urea (manufactured by condensation of 18 parts of 1,3-diamino-benzene-4-sulphonic acid with 18.2 parts of chloroformic acid phenyl ester and introduction of the isolated phenylurethane into 65 parts of ethylenediamine and 130 parts of water) are dissolved in 120 parts of water. The pH-value is adjusted to 7, 15.2 parts of 2,4,6-trifluoro-5-chloropyrimidine are added dropwise at 0° – 5° and the above pH-value is maintained by means of 1 N sodium hydroxide solution.

When a chromatogram indicates the end of the condensation and no further sodium hydroxide solution is consumed, 5.05 parts of sodium nitrite are added to the solution, and the solution is then added dropwise over the course of 2 hours to a mixture of 300 parts of water and 30 parts of concentrated hydrochloric acid, containing 0.1 part of sodium nitrite, at 0° – 5°. The mixture is stirred for a further hour and small amounts of excess nitrite are destroyed.

120 parts of urea are added to the suspension of the diazonium salt, the mixture is stirred somewhat longer and a neutralised solution of 18.5 parts of 2-N-methylamino-8-hydroxy-naphthalene-6-sulphonic acid in 100 parts of water is then run in over the course of 1 hour. Thereafter the pH-value is adjusted to pH 4 – 4.5 by means of 20% strength sodium acetate solution. After completion of coupling, the dyestuff solution is diluted with 600 parts of water and subsequently salted out with 120 parts of potassium chloride at 45°. The mixture is filtered and the cake is washed with 400 parts of 10% strength potassium chloride solution and dried in vacuo at 40°. The resulting dyestuff corresponds to the formula

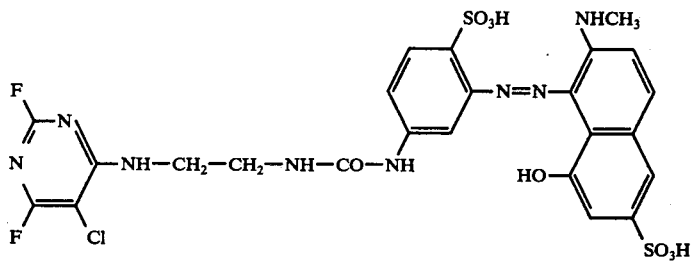

and dyes wool and cotton in accordance with the above-mentioned dyeing processes in bluish-tinged red shades having good light fastness and wet fastness, especially fastness to fulling and potting on wool.

When used for dyeing in combination with, say, the dyestuff of Example 57, dyeings of good surface evenness and evenness on the fibre are obtained on wool.

EXAMPLE 117

20 parts of N-(3-amino-4-sulphophenyl)-N'-(β-aminoethyl)-urea are initially reacted with 2,4,6-trifluoro-5-chloropyrimidine in the manner described in Example 116, and the condensation product is subsequently diazotised.

A solution of 16.3 parts of 2-amino-naphthalene-5-sulphonic acid in 100 parts of water is added dropwise to the suspension of the diazonium salt over the course of 15 minutes at 0° – 5°, thereafter the pH-value is adjusted to 5.0 with 15% strength sodium carbonate solution and the mixture is then stirred overnight. The dyestuff is salted out with 105 parts of sodium chloride, filtered off and washed with 350 parts of 15% strength sodium chloride solution. After drying in vacuo at 45°, a dyestuff of the formula

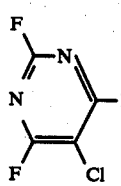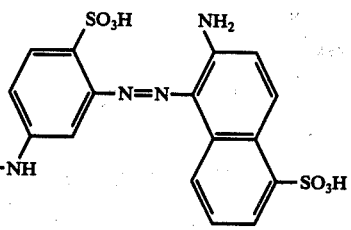

is obtained which dyes wool and cotton in accordance with the dyeing processes indicated above in orange shades which are very fast to light and to wet processing, and which on wool, in combination with the dyestuff of Example 58, gives combination dyeings of good surface evenness and evenness on the fibre.

EXAMPLE 118

20 parts of N-(3-amino-4-sulphophenyl)-N'-(β-aminoethyl)-urea are first reacted with 2,4,6-trifluoro-5-chloropyrimidine in the manner described in Example 116 and the condensation product is subsequently diazotised.

A solution of 9.6 parts of 3-methylpyrazolone-5 in 85 parts of water and 20 parts of concentrated hydrochloric acid is added dropwise to the diazo suspension and the pH-value of the coupling suspension is adjusted to 4.5 and, after 5 hours, to 6.0, and the mixture is stirred overnight. Thereafter the dyestuff is salted out as 45° by means of 90 parts of sodium chloride and the suspension is cooled to 20°. The product which has precipitated is filtered off, washed with 650 parts of 5% strength sodium chloride solution and dried at 45°.

The dyestuff obtained corresponds to the formula

EXAMPLE 119

20 parts of N-(4-amino-3-sulphophenyl)-N'-(β-aminoethyl)-urea (manufactured by condensation of 18 parts of 1,4-diaminobenzene-2-sulphonic acid with 18.3 parts of chloroformic acid phenyl ester and introduction of the salted-out phenylurethane in 65 parts of ethylenediamine and 130 parts of water) are dissolved in 120 parts of water. After adjusting the pH-value to 7.0 – 7.5, 15.5 parts of 2,4,6-trifluoro-5-chloropyrimidine are added dropwise over the course of 1 hour at 0°– 5° and the above pH-value is maintained during the condensation by means of 1 N sodium hydroxide solution. When the consumption of sodium hydroxide solution has stopped, 5.1 parts of sodium nitrite are added to the solution obtained, which is then added dropwise to a mixture of 260 parts of water, 31 parts of concentrated hydrochloric acid and 0.05 part of sodium nitrite at 0° – 5°. The diazotisation is completed by subsequent stirring and a little excess nitrous acid is eliminated by means of amidosulphonic acid.

A neutralised solution of 23.5 parts of 1-(2',5'-dichloro-4'-sulphophenyl)-3-methyl-pyrazolone-5 in 160 parts of water is slowly added to the diazo suspension

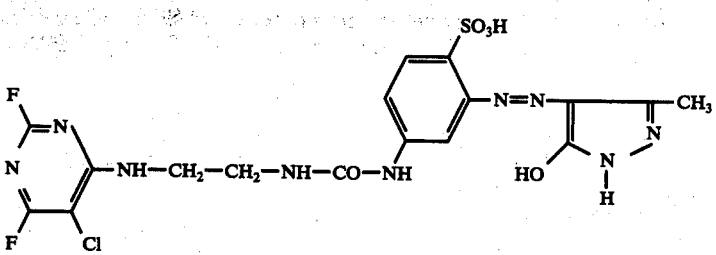

and dyes wool and cotton in accordance with the processes described above, from a dilute liquor, in greenish-tinged yellow shades of excellent light fastness and wet fastness, especially fastness to fulling and potting on wool, and light fastness on cotton.

and the pH-value in the coupling mixture is subsequently adjusted to 5 by means of 15% strength sodium carbonate solution. The mixture is stirred overnight and thereafter the dyestuff is salted out at 20° by means of 160 parts of sodium chloride, filtered off and washed with 550 parts of saturated sodium chloride solution. After drying, a dyestuff is obtained which corresponds to the formula

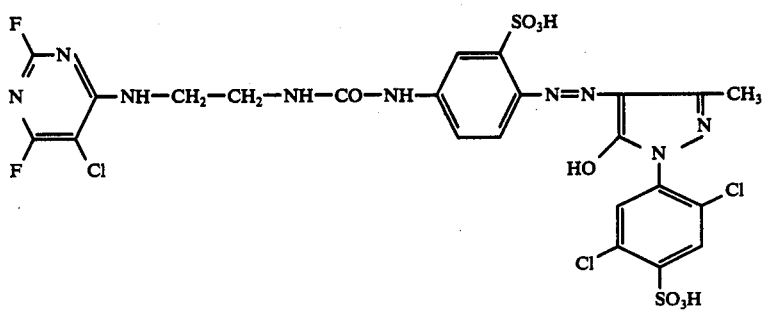

and which dyes cellulose fibres and wool, in accordance with the dyeing techniques described above, in reddish-tinged yellow shades which are fast to light and to wet processing.

EXAMPLE 120

20 parts of N-(4-amino-3-sulphophenyl)-N'-(β-aminoethyl)-urea are first reacted with 2,4,6-trifluoro-5-chloropyrimidine in the manner indicated in Example 119. The solution of the condensation product is subsequently diazotised.

180 parts of urea are then added to the suspension of the diazonium salt and thereafter a neutralised solution of 18.5 parts of 2-amino-8-hydroxy-naphthalene-6-sulphonic acid in 110 parts of water is run in over the course of 30 minutes. The pH-value is adjusted to 4.5 by means of 20% strength sodium acetate solution and the coupling is completed by stirring overnight. The dyestuff is washed at room temperature with 70 parts of potassium chloride and dried in vacuo at 40°. It corresponds to the formula 61, 70 or 71, dyeings of good surface-evenness and evenness on the fibre are obtained on wool.

EXAMPLE 121

20 parts of N-(4-amino-3-sulphophenyl)-N'-(β-aminoethyl)-urea are reacted with 2,4,6-trifluoro-5-chloropyrimidine as in Example 119, and the resulting solution of the condensation product is diazotised.

A neutralised solution of 20.4 parts of 2-acetylamino-5-hydroxy-naphthalene-7-sulphonic acid is added to the diazo suspension at 0° – 5° and the pH-value is adjusted by means of 15% strength sodium carbonate solution, initially to 5.0 and then, after 2 hours, to 7.0. The dyestuff which has partially precipitated is further salted-out with 40 parts of NaCl, filtered off and washed with 500 parts of 8% strength sodium chloride solution. After drying, a dyestuff which corresponds to the formula

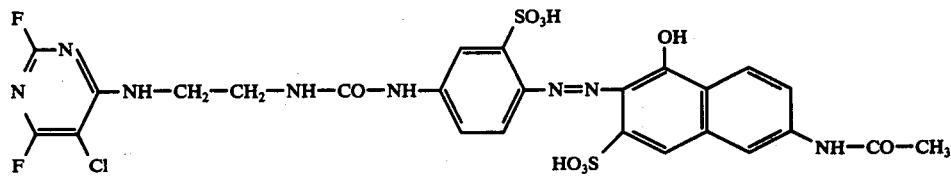

is obtained, which dyes wool and cotton, in accordance with the known dyeing processes, in scarlet-red shades which are fast to light and very fast to wet processing.

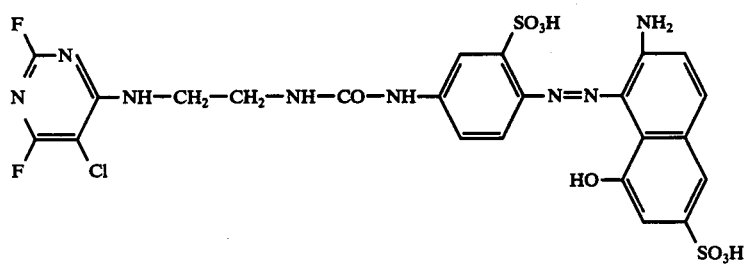

and dyes cellulose fibres and wool, in accordance with the dyeing processes mentioned, in somewhat bluish-tinged red shades of very good light fastness and wet fastness. In combination with the dyestuffs of Examples If the diazo components D and E containing the 2,4,6-trifluoro-5-chloropyrimidine radical are reacted with the coupling components listed in the table which follows, at the indicated pH-value of the coupling medium, further dyestuffs are obtained, whereof the colour shades on cellulose fibres and wool are indicated.

D = 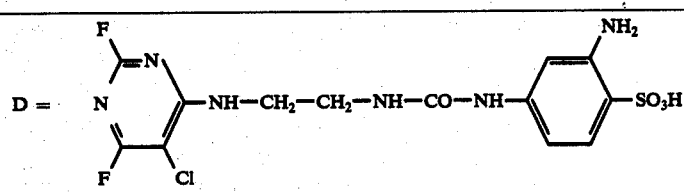

E = 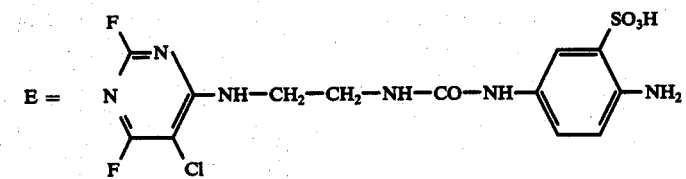

| Example No. | Diazo Component | Coupling Component | pH-Value of the Coupling Medium | Colour Shade |
|---|---|---|---|---|
| 122 | D | ![](OH, NH₂, HO₃S naphthalene) | 4 – 5 | red |
| 123 | D | ![](OH, NH—CH₂—CH₂—OH, HO₃S naphthalene) | 4 – 5 | bluish-tinged red |
| 124 | E | " | 4 – 5 | " |
| 125 | D | ![](OH, NHCH₃, HO₃S naphthalene) | 4 – 5 | " |
| 126 | D | ![](OH, NH—COCH₃, HO₃S naphthalene) | 6 | reddish-tinged orange |
| 127 | D | ![](HO, NH—COCH₃, HO₃S, SO₃H naphthalene) | 6 – 7 | red |
| 128 | D | ![](HO, NH—CO—C₆H₅, HO₃S, SO₃H naphthalene) | 7 | bluish-tinged red |
| 129 | E | " | 7 | reddish-tinged violet |
| 130 | D | ![](NH₂, HO₃S naphthalene) | 5 | orange |
| 131 | E | " | 5 | " |

-continued

D = [2,6-difluoro-5-chloro-pyrimidin-4-yl]–NH–CH$_2$–CH$_2$–NH–CO–NH–[3-amino-4-sulfophenyl]

E = [2,6-difluoro-5-chloro-pyrimidin-4-yl]–NH–CH$_2$–CH$_2$–NH–CO–NH–[4-amino-3-sulfophenyl]

| Example No. | Diazo Component | Coupling Component | pH-Value of the Coupling Medium | Colour Shade |
|---|---|---|---|---|
| 132 | D | 2-amino-5,7-disulfo-naphthalene (HO$_3$S-, SO$_3$H-, NH$_2$) | 5 | " |
| 133 | E | " | 5 | " |
| 134 | E | 2-amino-5-sulfo-naphthalene | 5 | " |
| 135 | D | 3-amino-2,7-disulfo-naphthalene | 5 | " |
| 136 | D | 2-hydroxy-6,8-disulfo-naphthalene | 8 – 9 | " |
| 137 | E | " | 9 | reddish-tinged orange |
| 138 | D | 3-methyl-5-amino-1-(3-sulfophenyl)-pyrazole | 4 – 5 | greenish-tinged yellow |
| 139 | E | " | 4 – 5 | " |
| 140 | D | 3-methyl-5-hydroxy-1-(4-sulfophenyl)-pyrazole | 5 | yellow |
| 141 | E | " | 5 | reddish-tinged yellow |

-continued

D = [2,6-difluoro-5-chloro-pyrimidin-4-yl]—NH—CH₂—CH₂—NH—CO—NH—[3-amino-4-sulfo-phenyl]

E = [2,6-difluoro-5-chloro-pyrimidin-4-yl]—NH—CH₂—CH₂—NH—CO—NH—[3-sulfo-4-amino-phenyl]

| Example No. | Diazo Component | Coupling Component | pH-Value of the Coupling Medium | Colour Shade |
|---|---|---|---|---|
| 142 | D | 1-(4-sulfophenyl)-3-carboxy-5-hydroxy-pyrazole | 5 | yellow |
| 143 | E | " | 5 | reddish-tinged yellow |
| 144 | D | 1-(2,5-dichloro-4-sulfophenyl)-3-methyl-5-hydroxy-pyrazole | 5 | greenish-tinged yellow |
| 145 | D | 1-(2-chloro-6-methyl-4-sulfophenyl)-3-methyl-5-hydroxy-pyrazole | 5 | " |
| 146 | D | 1-(2,5-disulfophenyl)-3-methyl-5-hydroxy-pyrazole | 5 | " |
| 147 | E | 3-methyl-5-hydroxy-pyrazole | 5 – 6 | reddish-tinged yellow |

-continued

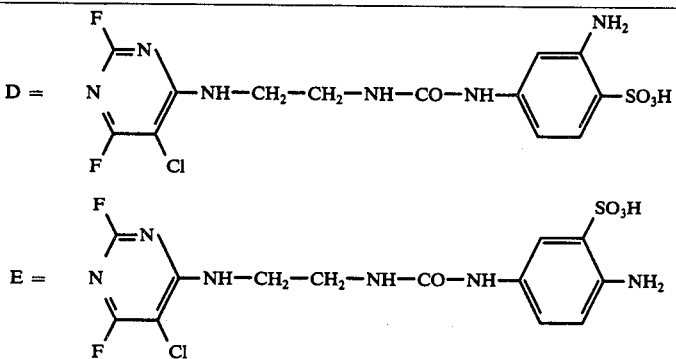

| Example No. | Diazo Component | Coupling Component | pH-Value of the Coupling Medium | Colour Shade |
|---|---|---|---|---|
| 148 | D | ![HO, SO₃H naphthalene with HO₃S and SO₃H] | 7 | reddish-tinged orange |
| 149 | D | ![HO, SO₃H naphthalene with HO₃S] | 7 | " |
| 150 | D | ![OH naphthalene with HO₃S and NH—CO—CH₂—SO₃H] | 7 | " |
| 151 | E | " | 7 | yellowish-tinged red |
| 152 | D | ![OH naphthalene with HO₃S and NH-phenyl-SO₃H] | 7 – 8 | brown |
| 153 | E | " | 7 – 8 | red-brown |
| 154 | D | " | 2 | bluish-tinged red |

EXAMPLE 155

20 parts of N-(4-amino-3-sulphophenyl)-N'-(β-aminoethyl)-urea are dissolved in 300 parts of water and 31 parts of concentrated hydrochloric acid. 5.1 parts of sodium nitrite in 50 parts of water are added dropwise to the solution until excess nitrous acid is detected. The mixture is stirred for a further 30 minutes, traces of excess nitrous acid are eliminated and a neutral solution of 18.5 parts of 1-(3'-sulphophenyl)-3-methylpyrazolon-5-imide in 180 parts of water is then run into the diazonium salt solution.

The pH-value of the coupling mixture is adjusted by means of 15% strength sodium carbonate solution initially to 4.5 and after 4 hours to 5.5. After stirring overnight, the coupling is complete.

The fully coupled suspension is now adjusted to pH 8 with sodium hydroxide solution, 16 parts of 2,4,6-trifluoro-5-chloropyrimidine are added dropwise over the course of 1 hour at 0° – 5° and the pH-value is kept at 9.0 – 9.5. After completion of the condensation, the resulting suspension is heated to 45°, treated with 40 parts of sodium chloride and stirred slowly until cold. The dyestuff is filtered off at 20°, washed with 400 parts of 5% strength sodium chloride solution and dried in vacuo at 40°. It is identical to the dyestuff of Example 138 and corresponds to the formula

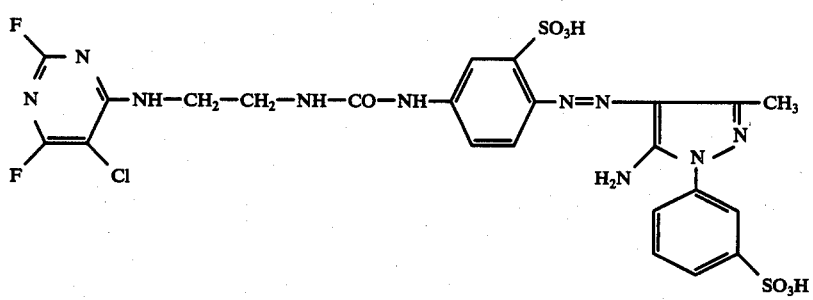

15

On cellulose fibres, using the abovementioned dyeing techniques, the dyestuff yields very strongly coloured somewhat greenish-tinged yellow dyeings of excellent wet fastness properties.

EXAMPLE 156

20 parts of N-(3-amino-4-sulphophenyl)-N'-(β-aminoethyl)-urea in 300 parts of water and 31 parts of concentrated hydrochloric acid are diazotised with 5.1 parts of sodium nitrite, analogously to Example 155. A neutral solution of 26.3 parts of 1-acetylamino-8-hydroxy-naphthalene-3,6-disulphonic acid in 200 parts of water is added dropwise to the diazonium salt solution at 0° – 5° and thereafter the pH-value is adjusted to 7.0 with 16% strength sodium carbonate solution. After stirring overnight, the coupling is complete. The coupling product is salted out with 94 parts of sodium chloride at 45° and the precipitate is cooled to 20°, filtered off and washed with 400 parts of 15% strength sodium chloride solution.

The precipitate is dissolved in 750 parts of water at 20°, the pH-value is adjusted to 7 – 7.5, and 13 parts of 2,4,6-trifluoro-5-chloropyrimidine are added dropwise over the course of 30 minutes. During the condensation, the abovementioned pH-value is maintained by means of 1 N sodium hydroxide solution. When the reaction is complete, the dyestuff is salted out with 95 parts of sodium chloride, filtered off, washed with 600 parts of 12% strength sodium chloride solution and dried in vacuo at 45°. It corresponds to the formula and, using the dyeing methods described above, gives clear red dyeings and prints, of good light fastness, wet fastness and fastness to rubbing, on cellulose fibres.

EXAMPLE 157

16 parts of N-(3-amino-4-sulphophenyl)-N'-(β-aminoethyl)-urea in 300 parts of water and 25 parts of concentrated hydrochloric acid are diazotised with 4.1 parts of sodium nitrite analogously to Example 155. The diazonium salt solution is treated with 95 parts of urea. Thereafter, a neutralised solution of 14 parts of 2-amino-8-hydroxyanthraquinone-6-sulphonic acid in 80 parts of water is added dropwise to the diazonium salt solution at 0° – 5° and the pH-value is adjusted to 4.0 – 4.5 with 20% strength sodium acetate solution. After completion of coupling, the dyestuff which has partly precipitated is salted-out by adding 60 parts of sodium chloride, filtered off and washed with 500 parts of 5% strength sodium chloride solution.

The filter cake obtained is dissolved in 700 parts of water at 90° and the solution is cooled to 20°, whereupon a fine suspension precipitates. The pH-value is adjusted to 8.0 – 8.5 and 9.0 parts of 2,4,6-trifluoropyrimidine are added dropwise to the suspension; the pH-value in the reaction mixture is further kept at 8.0 – 8.5 by means of 1 N sodium hydroxide solution.

The resulting suspension is treated with 70 parts of sodium chloride at 40° and cooled to 20°, and the product is filtered off and washed with 700 parts of 5% strength sodium chloride solution.

After drying in vacuo at 45°, a dyestuff is obtained which corresponds to the formula

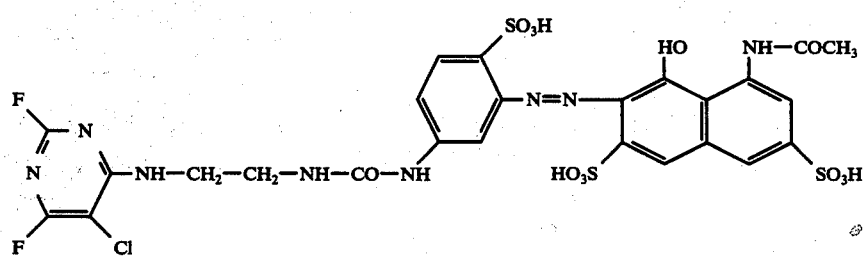

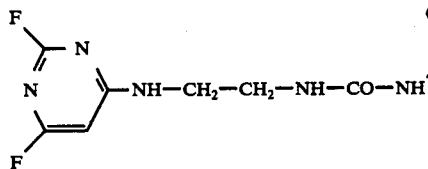

and which dyes wool in yellowish-tinged red shades of excellent fastness to light, fulling and potting.

EXAMPLE 158

20 parts of N-(3-amino-sulphophenyl)-N'-(β-aminoethyl)-urea in 300 parts of water and 31 parts of concentrated hydrochloric acid are diazotised with 5.1 parts of sodium nitrite analogously to Example 147. A neutralised solution of 18.5 parts of 1-(4'-sulphophenyl)-3-methylpyrazolone in 100 parts of water is run into the diazonium salt solution in 15 minutes and the pH-value is subsequently adjusted to 5.0 by means of 15% strength sodium carbonate solution.

When the coupling is complete after stirring overnight, the product is salted-out with 30 parts of sodium chloride and filtered off, and the filter cake is washed with 250 parts of 10% strength sodium chloride solution.

The filter cake is dissolved in 900 parts of water at 50° and the solution is cooled to 20° and treated dropwise, over the course of 30 minutes, with 13 parts of 2,4,6-trifluoro-5-chloro-pyrimidine. During the condensation, a pH-value of 6.5 – 7.0 is maintained in the reaction mixture by means of 1 N sodium hydroxide solution. When the reaction is complete, the dyestuff is salted-out at 40° by means of 55 parts of sodium chloride, filtered off at 40° and washed with 450 parts of 5% strength sodium chloride solution. After drying in vacuo at 40°, a dyestuff to which the formula which are fast to light and to wet processing. If, on wool, this dyestuff is combined with, say, the dyestuffs of Examples 57, 58 or 70, green dyeings of good surface evenness and evenness on the fibre can be obtained.

EXAMPLE 159

20 parts of N-(3-amino-sulphophenyl)-N'-methyl-N'-(β-methylaminoethyl)-urea (manufactured by condensation of 16 parts of 1,3-diamino-benzene-4-sulphonic acid with 16.2 parts of chloroformic acid phenyl ester and introduction of the salted-out phenylurethane into 80 parts of N,N'-dimethylethylenediamine and 160 parts of water), in 120 parts of water and 28 parts of concentrated hydrochloric acid, are diazotised with 4.55 parts of sodium nitrite at 0° – 5°.

A neutralised solution of 14.7 parts of 2-aminonaphthalene-6-sulphonic acid in 350 parts of water is added dropwise over the course of 30 minutes to the resulting diazonium salt solution and the pH-value is adjusted to 5.0 with 15% strength sodium carbonate solution.

After completion of the coupling reaction, 13.8 parts of 2,4,6-trifluoro-5-chloropyrimidine are added dropwise over the course of 30 minutes at 20° and a pH-value of 7.0 – 8.0 is maintained in the reaction mixture. When the cessation of consumption of alkali indicates the end of the condensation process, the dyestuff which has precipitated is filtered off directly, washed with 400 parts of 5% strength sodium chloride solution and dried in a stream of air at 45°. It corresponds to the formula

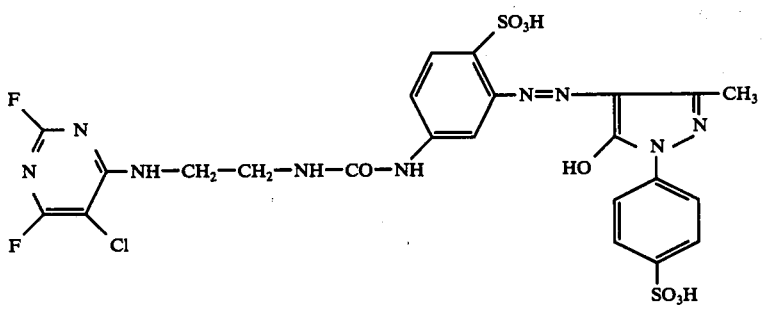

is to be ascribed is obtained. On cellulose fibres and wool, the dyestuff yields dyeings in clear yellow shades

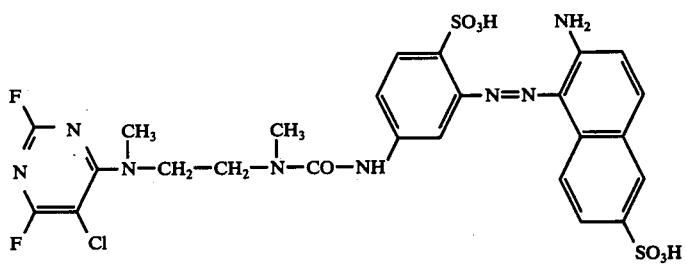

and dyes cotton, from a dilute liquor, and wool, in accordance with the dyeing processes described, in orange shades which are very fast to light and to wet processing.

EXAMPLE 160

10 parts of N-(3-amino-4-sulphophenyl)-N'-(β-amino-ethyl)-urea in 150 parts of water and 15.5 parts of concentrated hydrochloric acid are diazotised with 2.55 parts of sodium nitrite at 0° – 5°.

The resulting diazonium salt solution is added dropwise to a previously prepared solution, cooled to 0° – 5°, of 14.4 parts of 2-N-phenylamino-8-hydroxy-naphthalene-6,3'-disulphonic acid in 300 parts of water, the pH-value of which is adjusted to 7.5 – 8.0, and the above pH-value is further maintained in the coupling medium by means of 15% strength sodium carbonate solution. The coupling is complete after 2 hours.

Thereafter, 7.7 parts of 2,4,6-trifluoro-5-chloropyrimidine are added dropwise to the brown solution and the pH-value is further kept at 7.5 – 8.0 by means of 1 N sodium hydroxide solution.

The dyestuff which has partly precipitated is further salted-out with 60 parts of sodium chloride, filtered off, washed with 250 parts of 8% strength sodium chloride solution and dried in vacuo at 45°. It corresponds to the formula given below and is identical with the dyestuff from

EXAMPLE 152

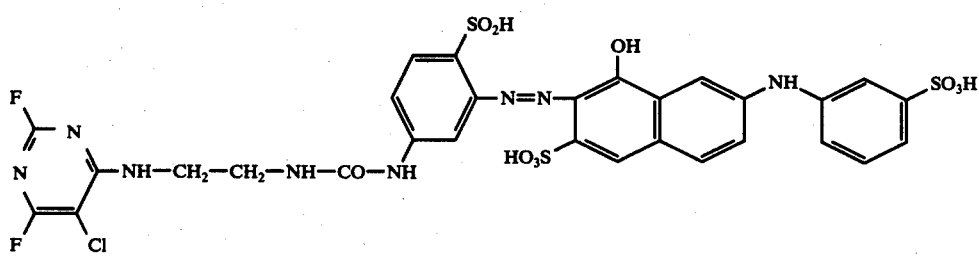

It dyes cellulose fibres and wool in brown shades which are fast to light and to wet processing.

EXAMPLE 161

13 parts of N-(4-amino-2,6-disulphophenyl)-N'-(β-amino-ethyl)-urea (manufactured by acylation of 1,4-diaminobenzene-2,6-disulphonic acid with chloroformic acid phenyl ester and subsequent condensation with ethylenediamine) in 100 parts of water and 16 parts of concentrated hydrochloric acid are diazotised with 2.54 parts of sodium nitrite at 0° – 5°. A neutral solution of 9.4 parts of 1-(4'-sulphophenyl)-3-methylpyrazolone-5 in 60 parts of water is run into the diazonium salt solution over the course of 15 minutes and the pH-value of the coupling medium is adjusted to 5.5. After completion of the coupling, the pH-value is adjusted to 7.5 – 8.0, and the suspension is diluted with 300 parts of water and heated to 40° until everything has dissolved. After cooling to 20°, 7.6 parts of 2,4,6-trifluoro-6-chloropyrimidine are added dropwise over the course of 30 minutes and the pH-value is kept at 7.5 – 8.0 by means of 1 N sodium hydroxide solution until the condensation is complete. The dyestuff is salted-out with 120 parts of sodium chloride, filtered off and washed with 300 parts of saturated sodium chloride. The dyestuff, dried in vacuo at 40°, corresponds to the formula

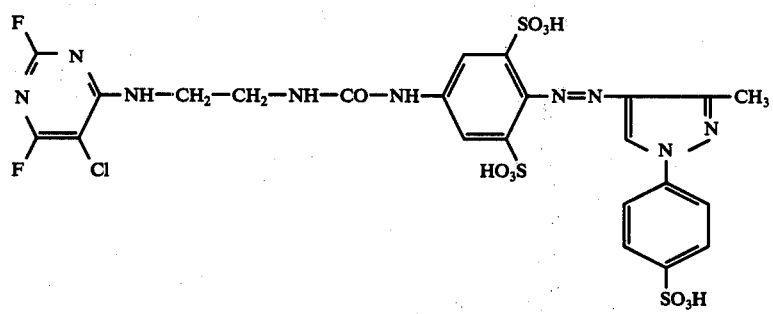

and using the dyeing processes described above gives prints or dyeings in clear yellow shades, which are very fast to light and to wet processing, on cellulose fibres and wool.

Further dyestuffs are obtained if the azo components listed in the table below and manufactured analogously from appropriate diazo components containing urea bridges and coupling components, are reacted with the reactive components A, B or C.

| Example No. | Azo Component | Reactive Component | colour Shade |
|---|---|---|---|
| 162 | 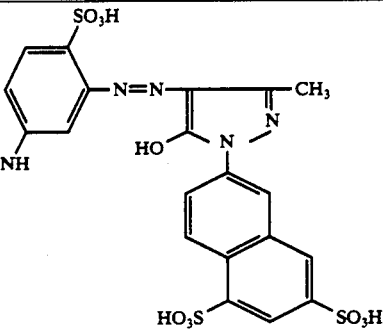 | A | yellow |
| 163 | " | B | " |
| 164 | 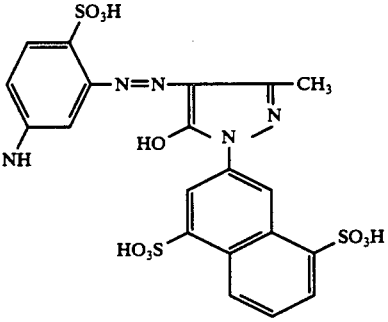 | A | " |
| 165 | 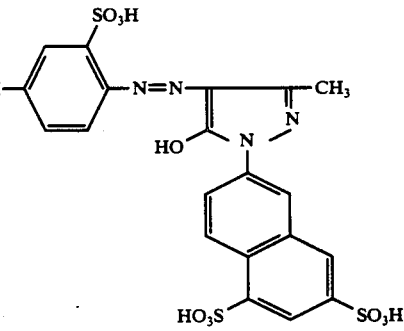 | A | reddish-tinged yellow |
| 166 | 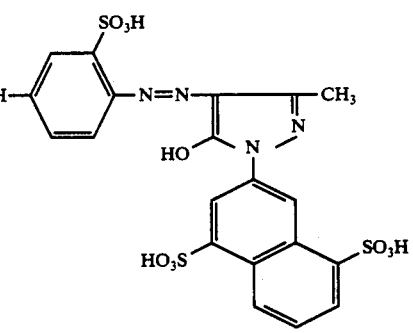 | A | reddish-tinged yellow |
| 167 | 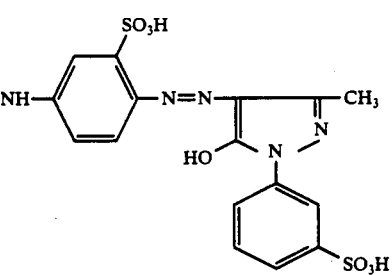 | A | " |

-continued
| Example No. | Azo Component | Reactive Component | colour Shade |
|---|---|---|---|
| 168 | 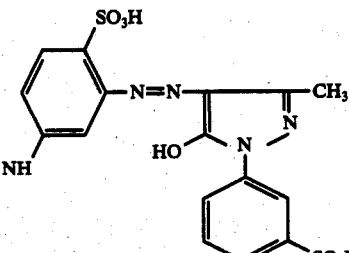 | A | greenish-tinged yellow |
| 169 | 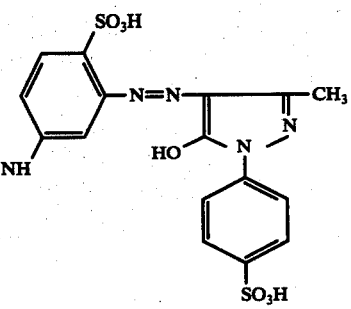 | A | " |
| 170 | 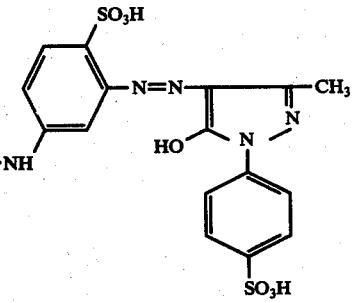 | C | greenish-tinged yellow |
| 171 | 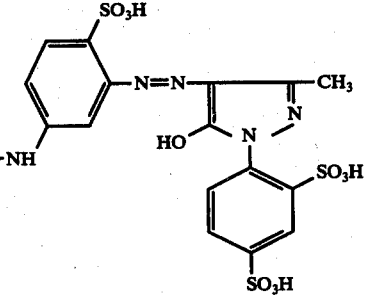 | A | " |
| 172 | " | B | " |
| 173 | 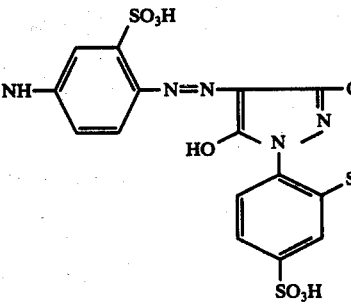 | A | reddish-tinged yellow |

-continued

| Example No. | Azo Component | Reactive Component | colour Shade |
|---|---|---|---|
| 174 | NH$_2$—(CH$_2$)$_2$—NH—CO—NH—[phenyl(SO$_3$H)]—N=N—[naphthyl(OH)(HO$_3$S)(NH—COCH$_3$)] | A | reddish-tinged orange |
| 175 | CH$_2$OH—CH$_2$—NH—(CH$_2$)$_2$—NH—CO—NH—[phenyl(SO$_3$H)]—N=N—[naphthyl(OH)(HO$_3$S)(NH—CO—CH$_3$)] | A | yellowish-tinged red |
| 176 | CH$_2$OSO$_3$H—CH$_2$—NH—(CH$_2$)$_2$—NH—CO—NH—[phenyl(SO$_3$H)]—N=N—[naphthyl(OH)(HO$_3$S)(SO$_3$H)] | B | red |
| 177 | CH$_3$—NH—(CH$_2$)$_3$—NH—CO—NH—[phenyl(SO$_3$H)]—N=N—[naphthyl(OH)(HO$_3$S)(SO$_3$H)] | A | reddish-tinged orange |
| 178 | NH$_2$—(CH$_2$)$_6$—NH—CO—NH—[phenyl(SO$_3$H)]—N=N—[naphthyl(OH)(HO$_3$S)(SO$_3$H)] | A | orange |
| 179 | NH$_2$—(CH$_2$)$_2$—NH—CO—NH—[phenyl(SO$_3$H)]—N=N—[naphthyl(OH)(HO$_3$S)(NH—CO—NH$_2$)] | A | orange |
| 180 | NH$_2$—(CH$_2$)$_2$—NH—CO—NH—[phenyl(SO$_3$H)]—N=N—[naphthyl(OH)(HO$_3$S)(NH—CO—NH$_2$)] | A | yellowish-tinged red |
| 181 | CH$_3$—NH—(CH$_2$)$_2$—N(CH$_3$)—CO—NH—[phenyl(SO$_3$H)]—N=N—[naphthyl(OH)(HO$_3$S)(SO$_3$H)(NH—COC$_6$H$_5$)] | A | reddish-tinged violet |

-continued

| Example No. | Azo Component | Reactive Component | colour Shade |
|---|---|---|---|
| 182 | (structure: 2-sulfophenyl with NH₂-(CH₂)₂-NH-CO-NH- substituent, azo-coupled to 1-hydroxy-8-benzoylamino-3,6-disulfo-naphthalene) | A | red |
| 183 | (same azo component as 182) | B | " |
| 184 | (same azo component, with NH-CO-C₆H₅ group) | C | " |
| 185 | (2-sulfophenyl with NH₂-(CH₂)₂-NH-CO-NH- substituent, azo-coupled to 1-hydroxy-4-sulfo-naphthalene) | A | reddish-tinged orange |
| 186 | (phenyl-azo-naphthalene; side chain: CH₂-OSO₃H, CH₂, NH-(CH₂)₂-NH-CO-NH-) | A | orange |
| 187 | (bis-hydroxyethyl substituted urea side chain: CH₂OH-CH₂ and CH₂OH-CH₂ on N-(CH₂)₂-N-CO-NH-) | B | red |
| 188 | (diethyl substituted urea side chain: C₂H₅ and C₂H₅ on NH-(CH₂)₂-N-CO-NH-; coupled to 1-hydroxy-3,6-disulfo-naphthalene) | A | reddish-tinged orange |

-continued
| Example No. | Azo Component | Reactive Component | colour Shade |
|---|---|---|---|
| 189 | 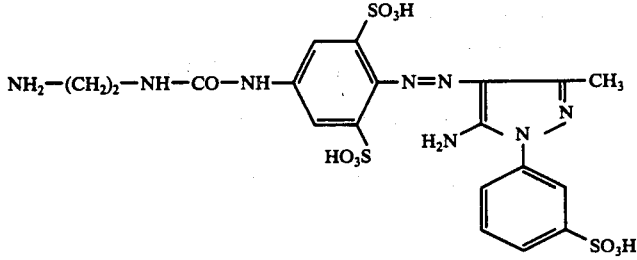 | A | greenish-tinged yellow |
| 190 | 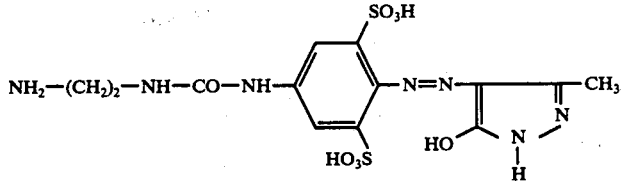 | A | " |
| 191 | 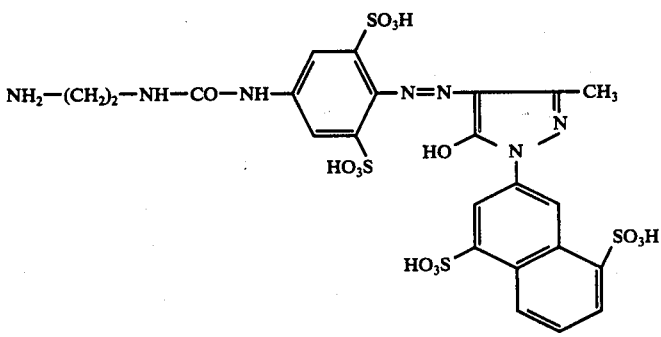 | A | yellow |
| 192 | 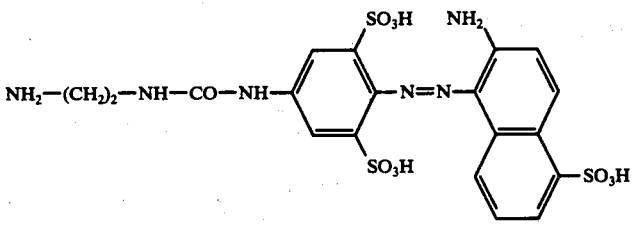 | A | orange |
| 193 | 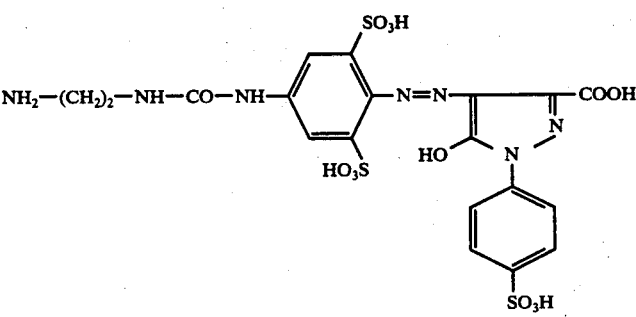 | A | yellow |
| 194 | 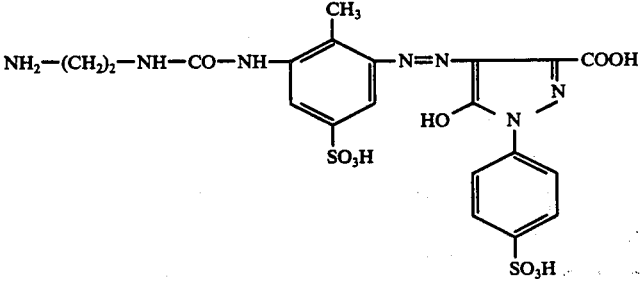 | B | " |

| Example No. | Azo Component | Reactive Component | colour Shade |
|---|---|---|---|
| 195 | NH$_2$—(CH$_2$)$_2$—NH—CO—NH—[phenyl(CH$_3$, SO$_3$H)]—N=N—[naphthyl(NH$_2$, OH, SO$_3$H)] | A | yellowish-tinged red |

Reactive dyestuffs of analogous structure are obtained if instead of the reactive components A, B or C, 2,4,6-trichloro-triazine, 2,4-dichloro-6-methoxy-triazine, 2,4-dichloro-6-(o-, m- or p-sulphophenyl)-aminotriazine, 2,4,5,6-tetrachloropyrimidine, 2-methylsulphonyl-4,5-dichloro-6-methylpyrimidine, 2,3-dichloroquinoxaline-4-carboxylic acid chloride or 2,3-dibromopropionyl chloride are employed as reactive components.

EXAMPLE 196

8.6 parts of N-(3-amino-4-sulphophenyl)-N'-(β-amino-ethyl)-urea in 200 parts of water and 15 parts of concentrated hydrochloric acid are diazotised with 2.17 parts of sodium nitrite at 0° – 5°. 60 parts of urea are added to the diazonium salt solution obtained and a neutralised solution of 9.7 parts of 1-amino-8-hydroxy-naphthalene-3,6-disulphonic acid in 50 parts of water is then run in over the course of 1 hour. The pH-value in the coupling medium is adjusted to 2.0 – 2.5 by means of 20% strength sodium acetate. The coupling is completed by stirring overnight and thereafter the suspension of a diazonium salt obtained by dropwise addition of a neutralised solution of 6.8 parts of 2-amino-naphthalene-1-sulphonic acid and 2.1 parts of sodium nitrite to a mixture of 100 parts of water and 13 parts of concentrated hydrochloric acid at 0° – 5°, is run in. The pH-value of the coupling medium is now adjusted to 7.5 by means of 15% strength sodium carbonate solution and this second coupling is completed by maintaining this pH-value.

The resulting solution is warmed to 20° and 3.9 parts of 2,4,6-trifluoro-5-chloro-pyrimidine are added dropwise over the course of 30 minutes. During the condensation which commences, the pH-value is kept at 6.5 – 7.0 by dropwise addition of 1 N sodium hydroxide solution. When the end of the condensation is detected through the consumption of sodium hydroxide solution subsiding, and by chromatography, the dyestuff is salted out with 75 parts of sodium chloride, filtered off and washed with 750 parts of 10% strength sodium chloride solution.

After drying at 40° C in vacuo, a dyestuff which corresponds to the formula

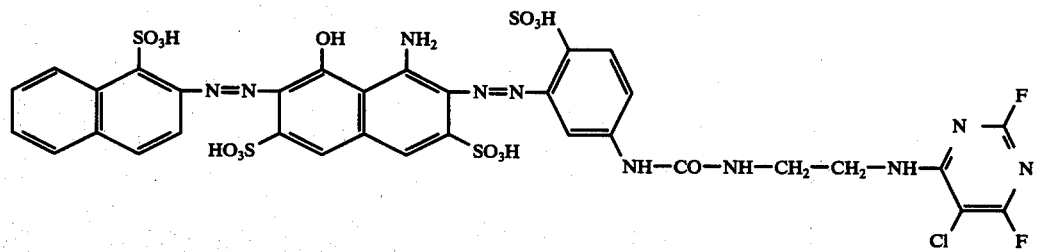

is obtained.

0.8 part of this dyestuff are dissolved in 300 parts of water. 10 parts of cotton fabric are constantly agitated in this dyeing liquor and the temperature of the dyeing liquor is raised to 40° over the course of 10 minutes. After adding 15 parts of sodium sulphate, dyeing is continued for 30 minutes, 3 parts of sodium carbonate are then added to the dyeing liquor and the mixture is kept for 1 hour at 40°. Thereafter, the fabric is rinsed, first cold and then hot, and is soaped at the boil for 20 minutes in 500 parts of a liquor containing 0.5 part of sodium alkylsulphonate.

After again rinsing and drying the fabric, a deep black dyeing with very good fastness to light and to wet processing is obtained.

Further analogous dyestuffs can be manufactured if the diazonium salts of the diazo components indicated in the table below are coupled, in the indicated sequence (1st. coupling under acid conditions to pH 2.5; 2nd. coupling under neutral to weakly alkaline conditions between pH 6 – 9) with 1-amino-8-hydroxy-naphthalene-3,6-disulphonic acid and the intermediate products are reacted with 2,4,6-trifluoro-5-chloropyrimidine. The colour shades obtained with these dyestuffs in accordance with the abovementioned dyeing process are indicated in the last column of the table.

| Example No. | Diazo Component of the 1st. Coupling | Diazo Component of the 2nd. Coupling | Reactive Component | Colour Shade |
|---|---|---|---|---|
| 197 | 4-SO₃H, 3-NH₂, 1-NH—CO—NH—(CH₂)₂—NH₂ benzene | 4-SO₃H, 3-NH₂, 1-NH—CO—CH₃ benzene | A | black |
| 198 | " | 2-SO₃H, 3-NH₂, (SO₃H at 5) benzene | A | " |
| 199 | " | SO₃H, NH₂, SO₃H substituted benzene | A | " |
| 200 | " | 1-SO₃H, 2-NH₂, 5-SO₃H naphthalene | A | " |
| 201 | " | 2-SO₃H, 1-NH₂ benzene | A | " |
| 202 | 3-SO₃H, 4-NH₂, 1-NH—CO—NH—(CH₂)₂—NH₂ benzene | NH—CO—CH₃, NH₂, SO₃H substituted benzene | A | blue-green |
| 203 | 4-SO₃H, 3-NH₂, 1-NH—CO—CH₃ benzene | 4-SO₃H, 3-NH₂, 1-NH—CO—NH—(CH₂)₂—NH₂ benzene | A | black |
| 204 | 2-SO₃H, 5-SO₃H, 1-NH₂ benzene | 4-SO₃H, 3-NH₂, 1-NH—CO—NH—(CH₂)₂—NH₂ benzene | A | " |
| 205 | (CH₂)₂—NH₂, NH—CO—NH—, SO₃H, NH₂ substituted benzene | 2-SO₃H, 5-SO₃H, 1-NH₂ benzene | A | blue-green |
| 206 | 2-SO₃H, 3-NH₂, 5-SO₃H benzene | 4-SO₃H, 3-NH₂, 1-NH—CO—NH—(CH₂)₂—NH₂ benzene | A | black |

| Example No. | Diazo Component of the 1st. Coupling | Diazo Component of the 2nd. Coupling | Reactive Component | Colour Shade |
|---|---|---|---|---|
| 207 | 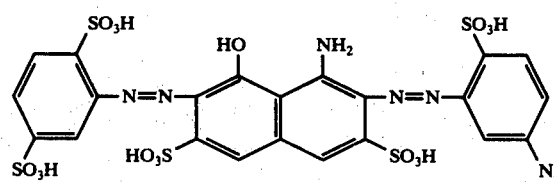 | 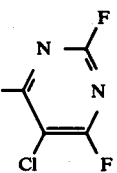 | B | black |

EXAMPLE 208

18 parts of N-(3-amino-4-sulphophenyl)-N'-(β-amino-ethyl)-urea are firstly condensed, analogously to the procedure of Example 116, with 16.5 parts of 2,4,6-trifluoro-5-chloro-pyrimidine in 100 parts of water, and after addition of 4.55 parts of sodium nitrite the condensation product is diazotised by dropwise addition to 250 parts of water and 28 parts of concentrated hydrochloric acid.

150 parts of urea are added to the suspension of the diazonium salt, a neutralised solution of 20.3 parts of 1-amino-8-hydroxynaphthalene-3,6-disulphonic acid in 100 parts of water is then allowed to run in over the course of 30 minutes, the pH-value in the coupling medium is kept at 2.0 – 2.5 and the mixture is further stirred overnight at 0° – 5°. When this first coupling is complete, the suspension of a diazonium salt produced by dropwise addition of a neutral solution of 16 parts of 1-aminobenzene-2,5-disulphonic acid and 4.37 parts of sodium nitrite in 65 parts of water to 130 parts of water and 28 parts of concentrated hydrochloric acid at 0° – 5° is added. In order to carry out the second coupling, the pH-value in the coupling medium is now kept at 7.0 – 7.5 by dropwise addition of 15% strength sodium carbonate solution. After completion of coupling, the dyestuff is salted-out with 120 parts of potassium chloride, filtered off and washed with 800 parts of 12% strength potassium chloride solution. After drying, a dyestuff is obtained which corresponds to the formula and which, using the printing process of Example 3, gives navy blue prints, or at double the dyestuff concentration gives black prints, which are fast to light and to wet processing, on cellulose materials.

EXAMPLE 209

15 parts of sodium 2-(2'-methyl-4'-amino-phenylazo)-naphthalene-4,8-disulphonate are dissolved in 200 parts of water. 8.8 parts of chloroformic acid phenyl ester are added dropwise over the course of 30 minutes. During the condensation, the pH-value is kept at 6.0 – 6.5 by continuous dropwise addition of 1 N sodium carbonate solution. When the consumption of sodium carbonate has ceased, the solution is run into a mixture of 27 parts of ethylenediamine and 60 parts of water at 15° – 20°. After 2 hours, the condensation of the phenylurethane with the diamine is complete. 43 parts of concentrated hydrochloric acid are added dropwise to the dyestuff solution at 20° – 25°, whilst cooling externally, until a pH-value of 7 is reached, 60 parts of sodium chloride are added and the dyestuff which has precipitated is filtered off and washed with 250 parts of 15% strength sodium chloride solution.

The filter cake is suspended in 400 parts of water. 6.5 parts of 2,4,6-trifluoro-5-chloropyrimidine are continuously added to the suspension over the course of 30 minutes and the pH-value is kept at 7.0 – 7.5 by means of 1 N sodium hydroxide solution, whereupon the material gradually dissolves. After completion of condensation, the dyestuff is salted-out at 40° with 50 parts of sodium chloride, filtered off and washed with 150 parts of 10% strength sodium chloride solution. It corresponds to the formula

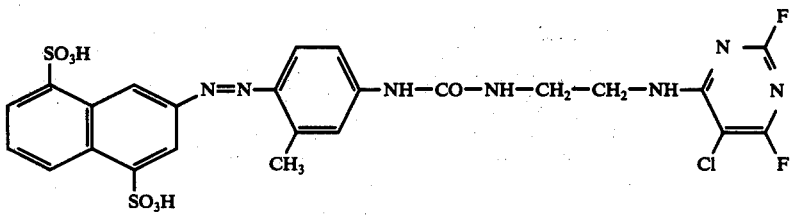

and dyes cellulose fibres and wool, in accordance with the dyeing processes mentioned, in reddish-tinged yellow shades of excellent fastness to light and to wet processing. On wool, green shades which are fast to light and wet processing and have good surface evenness and evenness on the fibre can be produced by combination with the dyestuffs of Examples 57, 58, 63 or 82.

EXAMPLE 210

19.7 parts of sodium 1-(2'-acetylamino-4'-aminophenylazo)-benzene-2,5-disulphonate are dissolved in 250 parts of water. 11.8 parts of chloroformic acid phenyl ester are added dropwise and the pH-value is kept at 6.0 – 6.5 by means of 1 N sodium carbonate solution. After completion of the condensation, the solution of the phenylurethane is run into a mixture of 55 parts of N,N'-dimethylethylenediamine and 110 parts of water at 20° – 25°, the mixture is stirred for a further 2 hours until the condensation is complete, the pH-value is then adjusted to 7.0 by means of 93 parts of concentrated hydrochloric acid whilst cooling externally, 70 parts of sodium chloride are then added and the dyestuff which has precipitated is filtered off and washed with 300 parts of 15% strength sodium chloride solution. The filter cake is dissolved or suspended in 500 parts of water. 9.6 parts of 2,4-difluoro-5,6-dichloro-pyrimidine are added dropwise and the pH-value is kept at 8.0 – 8.5 by means of 1 N sodium hydroxide solution. After completion of the condensation, the dyestuff is salted out with 120 parts of sodium chloride and filtered off, and the filter cake is washed with 400 parts of 20% strength sodium chloride solution. After drying in vacuo at 50° a dyestuff is obtained which corresponds to the formula

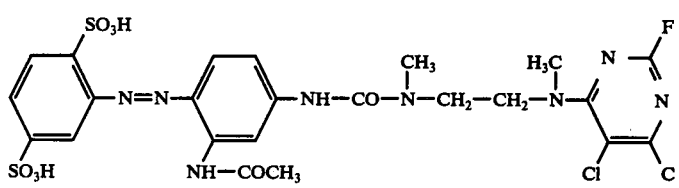

and which dyes wool, in accordance with the dyeing processes indicated above, in yellow shades which are fast to light, fulling and potting.

By varying the azo starting materials employed and the diamines reacted with the corresponding phenylurethanes, it is possible to obtain the dyestuff components listed in the table below, the condensation of which with the reactive components listed gives further reddish-tinged yellow dyestuffs of the above type.

| Example No. | Dyestuff Component | Reactive Component | Colour Shade |
|---|---|---|---|
| 211 | HO₃S–[ring, SO₃H]–N=N–[ring, CH₃]–NH—CO—NH—(CH₂)₂—NH₂ | A | reddish-tinged yellow |
| 212 | HO₃S–[ring, SO₃H]–N=N–[ring, NH—CO—NH₂]–NH—CO—NH—(CH₂)₂—NH₂ | A | " |
| 213 | HO₃S–[ring, SO₃H]–N=N–[ring, NH—CO—CH₃]–NH—CO—NH—(CH₂)₂—NH₂ | A | " |
| 214 | [ring, SO₃H, SO₃H]–N=N–[ring, CH₃]–NH—CO—NH—(CH₂)₂—NH₂ | A | " |
| 215 | [ring, SO₃H, SO₃H]–N=N–[ring, NH—CO—NH₂]–NH—CO—NH—(CH₂)₂—NH₂ | A | " |
| 216 | [ring, SO₃H, SO₃H]–N=N–[ring, NH—CO—CH₃]–NH—CO—NH—(CH₂)₂—NH₂ | A | " |
| 217 | [naphthalene, SO₃H, SO₃H]–N=N–[ring, CH₃]–NH—CO—NH—(CH₂)₂—NH—CH₂—CH₂OH | A | " |
| 218 | " | B | " |
| 219 | " | C | " |

-continued

| Example No. | Dyestuff Component | Reactive Component | Colour Shade |
|---|---|---|---|
| 220 | naphthalene-1,5-(SO₃H)₂-7-N=N-[2-(NHCOCH₃)-phenyl]-NH-CO-NH-(CH₂)₂-NH₂ | A | " |
| 221 | naphthalene-1,5-(SO₃H)₂-7-N=N-[2-CH₃-phenyl]-NH-CO-N(CH₃)-CH₂-CH₂-NH-CH₃ | B | " |
| 222 | naphthalene-1,5-(SO₃H)₂-7-N=N-[2-CH₃-phenyl]-NH-CO-N(CH₂-CH₂OH)-CH₂-CH₂-NH-CH₂-CH₂OH | A | " |
| 223 | naphthalene-1,5-(SO₃H)₂-7-N=N-[2-(NHCONH₂)-phenyl]-NH-CO-NH-(CH₂)₃-NH-CH₃ | A | " |
| 224 | naphthalene-1,5-(SO₃H)₂-7-N=N-[2-(NHCONH₂)-phenyl]-NH-CO-NH-(CH₂)₂-NH₂ | B | " |
| 225 | 2,4-(HO₃S)₂-phenyl-N=N-[3-CH₃-phenyl]-NH-CO-NH-(CH₂)₂-NH-CH₂-CH₂OH | A | " |
| 226 | 2,4-(HO₃S)₂-phenyl-N=N-[2-(NHCONH₂)-phenyl]-NH-CO-NH-CH₂-CH₂-NH-CH₂-CH(OH)-CH₂ | A | " |
| 227 | 2,4-(HO₃S)₂-phenyl-N=N-[2-(NHCONH₂)-phenyl]-NH-CO-NH-CH₂-CH₂-NH-CH₂-CH(OH)-CH₂ | B | " |
| 228 | " | C | " |
| 229 | naphthalene-1,6-(SO₃H)₂-7-N=N-[2-CH₃-phenyl]-NH-CO-NH-(CH₂)₂-NH₂ | A | " |
| 230 | naphthalene-1,6-(SO₃H)₂-7-N=N-[2-(NHCONH₂)-phenyl]-NH-CO-NH-(CH₂)₂-NH₂ | A | " |
| 231 | naphthalene-1,6-(SO₃H)₂-7-N=N-[2-(NHCOCH₃)-phenyl]-NH-CO-N(C₂H₅)-(CH₂)₂-NH-C₂H₅ | A | " |
| 232 | naphthalene-1,5,7-(SO₃H)(HO₃S)-6-N=N-[2-(NHCONH₂)-phenyl]-NH-CO-NH-(CH₂)₂-NH₂ | A | " |
| 233 | naphthalene-1,5,7-(SO₃H)(HO₃S)-6-N=N-[2-(NHCOCH₃)-phenyl]-NH-CO-NH-(CH₂)₄-NH₂ | B | " |

-continued

| Example No. | Dyestuff Component | Reactive Component | Colour Shade |
|---|---|---|---|
| 234 | (naphthalene with SO$_3$H, SO$_3$H, HO$_3$S)—N=N—(phenyl with CH$_3$)—NH—CO—N(CH$_3$)—(CH$_2$)$_2$—NH—CH$_3$ | A | " |
| 235 | (naphthalene with SO$_3$H, SO$_3$H, HO$_3$S)—N=N—(phenyl with NH—CO—NH$_2$)—NH—CO—NH—(CH$_2$)$_2$—NH—CH$_2$—CH$_2$OH | A | " |
| 236 | (naphthalene with SO$_3$H, HO$_3$S)—N=N—(phenyl with NH—CO—CH$_2$OH)—NH—CO—NH—(CH$_2$)$_2$—NH$_2$ | A | yellow |
| 237 | (naphthalene with SO$_3$H, HO$_3$S)—N=N—(phenyl with CH$_3$)—N(CH$_3$)—CO—NH—(CH$_2$)$_2$—NH$_2$ | B | " |
| 238 | (naphthalene with SO$_3$H, SO$_3$H)—N=N—(phenyl with CH$_3$)—N(CH$_3$)—CO—NH—(CH$_2$)$_2$—N(H)—CH$_2$—CH$_2$OH | A | " |
| 239 | (naphthalene with SO$_3$H, HO$_3$S)—N=N—(phenyl with NH—CO—NH$_2$)—NH—CO—NH—(CH$_2$)$_3$—NH—CH$_3$ | B | reddish-tinged yellow |
| 240 | (naphthalene with SO$_3$H, SO$_3$H)—N=N—(naphthalene with SO$_3$H)—NH—CO—NH—(CH$_2$)$_2$—NH$_2$ | A | " |
| 241 | (naphthalene with SO$_3$H, SO$_3$H)—N=N—(phenyl with NH—CO—CH$_3$)—NH—CO—N(CH$_3$)—(CH$_2$)$_2$—N(H)—CH$_3$ | B | " |
| 242 | (naphthalene with HO$_3$S, SO$_3$H)—N=N—(phenyl with CH$_3$)—NH—CO—NH—(CH$_2$)$_2$—NH$_2$ | A | " |
| 243 | (naphthalene with SO$_3$H, HO$_3$S, SO$_3$H)—N=N—(phenyl with CH$_3$)—NH—CO—NH—(cyclohexyl)—NH$_2$ | A | " |
| 244 | (naphthalene with SO$_3$H, SO$_3$H)—N=N—(naphthalene with SO$_3$H, SO$_3$H)—NH—CO—NH—CH$_2$—CH$_2$—NH—(phenyl with SO$_3$H) | B | " |
| 245 | (naphthalene with HO$_3$S, SO$_3$H, SO$_3$H)—N=N—(phenyl)—N(CH$_3$)—CO—NH—(CH$_2$)$_2$—NH$_2$ | A | " |

| Example No. | Dyestuff Component | Reactive Component | Colour Shade |
|---|---|---|---|
| 246 | 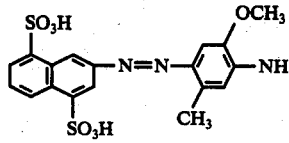 | A | " |

EXAMPLE 247

25 parts of 2-amino-5-hydroxy-naphthalene-7-sulphonic acid are dissolved in 500 parts of water whilst being neutralised with sodium hydroxide solution. 30 parts of chloroformic acid phenyl ester are added dropwise and the pH-value is kept at 5.5 – 6.0 by means of 1 N sodium carbonate solution.

After completion of the condensation, the solution is clarified to remove small amounts of undissolved matter and the filtrate is treated with 160 parts of sodium chloride. The phenylurethane which was precipitated is filtered off, washed with 300 parts of 20% strength sodium chloride solution and dried in vacuo at 35°.

12 parts of 4-aminoanisole-3-sulphonic acid are dissolved in 120 parts of water whilst being neutralised, the solution is mixed with 4.1 parts of sodium nitrite and the substance is subsequently diazotised by dropwise addition to a mixture of 170 parts of water, 26 parts of concentrated hydrochloric acid and 0.1 part of sodium nitrite at 0° – 5°. The mixture is stirred for a further 2 hours and small amounts of excess nitrous acid are destroyed.

A solution of 22.6 parts of the sodium 2-(phenoxycarbamido)-5-hydroxy-naphthalene-7-sulphonate manufactured above in 600 parts of water is added to the suspension of the diazonium salt and the pH-value in the coupling medium is maintained at 6.5 – 7.0 by sprinkling in solid, calcined sodium carbonate. After completion of the coupling, the suspension obtained is gradually introduced, in portions, into a mixture of 60 parts of ethylenediamine and 120 parts of water at 20° – 25°. After stirring for 2 hours, the condensation to give the urea derivative is complete. About 165 parts of concentrated hydrochloric acid are added dropwise to the solution at 20° – 25°, whilst cooling externally, until a pH-value of 7 is reached, 90 parts of sodium chloride are added and the dyestuff intermediate product which has precipitated is filtered off and washed with 800 parts of 10% strength sodium chloride solution.

The filter cake is suspended in 700 parts of water. 12.5 parts of 2,4,6-trifluoro-5-chloropyrimidine are added dropwise over the course of 30 minutes to the suspension and the pH-value is kept at 7.5 – 8.0 by means of 1 N sodium hydroxide solution. The suspension gradually dissolves. After completion of the condensation, the mixture is warmed to 45° – 50°, 30 parts of sodium chloride are added to the solution and the whole is cooled to 20°. The dyestuff is filtered off, washed with 400 parts of 5% strength sodium chloride solution and dried in vacuo at 40°. It corresponds to the formula

and dyes cellulose fibres and wool in scarlet red shades which are fast to light and very fast to wet processing.

EXAMPLE 248

11.5 parts of 2-amino-naphthalene-3,6,8-trisulphonic acid are dissolved in 50 parts of water whilst being neutralised, and 2.1 parts of sodium nitrite are added to the solution. Diazotisation is achieved by dropwise addition to 85 parts of water and 13 parts of concentrated hydrochloric acid at 0° –5°.

A neutral solution of 9.8 parts of 2-N-(β-aminoethyl)-N'-ureido-5-hydroxy-naphthalene-7-sulphonic acid (manufactured from the 2-(phenoxy-carbamido)-5-hydroxynaphthalene-7-sulphonic acid mentioned in Example 247) in 250 parts of water is added to the diazonium salt suspension obtained, and the pH-value is adjusted to 6.5 – 7.0 with 15% strength sodium carbonate solution.

After completion of coupling, 6.3 parts of 2,4,6-trifluoro-5-chloropyrimidine are slowly added dropwise to the suspension obtained, and the pH-value is kept at 7.0 – 7.5 with 1 N sodium hydroxide solution. Hereupon, the material gradually dissolves. After completion of the condensation, the dyestuff is slowly salted out in 60 parts of sodium chloride, filtered off and washed with 100 parts of 15% strength sodium chloride solution. The dyestuff obtained after drying corresponds to the formula

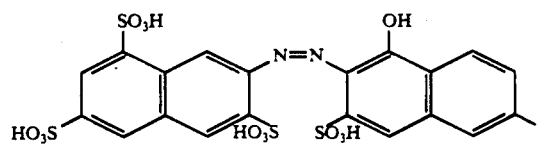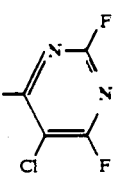

and, using the processes mentioned, gives dyeings and prints in strongly reddish-tinged orange shades, which are fast to light and very fast to wet processing, on cellulose fibres.

Further dyestuffs are obtained analogously to Examples 247 or 248 if the diaze components listed in the table below are combined with the coupling components containing urea bridges, and these intermediate products are reacted with 2,4,6-trifluoro-5-chloropyrimidine.

| Ex. No. | Diazo Component | Coupling Component | Shade |
|---|---|---|---|
| 249 | 2-aminobenzenesulfonic acid (SO₃H, NH₂) | 1-hydroxy-6-sulfo-naphthalene with NH—CO—NH—CH₂—CH₂—NH₂ bridge (HO₃S) | strongly yellowish-tinged orange |
| 250 | 2,4-disulfoaniline | " | " |
| 251 | 4-methyl-2-aminobenzenesulfonic acid | " | yellowish-tinged orange |
| 252 | 6-amino-1,4-naphthalenedisulfonic acid | " | orange |
| 253 | 7-amino-1,3-naphthalenedisulfonic acid | " | reddish-tinged orange |
| 254 | 2-amino-1-naphthalenesulfonic acid-6-sulfo | " | " |
| 255 | 4-acetamino-2-aminobenzenesulfonic acid | " | scarlet |
| 256 | " | 1-hydroxy-6-sulfo-naphthalene with NH—CO—NH—CH₂—CH₂—NH—CH(CH₃)—OH | " |
| 257 | 4-methoxy-2-aminobenzenesulfonic acid | | |

-continued

| Ex. No. | Diazo Component | Coupling Component | Shade |
|---|---|---|---|
| 258 | " | [naphthol with OH, SO₃H, NH—CO—NH—(CH₂)₂—NH—(CH₂)₂—OSO₃H] | " |
| 259 | H₃CO–C₆H₃(SO₃H)(NH₂) | [naphthol with OH, SO₃H, N(CH₃)—CO—NH—CH₂—CH₂—NH₂] | " |
| 260 | 1,5-disulfo-3-aminonaphthalene | " | orange |
| 261 | 2-aminobenzenesulfonic acid | [naphthol with HO, NH—CO—NH—(CH₂)₂—NH₂, two SO₃H groups] | red |
| 262 | 2-amino-1-naphthalenesulfonic acid | " | bluish-tinged red |
| 263 | aminobenzene with SO₃H, NH₂, NH—CO—CH₃ | " | red |
| 264 | H₃C–C₆H₃(SO₃H)(NH₂) | " | " |
| 265 | 2-amino-5-sulfobenzoic acid (COOH, HO₃S, NH₂) | " | " |
| 266 | 2-amino-1,5-disulfonaphthalene | " | bluish-tinged red |
| 267 | aminobenzene with OCH₃, NH₂, SO₃H | [naphthol with HO, NH—CO—N(CH₃)—CH₂—CH₂—NH—CH₃, two SO₃H groups] | " |
| 268 | 2-amino-1,7-disulfonaphthalene | " | " |

-continued

| Ex. No. | Diazo Component | Coupling Component | Shade |
|---|---|---|---|
| 268a | H₃C—CO—NH—⟨benzene with SO₃H⟩—NH₂ | " | violet |
| 269 | ⟨benzene with SO₃H, NH₂⟩ | HO, NH—CO—NH—(CH₂)₃—NH—CH₃ on naphthalene with HO₃S and SO₃H | red |
| 270 | ⟨benzene with SO₃H, NH₂⟩ | HO, NH—CO—NH—(CH₂)₂—NH₂ on naphthalene with HO₃S and SO₃H | " |
| 271 | ⟨naphthalene with SO₃H, NH₂⟩ | " | " |

EXAMPLE 272

48 parts (expressed as 100% pure material) of the copper phthalocyanine-tetrasulphochloride manufactured in a known manner from copper phthalocyanine by the action of chlorosulphonic acid and thionyl chloride, or of the isomeric copper phthalocyanine-tetrasulphochloride synthesised from 1-sulpho-benzene-3,4-dicarboxylic acid via the corresponding copper phthalocyaninetetrasulphonic acid, in the form of the moist, well-washed filter cake, are suspended in 250 parts of water and 250 parts of ice, a solution of 25 parts of 1,3-diaminobenzene in 250 parts of water is added and the pH is adjusted to 8.5 with sodium carbonate. The suspension is stirred for 24 hours at room temperature and is further kept at 8.5 by addition of sodium carbonate. The condensation product is precipitated at pH 1 – 2 by adding sodium chloride, filtered off, washed and then dissolved in 500 parts of water. 45 parts of chloroformic acid phenyl ester are added dropwise to the solution and the pH-value is kept at 6.0 – 6.5 with sodium carbonate solution until the condensation is complete. The resulting solution of the phenylurethane is introduced, at 20°, into a mixture of 100 parts of ethylenediamine and 200 parts of water and the whole is stirred overnight.

Thereafter, the pH-value is adjusted to 6 – 7 with concentrated hydrochloric acid and the dyestuff is salted-out with 80 parts of sodium chloride. It is filtered off and washed with sodium chloride solution until free of remnants of ethyleneidiamine. Thereafter the filter cake is dissolved in 600 parts of water at pH 10.5, and 29 parts of 2,4,6-trifluoro-5-chloropyrimidine are now run in. During the condensation, the pH-value is kept at 8.0 – 8.5 by dropwise addition of 2 N sodium hydroxide solution, and the mixture is stirred until the consumption of sodium hydroxide solution ceases. The dyestuff thus obtained, which corresponds to the formula

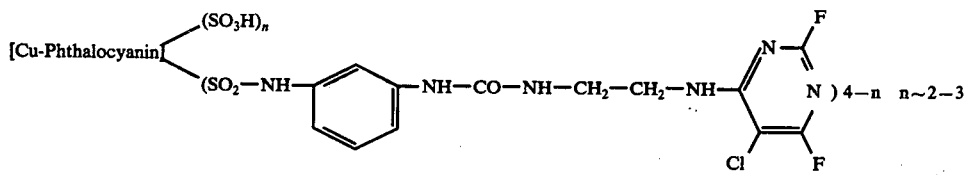

is salted-out with sodium chloride, washed and dried in vacuo at 40°. Using one of the abovementioned processes, the dyestuff gives clear blue dyeings and prints, of good fastness to light, wet processing and rubbing, on cellulose fibres.

Instead of the 48 parts of copper phthalocyaninetetrachloride it is possible, whilst otherwise using the same procedure as in Example 272, to employ 43.5 parts (expressed as 100% pure material) of the copper- or nickel-phthalocyanine-trisulphochloride, obtained by the action of chlorosulphonic acid on copper-phthalocyanine or nickel-phthalocyanine, in the form of the moist filter cake which has been well washed with ice water. Dyestuffs which give clear blue shades on cellulose fibres are then again obtained. Furthermore, a clear reactive dyestuff which gives blue dyeings is also obtained if, in Example 272, 25 parts of 1,4-diaminobenzene are employed in place of the 1,3-diaminebenzene and in other respects the same procedure is followed.

EXAMPLE 273

9 parts of 1-amino-4-[4'-N-(N'-β-aminoethyl)-ureide]-phenylaminoanthraquinone-2,5-disulphonic acid are dissolved in 360 parts of water at pH 10.5. 2.4 parts of difluoropyrimidine are added dropwise and the pH-value is kept at 8 – 8.5 by means of 1 N sodium hydroxide solution. After finishing the condensation, the dyestuff is salted-out with 20 parts of sodium chloride, filtered off and washed with 4% strength sodium chloride solution. It corresponds to the formula

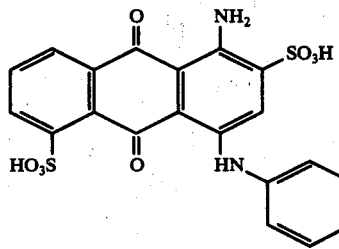

and dyes wool in greenish-tinged blue shades which are fast to light and to wet processing.

EXAMPLE 274

8 parts of 1-amino-4-[3'-N-(N'-β-aminoethyl)-ureido]-phenylamino-anthraquinone-2,6-disulphonic acid are dissolved in 320 parts of water at pH 10.5. The mixture is cooled to 0° – 5° and the pH-value is adjusted to 7 – 7.5. 2.9 parts of 5-nitro-2,4-difluoropyrimidine are added dropwise over the course of 30 minutes and the pH-value is kept at 7 – 7.5 by means of sodium hydroxide solution. When the condensation is complete, the dyestuff is salted-out with sodium chloride, filtered off, washed with 5% strength sodium chloride solution and dried in vacuo at 30°. It corresponds to the formula

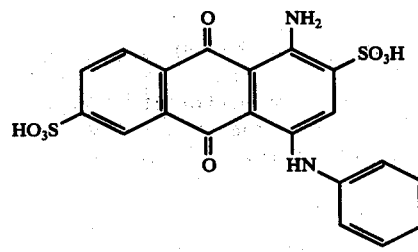

and dyes cotton, in accordance with the processes mentioned, in blue shades.

EXAMPLE 275

15 parts of aniline-2,4-disulphonic acid are dissolved in 70 parts of water whilst being neutralised and the solution is treated with 4.3 parts of sodium nitrite. A diazotisation is carried out at 0° – 5° by dropwise addition of this solution to a mixture of 130 parts of water and 30 parts of concentrated hydrochloric acid, 16.3 parts of 1-[4'-N'-(N''-β-aminoethyl)-ureido-phenyl]-3-methylpyrazolone-5 are gradually added to the diazonium salt solution obtained, and the pH-value is adjusted to 5.0 – 5.5 by means of sodium carbonate solution. When the coupling is complete, 11 parts of 2,4,6-trifluoro-5-chloropyrimidine are added to the solution and the pH-value of the reaction mixture is kept at 7 – 8. When a sample no longer shows any product containing free amino groups, the dyestuff is salted out with potassium chloride at 20°, filtered off and washed with 20% strength potassium chloride solution. It corresponds to the formula

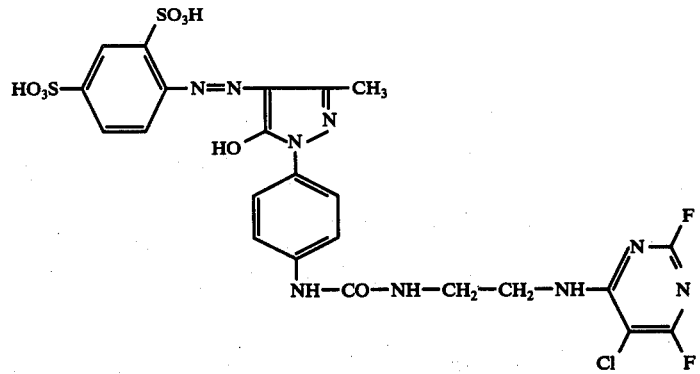

and dyes cotton and wool, in accordance with the methods described above, in yellow shades.

Similar dyestuffs are obtained if instead of the aniline-2,4-disulphonic acid 15 parts of aniline-2,5-disulphonic acid, 10.3 parts of aniline-2-sulphonic acid, 10.3 parts of aniline-3-sulphonic acid, 11.1 parts of 2-methylaniline-5-sulphonic acid, 18 parts of 3-amino-naphthalene-1,5-disulphonic acid, 21.5 parts of 7-amino-naphthalene-1,3,6-trisulphonic acid, 13.7 parts of 3-acetylamino-aniline-2-sulphonic acid or 12.1 parts of 4-methoxyaniline-2-sulphonic acid, are employed.

Analogous dyestuffs are obtained if instead of the abovementioned 1-[4'-N'-(N''-β-amino-ethyl)-ureido-phenyl]-3-methyl-pyrazolone 16.3 parts of 1-[3'-N'-(N''-

β-amino-ethyl)-ureido-phenyl]-3-methyl-pyrazolone-5 or 18.2 parts of 1-[3'-N'-(N''-β-amino-ethyl)-ureido-phenyl]-pyrazolone-5-3-carboxylic acid are employed.

EXAMPLE 276

20 parts of the disodium salt of 1,4-di-p-toluidino-5-N-(N'-β-aminopropyl)-ureido-anthraquinone-2',2'''-disulphonic acid (manufactured from 1,4-di-p-toluidino-5-amino-anthraquinone-2,2''-disulphonic acid by condensation with chloroformic acid phenyl ester and subsequent reaction with 1,3-propylenediamine) are dissolved in 400 parts of water. 5.7 parts of 2,4,6-trifluoro-5-chloro-pyrimidine are added dropwise and the pH-value is kept at 7 - 7.5 during the condensation. After completion of the condensation, the dyestuff is slowly salted out with 55 parts of sodium chloride over the course of 2 hours at 40° - 45°. The dyestuff is filtered off and washed with 500 parts of 10% strength sodium chloride solution. After drying in vacuo at 50°, a dyestuff of the formula

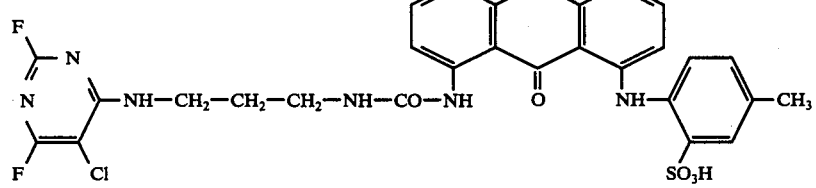

is obtained which on cellulose fibres gives strongly coloured dyeings and prints in green shades having good fastness to light and to wet processing, especially fastness to chlorine.

EXAMPLE 277

26 parts of the dyestuff of the formula

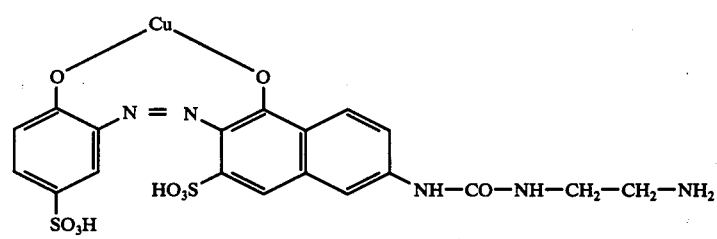

obtained by diazotisation of 1-hydroxy-2-amino-benzene-4-sulphonic acid, coupling to 2-(phenoxy-carbamido)-5-hydroxynaphthalene-7-sulphonic acid and subsequent reaction with ethylenediamine, followed by treatment with a copper-donating agent, are dissolved or suspended in 750 parts of water at pH 7. 10 parts of 2,4,6-trifluoro-5-chloropyrimidine are added dropwise at 20° whilst stirring well and the pH-value is continuously kept at 7 - 7.5 by means of 1 N sodium hydroxide solution. When no further free amino group is detectable, the dyestuff obtained is salted-out, filtered off, washed and dried in vacuo at 40°. It corresponds to the formula

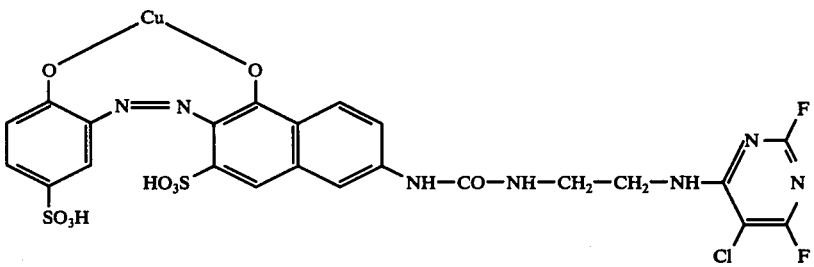

and dyes cellulose fibres, in accordance with one of the abovementioned dyeing or printing processes, in ruby shades which are fast to wet processing, light and rubbing.

The table which follows lists the heavy metal complexes of further aminoazo dyestuffs and the reactive components condensed therewith via a urea bridge, as well as the colour shades of these dyestuffs on cellulose materials. The manufacture of the aminoazo dyestuffs containing the bridge members, and of their metal complexes, and their reaction with the reactive components, can be carried out analogously to the instructions of Example 277.

| Example No. | Aminoaze Complex | Reactive Component | Colour Shade |
|---|---|---|---|
| 278 | ![structure] | A | ruby |
| 279 | ![structure] | A | " |
| 280 | ![structure] | B | reddish-tinged black |
| 281 | ![structure] | A | greenish-tinged black |
| 282 | ![structure] | A | ruby |

EXAMPLE 283

14.5 parts of N-(3-amino-4-hydroxy-5-sulphophenyl)-N'-(β-amino-ethyl)-urea are diazotised and coupled with 16 parts of 1-amino-8-hydroxy-naphthalene-2,4-disulphonic acid in a medium rendered alkaline with sodium carbonate. Thereafter the dyestuff is metallised with 12.5 parts of copper sulphate at 45° and a pH-value of 4 – 6. 9 parts of 2,4,6-trifluoro-5-chloropyrimidine are then added to the solution and the pH-value is kept at 7 – 7.5 with 1 N sodium hydroxide solution. After completion of the condensation the dyestuff is salted out, filtered off and dried in vacuo at 45°. It corresponds to the formula

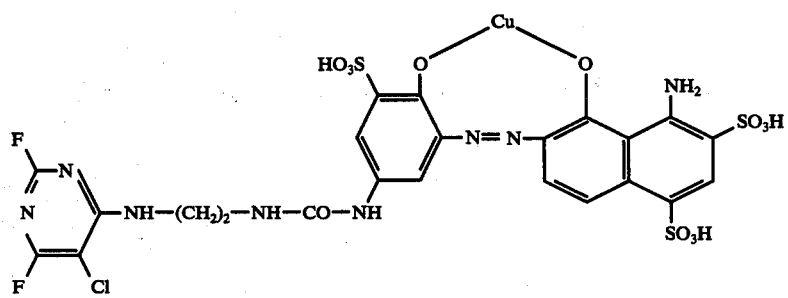

and, using the abovementioned processes, gives blue dyeings and prints on cellulose materials.

EXAMPLE 284

12.0 parts of the dyestuff of the formula

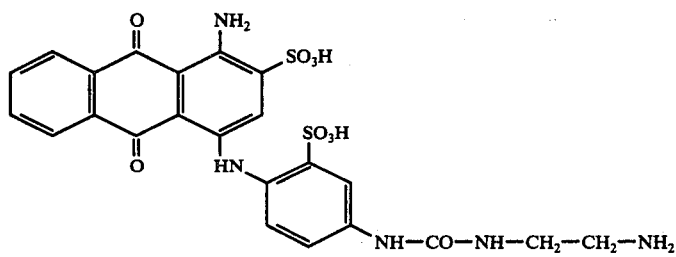

are dissolved in 240 parts of water and 100 parts of acetone at pH 10. The pH-value is carefully lowered to 7.5 and a solution of 5.0 parts of cyanuric chloride in 35 parts of acetone is added dropwise over the course of 10 minutes. The pH-value in the reaction mixture is kept at 7.0 - 7.5 by simultaneous dropwise addition of 1 N sodium hydroxide solution. After completion of the reaction, the mixture is clarified and the dyestuff is precipitated by dropwise addition of the filtrate to 500 parts of saturated potassium chloride solution. The precipitate is filtered off and the filter cake is washed with 350 parts of 10% strength potassium chloride solution and dried in vacuo at 20°. A dyestuff of the formula

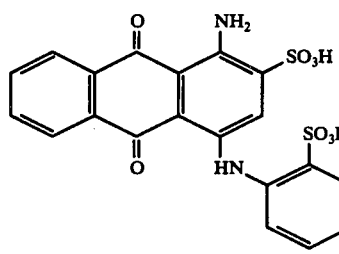

is obtained, which, using the abovementioned dyeing techniques gives greenish-tinged blue dyeings, of good fastness to light and to wet processing, on cellulose fibres.

EXAMPLE 285

If, in Example 59, the 6.0 parts of 2,4,6-trifluoro-5-chloropyrimidine are replaced by 8.6 parts of 2-methyl-sulphonyl-4,5-dichloro-6-methylpyrimidine, and the mixture is worked-up analogously, a dyestuff of the formula

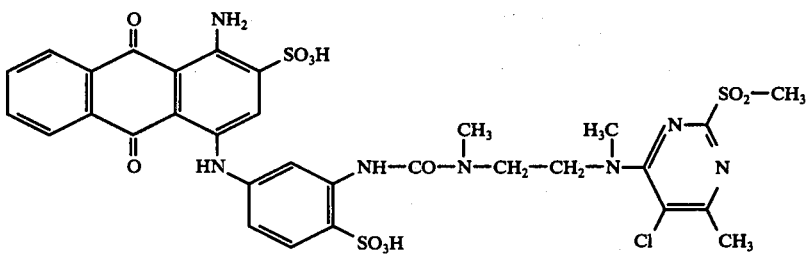

is obtained, which, using the processes of Example 2 and 3, gives reddish-tinged blue dyeings and prints, which are very fast to light and to wet processing, on cellulose materials.

EXAMPLE 286

15 parts of the dyestuff of the formula

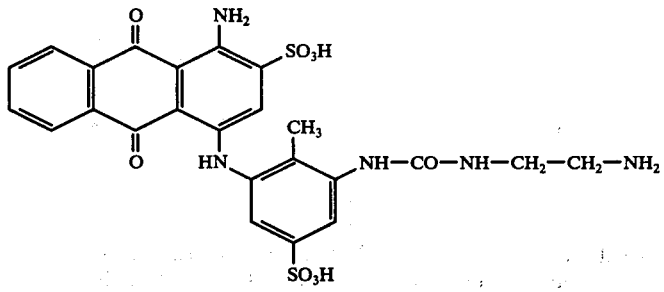

are dissolved in 300 parts of water by adjusting the pH-value of the solution to 7.5. The solution is warmed to 60° and 7.3 parts of 2,4,5,6-tetrachloropyrimidine are added. During the condensation, the pH-value is kept at 7.0 – 7.5 by continuous dropwise addition of 1 N sodium hydroxide solution. After completion of the condensation, the dyestuff is salted-out with sodium chloride and filtered off, and the filter cake is washed with 12% strength sodium chloride solution and dried in vacuo at 50°.

The dyestuff obtained, of the formula

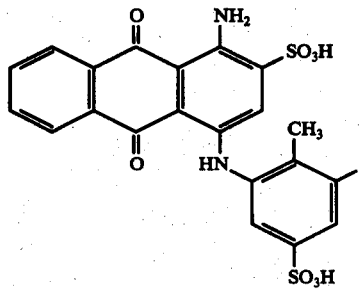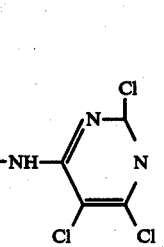

gives reddish-tinged blue dyeings and prints of excellent wet fastness properties on cellulose fibres if the processes of Examples 2 and 3 are used.

EXAMPLE 287

If, in Example 60, the 10.6 parts of 2,4,6-trifluoro-5-chloropyrimidine are replaced by 16.5 parts of 2,3-dichloroquinoxaline-6-carboxylic acid chloride and in other respects the analogous procedure is followed, a dyestuff of the formula

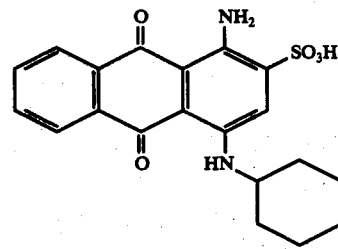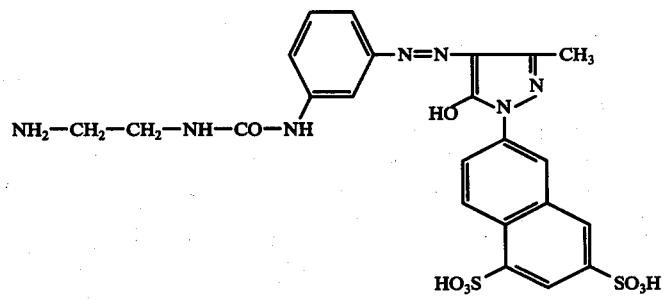

is obtained which, using the dyeing and printing processes described above, gives brilliant blue colour shades, of excellent fastness to light and to wet processing, on cellulose fibres.

Further blue anthraquinone dyestuffs are obtained if in the table of Example 60 (No. 61-114) the reactive components A, B or C listed there are replaced by 2,4,6-trichloropyrimidine, 2,4,6-trichloro-5-nitropyrimidine, 2,4,6-trichloro-5-cyanopyrimidine, 2,4,6-trichlorotriazine, 2,4-dichloro-6-methoxy-triazine, 2,3-dichloroquinoxaline-6-carboxylic acid chloride, 2,3-dichloroquinoxaline-6-sulphonic acid chloride, 1,4-dichlorophthalazine-6-carboxylic acid chloride, 1,4-dichlorophthalazine-6-sulphonic acid chloride, 2-methylsulphonyl-4,5-dichloro-6-methylpyrimidine, 2,4-bis-methylsulphonyl-5-chloro-6-methylpyrimidine, 2,3-dibromopropionyl chloride or α-bromoacrylic acid chloride.

EXAMPLE 288

24 parts of the dyestuff of the formula

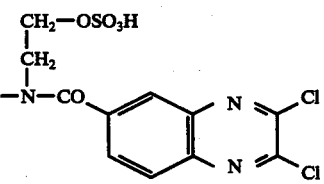

are dissolved in 480 parts of water by adjusting the pH-value to 7.5. After cooling the solution to 0° – 5°, 7.7 parts of cyanuric chloride dissolved in 50 parts of acetone are added dropwise over the course of a few minutes. The pH-value in the reaction mixture is kept at 7.5 – 8.0 by means of 1 N sodium hydroxide solution. After completion of the condensation, a solution of 3.45 parts of primary sodium phosphate (NaH$_2$PO$_4$.2H$_2$O) and 1.5 parts of secondary sodium phosphate (calcined Na$_2$HPO$_4$) in 25 parts of water is added to the dyestuff solution, and the solution is warmed to 45° and clarified. The dyestuff is salted out from the filtrate by dropwise addition of 360 ml of saturated sodium chloride solution, filtered off and washed with 500 parts of 10% strength sodium chloride solution. The filter cake is dried in vacuo at 20° and a dyestuff of the formula

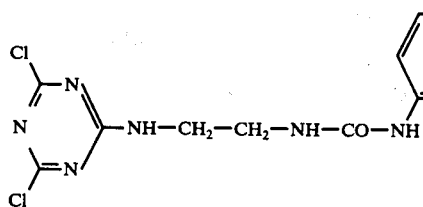 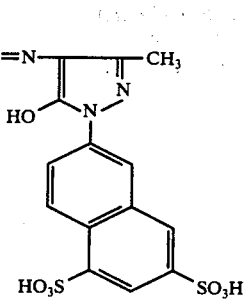

is obtained, which dyes cotton and rayon, using the dyeing techniques described above, in yellow shades which are fast to light and outstandingly fast to wet processing.

Further yellow azo dyestuffs are obtained if, in the table of Example 35 (No. 36-48) the reactive components A, B or C are replaced by 2,4-dichloro-6-methoxy-triazine, 2,4,6-trichloro-pyrimidine, 2,4,5,6-tetrachloropyrimidine, 2-methylsulphonyl-4,5-dichloro-6-methylpyrimidine, 2,4-bis-methylsulphonyl-5-chloro-6-methylpyrimidine, 2,3-dichloroquinoxaline-6-sulphonic acid chloride, 2,3-dichloroquinoxazine-6-carboxylic acid chloride or α-bromoacrylic acid chloride.

EXAMPLE 289

15 parts of the dyestuff of the formula

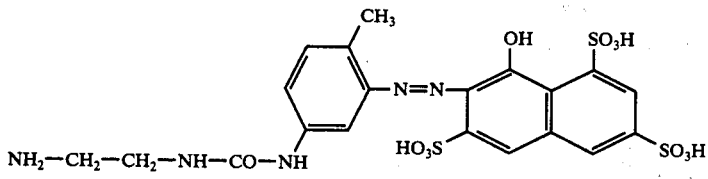

are dissolved in 300 parts of water by adjusting the pH-value to 8.0. 5.0 parts of cyanuric chloride, dissolved in 30 parts of acetone, are added dropwise to the solution over the course of 15 minutes and during the condensation which starts the pH-value is kept at 7.0 – 7.5. When the condensation is complete, the dyestuff solution is clarified and the dyestuff is salted out from the filtrate by means of 60 parts of sodium chloride. The precipitate is filtered off and the filter cake is washed with 400 parts of 15% strength sodium chloride solution and dried in vacuo at 20°. The resulting dyestuff of the formula

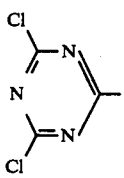 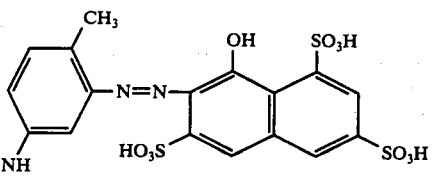

dyes cellulose fibres, in accordance with the abovementioned dyeing and printing processes, in strong red shades which are very fast to wet processing.

A similar, somewhat yellowish-tinged red dyestuff is obtained if instead of the 15 parts of the above dyestuff component 14.7 parts of a component of the formula

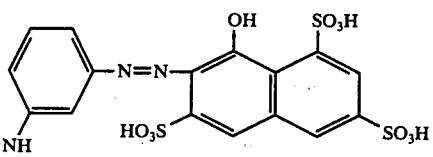

are employed.

Further azo dyestuffs of analogous structure are obtained if in the table which follows Example 3 (No. 4-34) the reactive components A, B or C are replaced by 2,4,6-trichlorotriazine, 2-methylsulphonyl-4,5-dichloro-6-methylpyrimidine, 2,4,5,6-tetrachloropyrimidine, 2,3-dichloroquinoxaline-6-carboxylic acid chloride, 2,3-dichloroquinoxaline-6-sulphonic acid chloride or α-bromoacrylic acid chloride.

We claim:
1. Reactive dyetuff of the formula

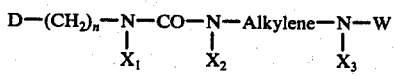

in which
W is a heterocyclic or aliphatic fiber reactive radical capable of reacting with an amino, amido or hydroxyl group on a fiber; which is bound to

by a carbon atom on W;
D is a radical of an aromatic ring containing organic dyestuff which is bound to $-(CH_2)_n-$ by an aromatic carbon on D; $X_1$ is hydrogen; $C_1-C_4$-alkyl; or $C_1-C_4$-alkyl substituted by hydroxyl, sulfo or sulfato;
$X_2$ and $X_3$ are hydrogen; $C_1-C_4$-alkyl; $C_1-C_4$-alkyl substituted by hydroxyl, sulfo or sulfato; cyclohexyl; phenyl; benzyl; phenethyl; or cyclohexyl, phenyl, benzyl or phenethyl substituted by hydroxyl, sulfo, carboxy, sulfamoyl or carbamoyl; or $X_2$ and $X_3$ together are $-CH_2-CH_2-$;
Alkylene is $C_1-C_6$-alkylene, $-CH_2-CH-(OH-)-CH_2-$ or cyclohexylene; and $n$ is 0 or 1.

2. Reactive dyestuff of claim 1 in which D is the radical of an azo, anthraquinone or phthalocyanine dyestuff.

3. Reactive dyestuff of claim 1 containing one or more sulfonic acid groups.

4. Reactive dyestuff of claim 1 in which D is the radical of an anthraquinone dyestuff.

5. Reactive dyestuff of claim 1 having the formula

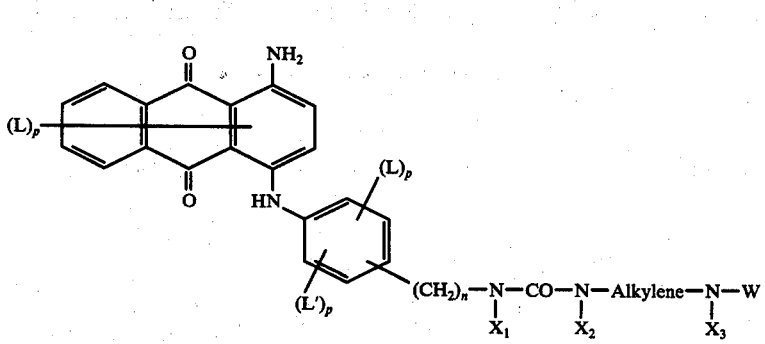

in which L and L' are hydrogen, sulfonic acid, methyl, methoxy or bromine; and $p$ is 0, 1 or 2.

6. Reactive dyestuff of claim 1 in which W is a pyrimidine or a triazine fiber reactive radical.

7. Dyestuff of claim 1 in which W is

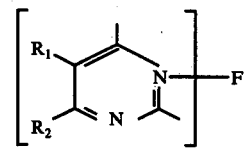

$R_1$ is hydrogen; halogen; $C_1-C_6$-alkyl; mono-, di- or tri-chloromethyl; mono-, di- or tri-bromoethyl; trifluoromethyl; vinyl; halogenovinyl; allyl; nitro; cyano, carboxyl; sulfo; carbonamido; sulfonamido; methylsulfonyl; $C_1-C_4$-alkoxy-carbonyl; — $CONH_2$; $-SO_2NH_2$ mono- or di- $C_1-C_4$-alkyl-sulfonic acid amide or -carboxylic acid amide;
$R_2$ is hydrogen; halogen; $C_1-C_6$-alkyl; methyl; vinyl; halogenovinyl; allyl; mono-, di- or tri-chloromethyl; or mono-, di- or tri-bromomethyl;
F is fluorine.

8. Dyestuff of claim 7 in which $R_1$ and $R_2$ are Cl, F, or $C_1-C_4$-alkyl.

9. Dyestuff of claim 1 in which $X_1$, $X_2$ and $X_3$ are hydrogen, $C_1-C_4$-alkyl or $C_1-C_4$-hydroxyalkyl.

10. Dyestuff of claim 5 in which W is $R_1$ is hydrogen; halogen; $C_1-C_6$-alkyl; mono-, di- or tri-chloromethyl; mono-, di- or tri-bromomethyl; trifluoromethyl; vinyl; halogenovinyl; allyl; nitro; cyano, carboxyl; sulfo; carbonamido; sulfonamido; methylsulfonyl; $C_1-C_4$-alkoxy-carbonyl; — $CONH_2$; $-SO_2NH_2$; mono- or di- $C_1-C_4$-alkyl-sulfonic acid amide or -carboxylic acid amide;
$R_2$ is hydrogen; halogen; $C_1-C_6$-alkyl; methyl; vinyl; halogenovinyl; allyl; mono-, di- or tri-chloromethyl; or mono-, di- or tri-bromomethyl;
F is fluorine.

11. Dyestuff of claim 10 in which $R_1$ and $R_2$ are hydrogen, Cl, F, or $C_1-C_4$-alkyl.

12. Dyestuff of the formula

13. Dyestuff of the formula
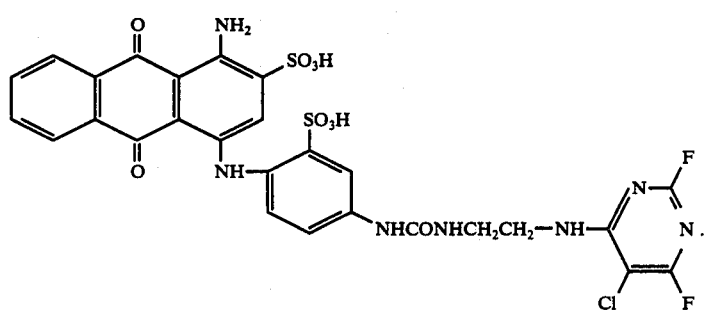
14. Dyestuff of the formula
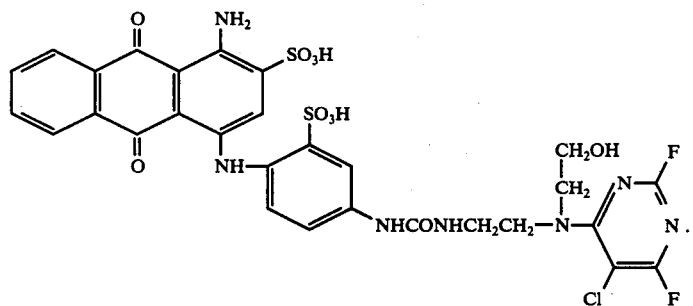
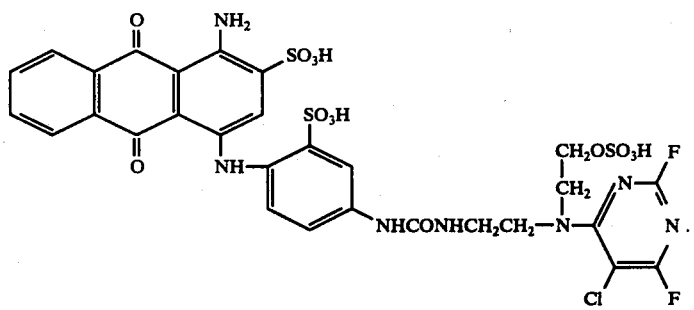
* * * * *